United States Patent [19]
Hashimoto et al.

[11] Patent Number: 5,548,325
[45] Date of Patent: Aug. 20, 1996

[54] VIDEO CAMERA WITH DEVICE GENERATING A SHUTTER PULSE FOR A CAMERA OR THE LIKE

[75] Inventors: Hiroyuki Hashimoto, Souka; Satoshi Ishii, Kita-adachi-gun; Haruo Saito, Kuki, all of Japan

[73] Assignee: Aiwa Co., Ltd., Tokyo, Japan

[21] Appl. No.: 277,373

[22] Filed: Jul. 19, 1994

Related U.S. Application Data

[63] Continuation of Ser. No. 896,066, Jun. 9, 1992, abandoned.

[30] Foreign Application Priority Data

| Jun. 10, 1991 | [JP] | Japan | 3-138013 |
| Jun. 13, 1991 | [JP] | Japan | 3-142136 |
| Jun. 13, 1991 | [JP] | Japan | 3-142140 |
| Jun. 13, 1991 | [JP] | Japan | 3-142144 |
| Jun. 13, 1991 | [JP] | Japan | 3-142159 |
| Jun. 18, 1991 | [JP] | Japan | 3-146335 |
| Jun. 18, 1991 | [JP] | Japan | 3-146336 |
| Jun. 18, 1991 | [JP] | Japan | 3-146339 |
| Jun. 20, 1991 | [JP] | Japan | 3-148613 |
| Jun. 20, 1991 | [JP] | Japan | 3-148625 |

[51] Int. Cl.$^6$ ............................................. H04N 5/225
[52] U.S. Cl. ........................... 348/64; 348/220; 348/367
[58] Field of Search ................................ 348/220, 221, 348/229, 296, 363, 367, 700, 152, 155, 64, 901, 143

[56] References Cited

U.S. PATENT DOCUMENTS

| 3,821,468 | 6/1974 | Busch | 178/6.8 |
| 4,356,511 | 10/1982 | Tsujimura | 358/181 |
| 4,791,480 | 12/1988 | Muranaka | 358/98 |
| 4,833,538 | 5/1989 | Hieda | 358/182 |
| 4,860,108 | 8/1989 | Saito et al. | 358/209 |
| 4,949,117 | 8/1990 | Van Heyningen et al. | 348/64 X |
| 4,959,727 | 9/1990 | Imaide et al. | 358/228 |
| 4,979,034 | 12/1990 | Funaki | 348/64 |
| 5,034,811 | 7/1991 | Palm | 358/105 |
| 5,053,877 | 10/1991 | Kondo et al. | 358/228 |
| 5,075,778 | 12/1991 | Saito | 358/228 |
| 8,601,108 | 8/1989 | Saito et al. | 358/209 |

FOREIGN PATENT DOCUMENTS

| 0222641 | 5/1987 | European Pat. Off. . |
| 0280511 | 8/1988 | European Pat. Off. . |
| 0356123 | 2/1990 | European Pat. Off. . |
| 0423961 | 4/1991 | European Pat. Off. . |
| 0423961 | 4/1991 | European Pat. Off. . |
| 2221119 | 1/1990 | United Kingdom . |

OTHER PUBLICATIONS

Patent Abstracts of Japan, vol. 15, No. 246 (E–1081) Jun. 24, 1991, JP–A–30–77 485 (Abstract) Apr. 3, 1991.
Patent Abstracts of Japan, vol. 5, No. 40 (E–49) Mar. 17, 1981, JP–A–55 165 077 (Abstract) Dec. 23, 1980.
Patent Abstracts of Japan, vol. 9, No. 185 (E–332) Jul. 31, 1985, JP–A–60 054 573 (Abstract) Mar. 29, 1985.
Patent Abstracts of Japan, vol. 15, No. 246 (E–1081) Jun. 24, 1991, JP–A–30 77 485 (Abstract) Apr. 3, 1991.
Patent Abstracts of Japan, vol. 5, No. 40 (E–49) Mar. 17, 1981, JP–A–55 165 077 (Abstract) Dec. 23, 1980.
Patent Abstracts of Japan, vol. 9, No. 185 (E–332) Jul. 31, 1985, JP–A–60 054 573 (Abstract) Mar. 29, 1985.

*Primary Examiner*—Wendy Greening
*Attorney, Agent, or Firm*—Dellett and Walters

[57] ABSTRACT

A video camera system for generating a shutter pulse for operating a photo-camera or other still image recording means in response to detecting a predetermined magnitude change in an average level of a pick-up signal representative of an image. As a detecting signal, both level detecting signals for an iris control and an AGC control, for example, are used. When the status of a foreground object zone is changed with movement of a person or an object, the level change of the image pick-up signal becomes a value larger than a predetermined value and a shutter pulse is automatically generated.

8 Claims, 38 Drawing Sheets

F I G. 37
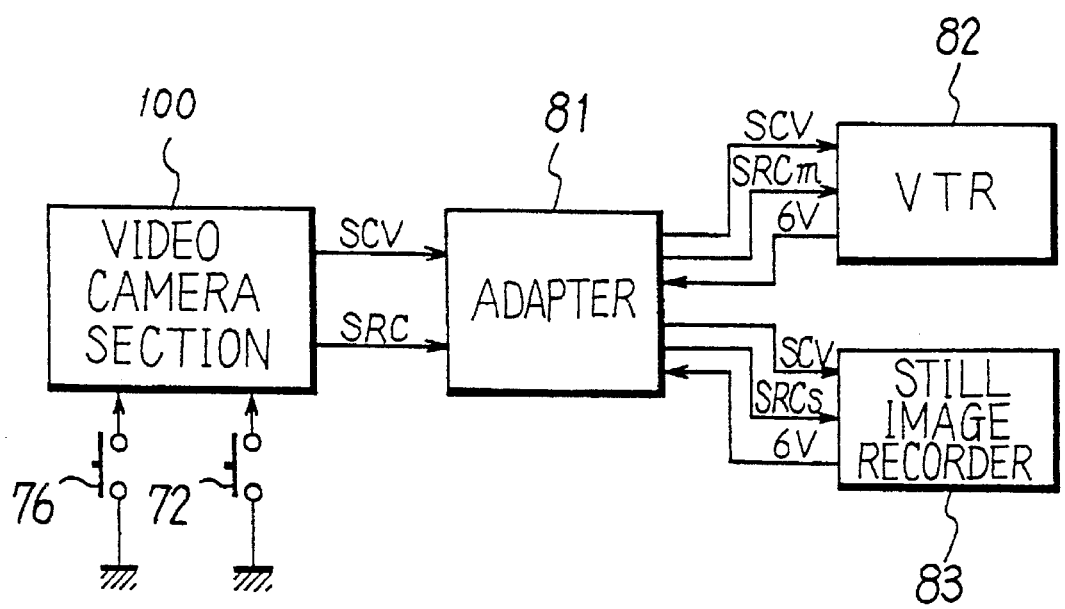

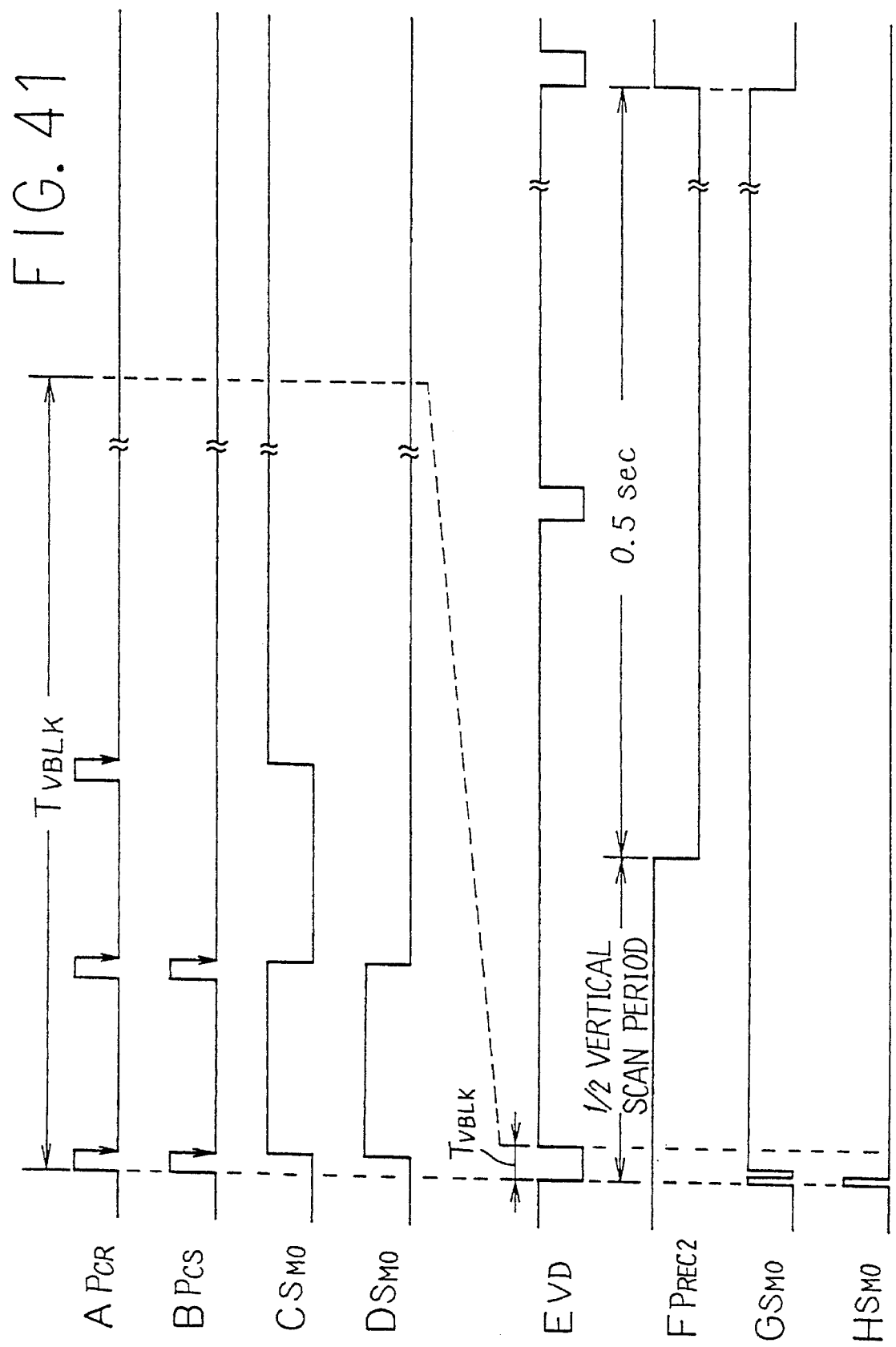

VIDEO CAMERA WITH DEVICE GENERATING A SHUTTER PULSE FOR A CAMERA OR THE LIKE

This is a continuation of application Ser. No. 07/896,066 filed on Jun. 9, 1992 now abandoned.

BACKGROUND OF THE INVENTION

This invention relates to video cameras suited for use with photo-cameras or for picking up still pictures, video camera devices for recording video signal output from a video camera in a VTR or a still image recorder, and adapters suited for use with such video camera devices.

Using a video camera, it is possible to pick up still pictures as well as motion pictures. However, it is often desired to use a photo-camera together with a video camera. For example, it is thought to operate a photo-camera shutter while picking up a motion picture with a video camera.

In the meantime, where the camera is used as a monitor camera, it is convenient if the photo-camera shutter is automatically operated when the status of the foreground object zone is changed with a movement of a man or an object.

Further, it is convenient that when operating a photo-camera shutter the output video signal of the video camera is provided with a special effect indicative of the shutter operation. This permits, for instance, the presence of any kind of picture to be readily known at the time of video signal reproduction in a VTR.

Further, when strobic light is emitted at the time of the photo-camera shutter operation, charge accumulated in the image pick-up device is increased suddenly with the strobic light emission, and also the level of the image pick-up signal from the image pick-up device is suddenly increased. However, usual irises or AGC circuits in video cameras are too slow in response to be able to follow instantaneous image pick-up signal level changes.

Therefore, when the image pick-up signal level is suddenly increased, the AGC circuit operates with the same gain as when the image pick-up signal level is not increased, thus resulting in an excessively high image pick-up signal level. This may cause what is commonly termed saturation. This is so not only in the case of using the strobic light emission but also when the image pick-up signal level is occasionally suddenly increased.

Further, when light from a foreground object, for instance, is insufficient to photograph a still picture using a video camera, if only an image pick-up signal corresponding to the object which is made to provide sufficient light with strobic light emission can be recorded with a still image recorder, it will be very convenient because in this case only a high quality image pick-signal can be recorded with the still image recorder.

Further, if light from the object is insufficient when picking up a still picture using a video camera, it may be thought to increase the sensitivity by increasing the charge accumulation time such as to provide sufficient charge accumulation in the image pick-up device. When picking up a still picture, increasing the charge accumulation time does not result in such inconvenience as image deviation. Depending on the amount of the object light, however, excessively increasing the charge accumulation time results in such inconvenience as saturation of charge accumulated in the image pick-up device.

Further, in case the object light is insufficient when picking up a still picture using a video camera, it may be thought to use a strobe to provide for sufficient charge accumulation in the image pick-up device. However, when a strobe is used, it is dark (i.e., the illumination intensity is low). Therefore, the iris is open, and the AGC circuit is in its operative period. Usually, the response of the iris is slow, and great light due to strobic light emission is incident on the image pick-up device. For this reason, the use of a strobe may result in the saturation of charge accumulated in the image pick-up device.

Meanwhile, an output video signal from a video camera may be supplied to a VTR for motion image recording or supplied to a still image recorder for still image recording. There is a still image recorder, which uses a DAT proposed earlier by the present applicant (see Japanese Patent Application Laid-Open No. 161661/1990).

Usually, a single recorder is connected to a video camera for recording. This means that every time the motion or still image recording is made, the recorder connected to the video camera has to be replaced. This is very cumbersome for the user. Accordingly, a plurality of different recorders may conveniently be connected to a video camera such that they may be automatically selected in accordance with the user's video camera operation.

For the automatic selection of a plurality of recorders, it may be thought to cause selective output of recording control signals corresponding to the respective recorders to be supplied to an adapter so as to effect selection of the corresponding recorder.

Where a plurality of recorders are connected via an adapter, it is necessary to output recording control signals individually corresponding to the respective recorders. However, where a single recorder is connected directly, it is only necessary to output a fixed recording control signal irrespective of the kind of recorder. In this case, it is convenient to be able to automatically determine one of the recording control signals that is to be provided.

SUMMARY OF THE INVENTION

An object of the invention is to provide a video camera, in which a shutter pulse is generated automatically when the status of the foreground object zone is changed.

Another object of the invention is to provide a video camera, in which output video signal can be provided with a special effect indicative of the shutter operation.

A further object of the invention is to provide a video camera, which is free from saturation even when the image pick-up signal level is suddenly increased.

A still further object of the invention is to provide a video camera, which can selectively output image pick-up signals when the foreground object light amount is changed.

A yet further object of the invention is to provide a video camera, which permits sensitivity increase without possibility of resulting in such inconvenience as saturation of charge accumulated in an image pick-up device.

Yet another object of the invention is to provide a video camera, which can be used with a strobe without resulting in saturation of charge accumulated in an image pick-up device.

A further object of the invention is to provide a video camera device, in which one of a plurality of different recording control signals can be determined automatically and output.

A further object of the invention is to provide an adapter, which is provided between a video camera and a plurality of recorders for selection thereof.

In a video camera aspect of the invention, there is provided a video camera, which comprises level detection means for detecting the level of an image pick-up signal output from an image pick-up device, level change detection means for detecting a level change in the output signal of the level detection means to more than a predetermined extent, and shutter pulse generation means for generating a shutter pulse according to the output signal of the level change detection means.

In another video camera aspect of the invention, there is provided a video camera, which comprises blanking area setting means for setting a blanking area to increase gradually and then decrease gradually for every image frame, and blanking means for blanking an output video signal. The output video signal is blanked by the blanking means according to the blanking area set by the blanking area setting means.

In a further video camera aspect of the invention, there is provided a video camera, which comprises blanking area setting means for setting a blanking area to increase gradually and then decrease gradually for each image frame, an image memory for storing one frame of picked-up image video signal when a shutter is operated, signal selection means for selectively outputting either the picked-up image video signal or a video signal read out from the image memory, and blanking means for blanking the video signal output from the signal selection means. The output video signal is blanked by the blanking means according to the blanking area set by the blanking area setting means, one frame of video signal is read out repeatedly from the image memory for a predetermined period of time before decreasing of the blanking area after increasing thereof, and the signal selection means selects the video signal to be read out from the image memory and also stops the blanking operation of the blanking means.

In a still further video camera aspect of the invention, there is provided a video camera, which comprises level detection means for detecting the level of the image pick-up signal output from the image pick-up device, level change detection means for detecting a level change in the output signal of the level detection means to more than a predetermined extent, a memory for storing at least one frame of the image pick-up signal, and memory control means for controlling the writing and reading with respect to the memory according to the output signal of the level change detection means.

In a yet further video camera aspect of the invention, there is provided a video camera, which comprises an optical sensor having a characteristic substantially equal to that of each pixel optical sensor of the image pick-up device, an integrator for integrating the output signal of the optical sensor, and control means for supplying a read pulse to the image pick-up device and also resetting the output signal of the integrator when the output signal thereof exceeds a predetermined level.

In a further video camera aspect of the invention, there is provided a video camera, which comprises an image pick-up device for outputting, in a field succeeding a certain charge accumulation period, an image pick-up signal according to the amount of charge accumulated in the charge accumulation period, an AGC circuit for controlling the level of the image pick-up signal output from the image pick-up device, an optical sensor having a characteristic substantially equal to that of each pixel optical sensor of the image pick-up device, an integrator for integrating the output signal of the optical sensor for each charge accumulation period, and AGC control means for controlling the gain of the AGC circuit to reduce the gain to a predetermined extent in a field succeeding a certain charge accumulation period, during which the level of the output signal of the integrator has exceeded a predetermined level.

In a further video camera aspect of the invention, there is provided a video camera, which comprises strobic light emission means, an iris for controlling the amount of light incident on an image pick-up device, an AGC circuit for controlling the level of an image pick-up signal output from the image pick-up signal output from the image pick-up device, mode setting means for setting a strobic mode, in which the strobic light emission means is used, and control means for reducing the aperture of the iris in the strobic mode and reducing the gain of the AGC circuit when an image pick-up signal obtained with photography using the strobic light emission means is output.

In a further video camera aspect of the invention, there is provided strobic light emission means, an optical sensor having a characteristic substantially equal to that of each pixel optical sensor in an image pick-up device, an integrator for integrating the output signal of the optical sensor, and control means for causing the start of charge accumulation in the image pick-up device and resetting of the output signal of the integrator in accordance with the strobic light emission of the strobic light emission means and supplying a read pulse to the image pick-up device when the output signal of the integrator exceeds a predetermined value.

In a video camera device aspect of the invention, there is provided a video camera, in which a first or second recording control signal is output together with a video signal from a video camera, the first control signal output from the video camera is supplied to a recorder to record the output video signal, and the second recording control signal is supplied from the video camera to an adaptor while applying the first recording control signal output from the adapter to the recorder to record the output video signal. This video camera device comprises a discriminator for checking whether a recorder or the adapter is connected to the video camera.

In an adapter aspect of the invention, there is provided an adapter between a video camera, which selectively outputs a plurality of different recording control signals corresponding to respective recorders along with an output video signal, and the plurality of recorders. The adapter comprises discriminating means for discriminating one of the recorders, which a selected one of the recording control signals corresponds to. The selected recording control signal is supplied to the corresponding recorder as discriminated by the discriminating means.

According to the invention, when the status of the foreground object zone is changed with movement of a person or an object, the level of the image pick-up signal output from the image pick-up device is also changed. Thus, when the status of the foreground object zone is changed, a shutter pulse is automatically generated from the shutter pulse generation means.

In addition, according to the invention the output video signal is blanked such that the blanking area increases gradually and then decreases gradually for each image frame. Thus, the output video signal may be provided with a special effect indicative of the shutter operation.

Further, according to the invention in each charge accumulation period the integrator output signal corresponds to the charge accumulation in the image pick-up device, i.e., the level of the image pick-up device output from the image pick-up device in the succeeding field. Thus, when the integrator output signal exceeds a predetermined level, the AGC circuit gain is forcibly reduced in the succeeding field, thus avoiding excessive image pick-up signal level increase and preventing the generation of saturation.

Further, according to the invention when the foreground object light is insufficient, strobic light emission causes a sudden level increase of the image pick-up signal of the object now providing sufficient light. It is thus possible to permit only the image pick-up signal of the object providing sufficient light to be provided selectively through a memory according to the output signal of the level change detection means.

Further, according to the invention when the charge accumulation in the image pick-up device becomes adequate, a read pulse is supplied to the image pick-up device according to the integrator output signal corresponding to the charge accumulated in the image pick-up device. Thus, it is possible to permit sensitivity increase by increasing the charge accumulation time without resulting in the saturation of the charge accumulation.

Further, according to the invention the iris aperture is reduced in the strobic mode. Thus, with strobic light emission there is no possibility of incidence of a great amount of light on the image pick-up device, and hence there is no possibility of the saturation of the charge accumulation. As the iris aperture is reduced, the AGC circuit gain is automatically increased to make up for the image pick-up signal gain reduction. If the AGC circuit gain remains increased when strobic light is emitted, the image pick-up signal level is increased so much as to result in the generation of saturation. However, since the AGC circuit gain is reduced at the timing of the output of the image pick-up signal obtained in the photography with strobic light emission, there is no possibility of saturation or the like.

Further, according to the invention when the charge accumulation in the image pick-up device becomes adequate according to the integrator output signal corresponding to the charge accumulation in the image pick-up device, a read pulse is supplied to the image pick-up device. Thus, it is possible to use a strobe without possibility of saturation of the charge accumulation.

Further, according to the invention the discriminator discriminates either a recorder or the adapter that is connected to the video camera. Thus, in either case when a recorder is connected directly or when it is connected via the adapter to the video camera, a corresponding recording control signal can be output automatically from the video camera.

The above and other objects and novel features of the present invention will be more apparent from the following detailed description when the same is read in conjunction with the appended claims and attached drawings.

BRIEF DESCRIPTION OF THE DRAWINGS

FIG. 37 is a schematic showing an example of a connection when an adapter is used;

FIG. 41 is a waveform chart illustrating the operation of the adapter.

DETAILED DESCRIPTION OF THE INVENTION

Now, one embodiment of the invention will be described with reference to the drawings. This embodiment comprises a video camera and photo-camera, these cameras being made integral with each other.

Figure 1:
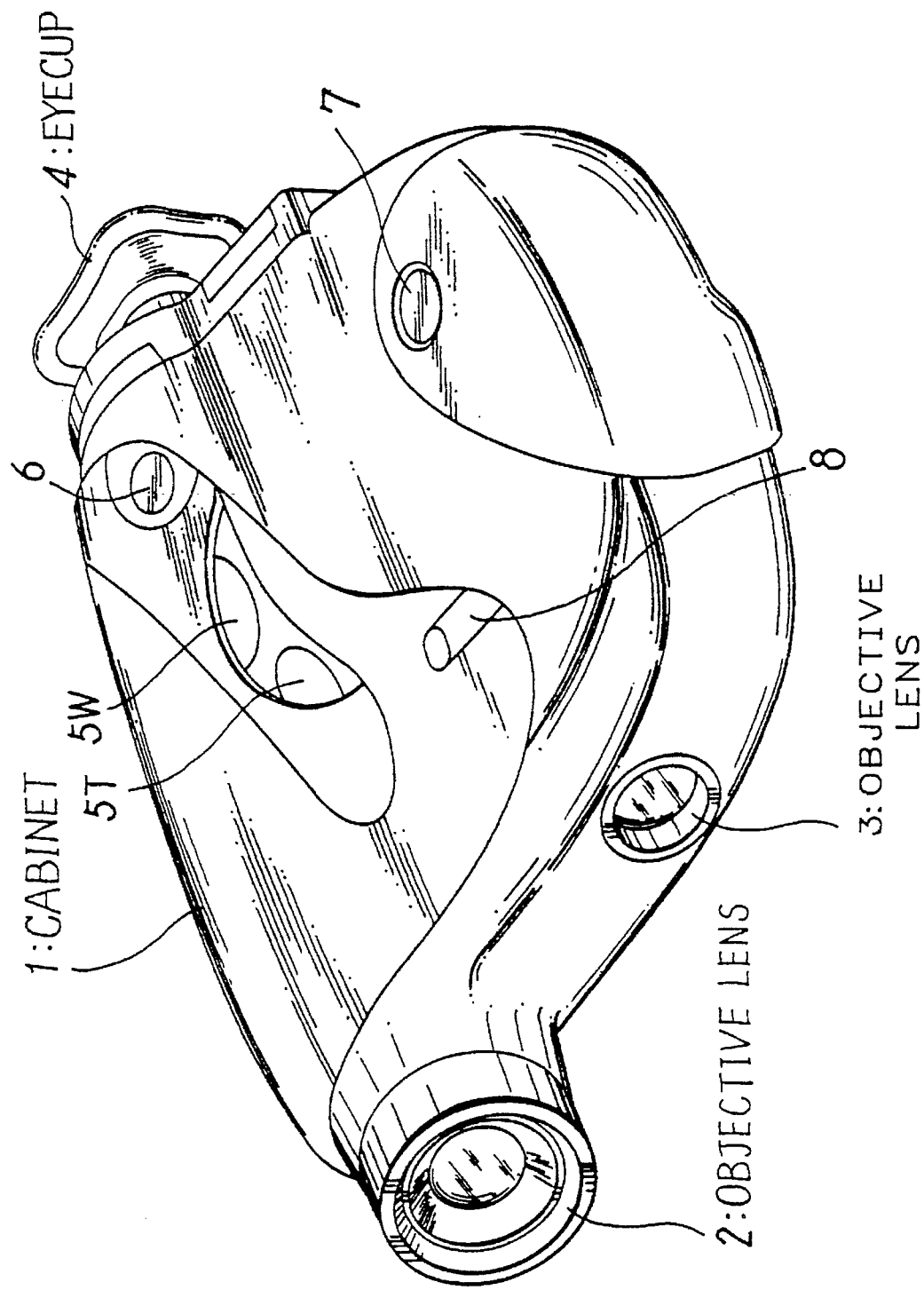
FIG. 1 is a perspective view showing an embodiment of the invention.

FIG. 1 is a perspective view showing the structure of the embodiment. Referring to the Figure, designated at 1 is a cabinet. Although not shown, in the cabinet are accommodated a video camera section comprising an image pick-up device, a signal processing circuit and so forth and a photo-camera section comprising a film loading mechanism, a film drive mechanism and so forth.

Designated at 2 is an objective lens of the video camera section. The video camera section and photo-camera section include independent optical systems. The objective lens 2 is a 6-times zoom lens with a focal distance f of 7 to 42 mm. Another objective lens 3 is also used, which is a fixed focal point lens with a focal distance f of 55 mm.

In this embodiment, an electronic view finder comprising a small size CRT is provided in the cabinet 1. Images picked up by the video camera section via the objective lens 2 are displayed on the CRT. Reference numeral 4 designates an eye cup. No view finder is provided for directly confirming images picked up by the photo-camera section via the objective lens 3.

Designated at 5T and 5W are zoom operation buttons for zoom operations in TEL and WIDE directions, respectively. Designated at 6 is a recording button for recording image pick-up video signal output from the video camera section, in the VTR, and at 7 a shutter button of the photo-camera section. Designated at 8 is a film rewind button.

Figure 2:
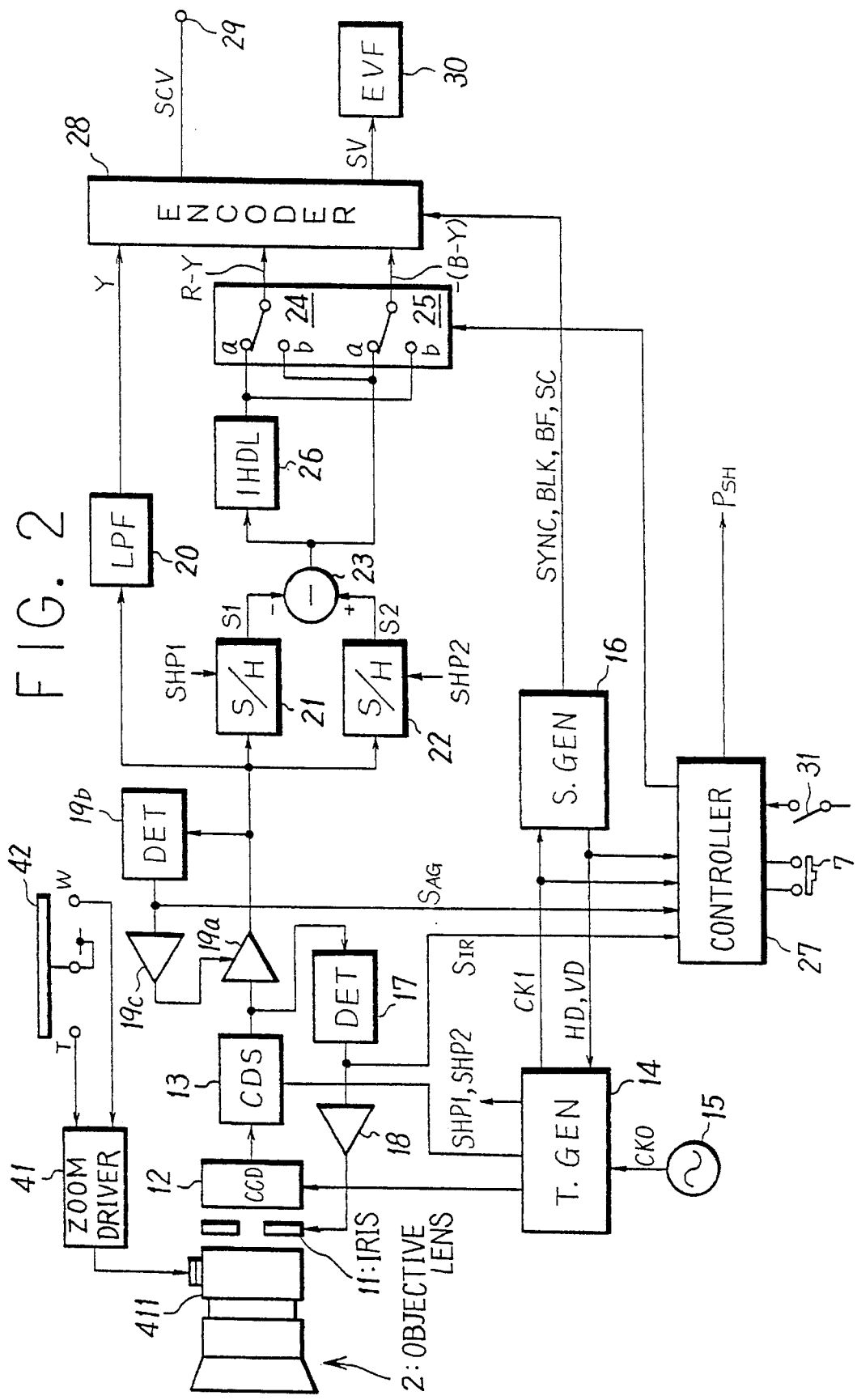
FIG. 2 is a schematic representation of a video camera section.

FIG. 2 is a schematic representation of the video camera section of this embodiment. Image light from the foreground object is supplied via the objective lens 2 and an iris 11 to a single plate CCD solid-state image pick-up device 12, which has complementary color checkered type color filters.

Figure 3:
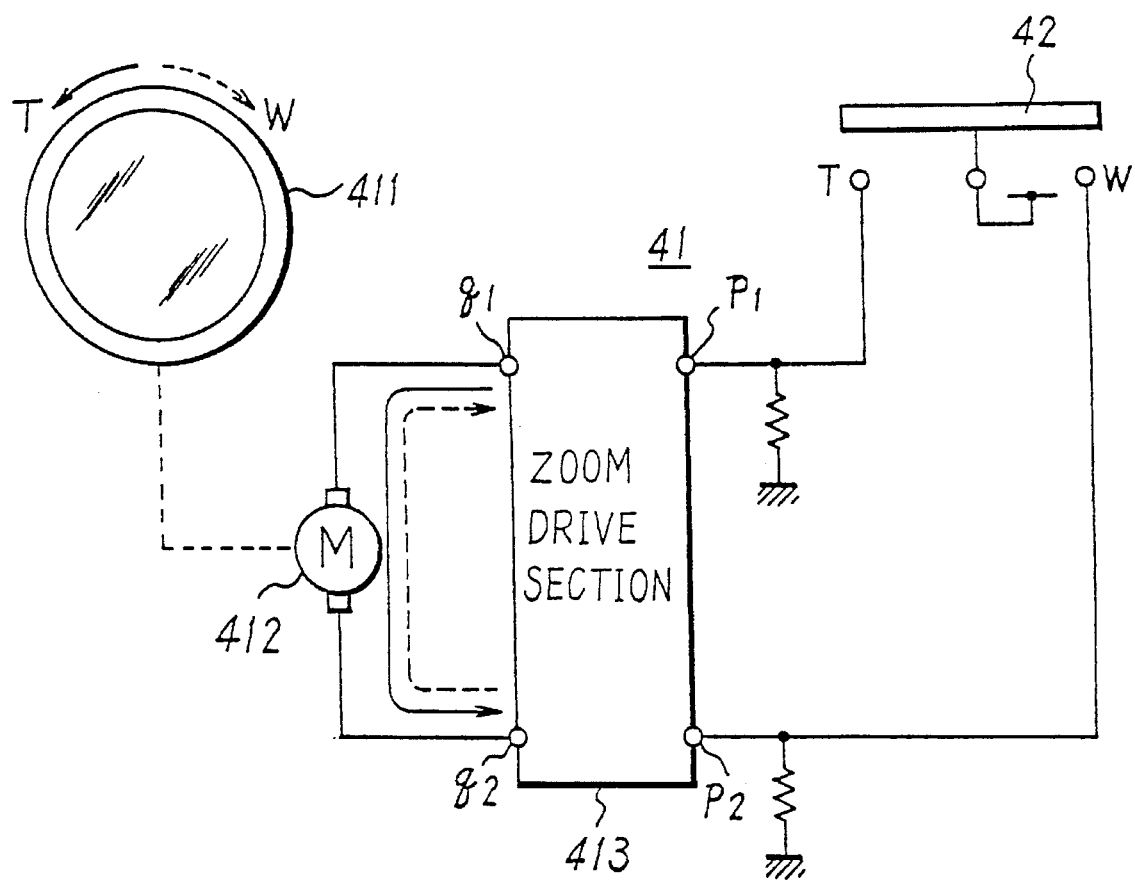
FIG. 3 is a schematic showing a zoom driver.

The zooming factor control of the image pick-up lens 2 is effected by a zoom driver 41. FIG. 3 shows a specific construction of the zoom driver 41. Referring to the Figure, designated at 411 is a lens constituting the objective lens 2 and serving to control the zooming factor. The lens 411 is rotationally driven back and forth to control the zooming factor. For example, the zooming factor is controlled in TEL direction by rotating the lens 411 in direction T and in WIDE direction by rotating the lens in direction W.

The lens 411 is rotationally driven by a DC motor 412. The DC motor 412 is connected between output terminals q1 and q2 of a zoom driver section 413. The zoom driver section 413 has its input terminals p1 and p2 connected to respective T and W side fixed terminals of a zoom switch 42.

When a high level "H" signal is supplied to the terminal p1, current is caused to pass from the terminal q1 through the motor 412 to the terminal q2 (as shown by solid line) to rotationally drive the lens 411 in direction T. Conversely, when the high level "H" signal is supplied to the terminal p2, current is caused to pass from the terminal p2 through the motor 412 to the terminal q1 (as shown by dashed line) to rotationally drive the lens 411 in direction W. When the high level "H" signal is not supplied to either of the terminals p1 and p2, no current is caused in the motor 412, and the lens 411 is thus not rotationally driven in any direction but is held at the prevailing position.

The zoom lens 42 has its variable terminal connected to a power source terminal. When the zoom operation buttons 5T and 5W of the cabinet 1 as noted above are depressed, the zoom switch 42 is connected to the T and W sides, respectively. When the zoom switch 42 is connected to the T and W sides, the high level "H" signal is supplied to the terminals p1 and p2, respectively, of the zoom driver section 413 for zoom control in the respective TEL and WIDE directions.

Figures 4, 5:
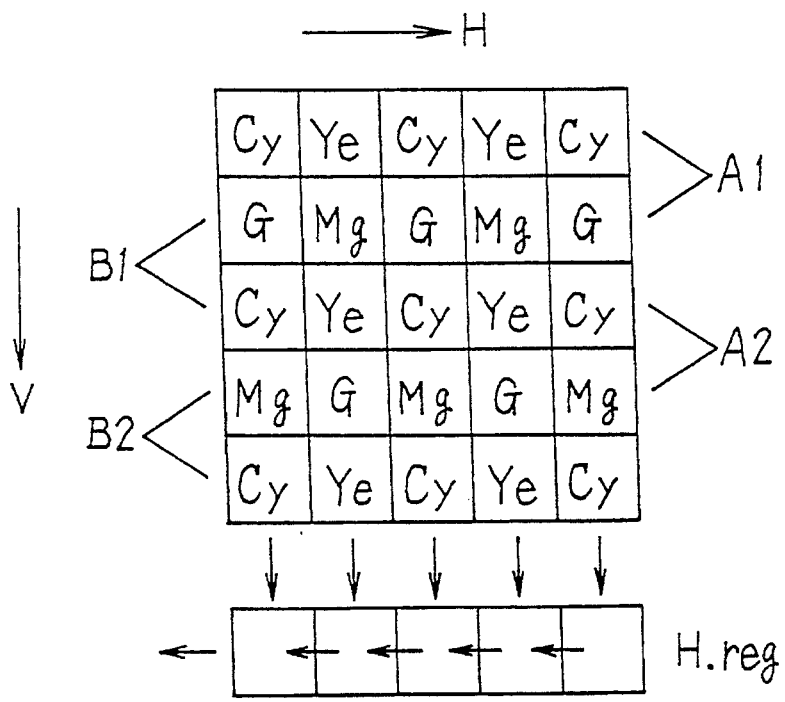
FIG. 4 is a view showing a color coding format of an image pick-up device.
FIG. 5 is a view showing the output of horizontal output register in the image pick-up device.

FIG. 4 shows a color coding format of the image pick-up device 12 in field reading. In field A, charge mixing of pairs A1 and A2 is effected. In field B, charge mixing of pairs B1 and B2 is effected. Charge is output from a horizontal shift register Hreg in the order of A1, A2, . . . in field A and in the order of B1, B2, . . . in field B.

FIG. 5 shows the output of the horizontal shift registor. The orders of outputs of charge are labeled a, b, . . . For line A1, the charge output order is (Cy+G), (Ye+Mg), . . . In line A2, it is (Cy+Mg), (Ye+G), . . . In line B1, it is (G+Cy), (Mg+Ye), . . . In line B2, it is (Mg+Cy), (G+Ye), . . .

Referring to FIG. 2 again, the output signal of the image pick-up device 12 is supplied to a CDS (correlated double sampling) circuit 13, and this image pick-up signal can be taken out from the CDS circuit 13. By using the CDS circuit 13, it is possible to reduce reset noise as is well known in the art.

Timing pulses necessary for the image pick-up device 12 and CDS circuit 13 are supplied from a timing pulse generator 14. To the timing pulse generator 14 is supplied a reference clock CK0 at 6 fsc (fsc representing the color subcarrier frequency) from an oscillator 15, and are also supplied horizontal and vertical sync signals HD and VD from a sync signal generator 16. To the sync signal generator 16 is supplied a clock CK1 at 4 fsc from the timing pulse generator 14.

The image pick-up signal output from the CDS circuit 13 is supplied to a level detection circuit 17, the output signal from which is in turn supplied to an iris driver 18. The iris driver 18 effects automatic control of the stop of the iris 11.

A process of obtaining luminance signal Y and chrominance signal (i.e., color difference signal) from the image pick-up signal output from the CDS circuit 13 will now be described.

The luminance signal Y is obtained by adding together adjacent signals, that is, adding signals in the order of a+b, b+c, c+d, d+e, . . . with reference to FIG. 5. Cy, Ye and Mg are respectively Cy=B+G, Ye=R+G and Mg=B+R.

For line A1, for instance, the luminance signal Y is approximated as $$Y = ((Cy+G)+(Ye+Mg)) \times 1/2$$
$$= (2B+3G+2R) \times 1/2$$

For line A2, it is approximated as $$Y = ((Cy+Mg)+(Ye+G)) \times 1/2$$
$$= (2B+3G+2R) \times 1/2$$

Similar approximation is made for the other lines in field A and lines in field B as well.

The chrominance signal is obtained by subtracting adjacent signals one from the other.

For line A1, for instance, the chrominance signal is approximated as $$\begin{aligned} R - Y &= (Ye + Mg) - (Cy + G) \\ &= (2R - G) \end{aligned}$$

For line A2, it is approximated as $$\begin{aligned} -(B - Y) &= (Ye + G) - (Cy - Mg) \\ &= -(2B - G) \end{aligned}$$

Similar approximation is made for the other lines in field A and lines in field B as well, and red color difference signal $R-Y$ and blue color difference signal $-(B-Y)$ are obtained alternately in line sequence.

Figure 8:
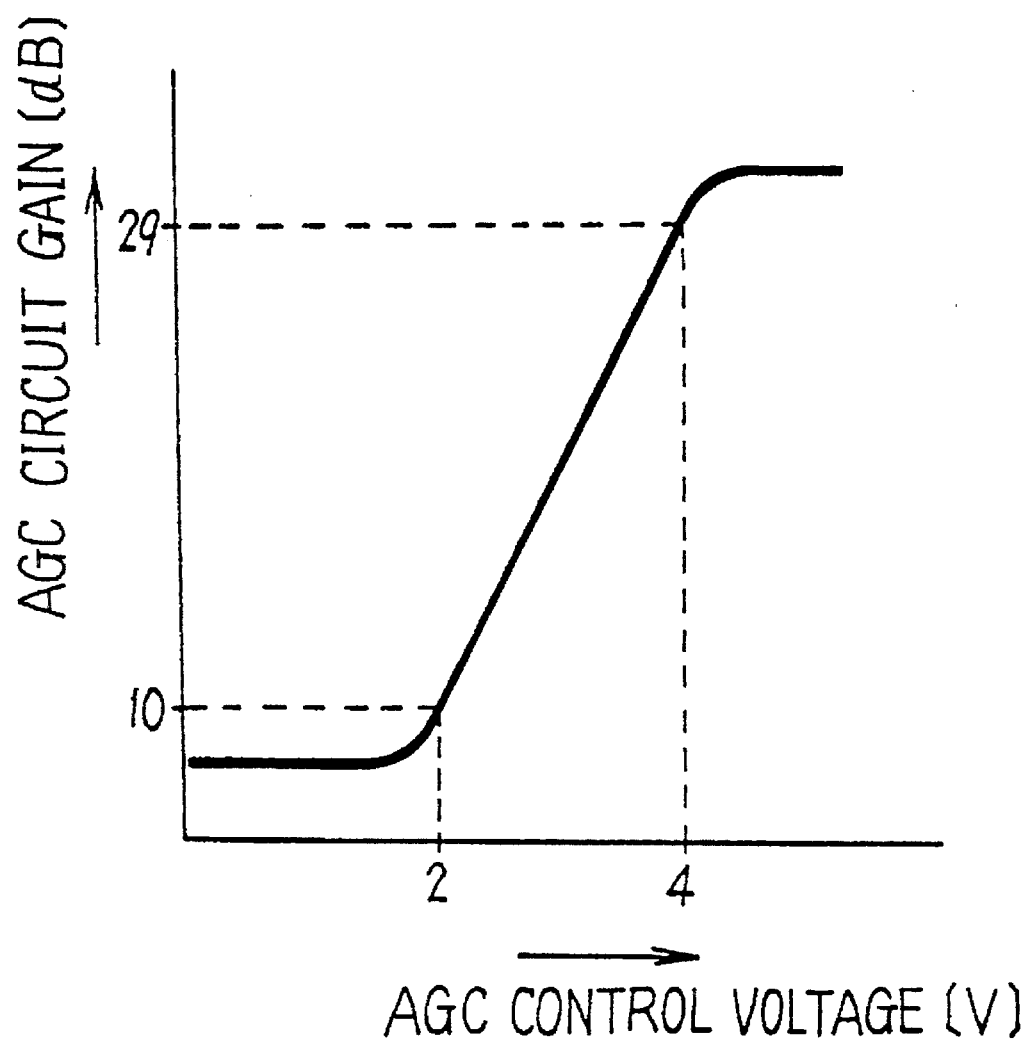
FIG. 8 is a graph showing an AGC circuit gain control characteristic.

Referring to FIG. 2 again, the image pick-up signal output from the CDS circuit 13 is supplied to an AGC circuit 19a. The output signal from the AGC circuit 19a is supplied to a level detector 19b, the output signal of which is in turn supplied as control voltage through a buffer 19c back to the AGC circuit 19a. The control voltage is variable in a range of, for instance, 2 to 4 V for corresponding variation of the gain of the AGC circuit 19a in a range of 10 to 29 dB, as shown in FIG. 8. While the iris 11 is operative, the control voltage is held constant at 2 V.

The image pick-up signal output from the AGC circuit 19a is supplied to a low-pass filter 20, which constitutes a luminance processor. The low-pass filter 20 adds together (i.e., averages) adjacent signals, and thus outputs luminance signal Y.

Figure 6:
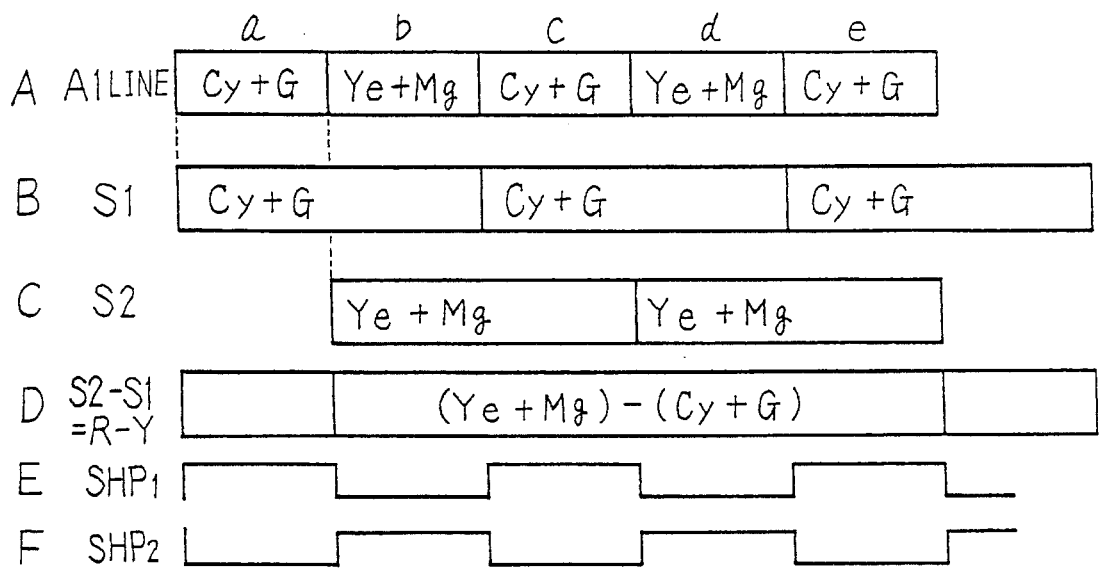
FIG. 6 is a view for explaining color signal processing.
Figure 7:
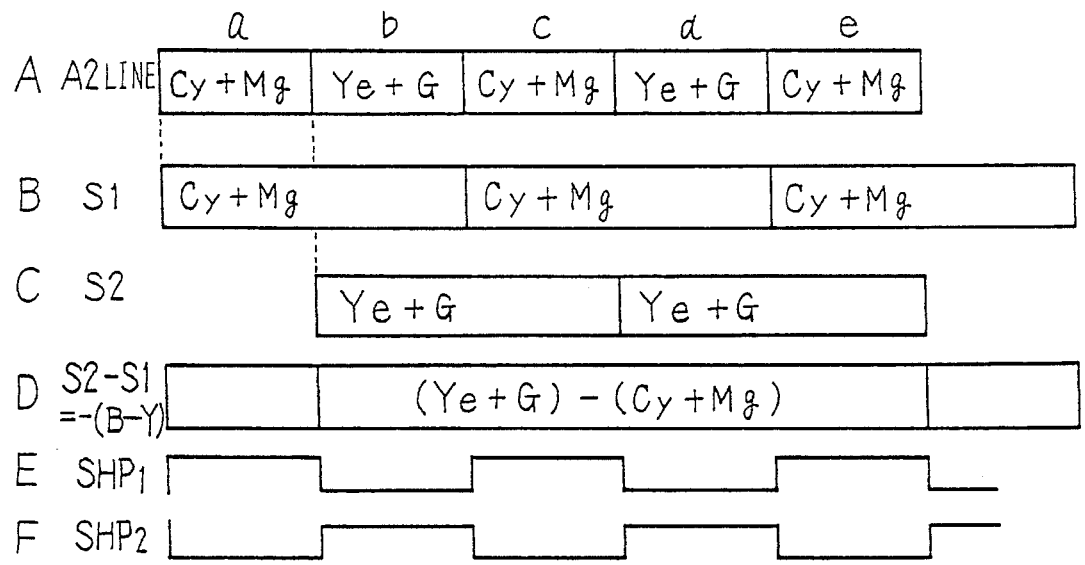
FIG. 7 is another view for explaining color signal processing.

The image pick-up signal output from the AGC circuit 19a is also supplied to sample/hold circuits 21 and 22, which constitute a chrominance processor. To the sample/hold circuits 21 and 22 are supplied sampling pulses SHP1 and SHP2 (shown at E and F in FIGS. 6 and 7) from the timing pulse generator 14.

A continuous signal S1 of (Cy+G) or (Cy+Mg) (as shown at B in FIG. 6 or 7) is output from the sample/hold circuit 21 and supplied to a subtractor 23. Another continuous signal S2 of (Ye+Mg) or (Ye+G) (as shown at C in FIG. 6 or 7) is output from the other sample/hold circuit 22 and supplied to the subtractor 23.

In the subtractor 23, the signal S1 is subtracted from the signal S2. The subtractor 23 thus outputs red color difference signal $R-Y$ and blue color difference signal $-(B-Y)$ alternately in line sequence (as shown at D in FIGS. 6 and 7).

The color difference signal output of the subtractor 23 is supplied directly to a "b" side fixed terminal of a select switch 24 to an "a" side fixed terminal of a select switch 25 also supplied through a delay circuit 26, which provides a delay time of one horizontal scan period, to a "b" side fixed terminal of the select switch 24 and an "a" side fixed terminal of the select switch 25.

The switching of the select switches 24 and 25 is controlled by a controller 27. More specifically, during the horizontal scan period, during which the red color difference signal $R-Y$ is output from the subtractor 23, the select switches 24 and 25 are connected to the "b" side, and during the horizontal scan period, during which the blue color difference signal $-(B-Y)$ is provided, they are connected to the "a" side. To the controller 27 are supplied the sync signals HD and VD as reference sync signals from the sync signal generator 16 and the clock CK1 from the timing pulse generator 14.

Since the select switches 24 and 25 are switched in the above way, in each horizontal scan period the red and blue color difference signals $(R-Y)$ and $-(B-Y)$ are output from the respective select switches 24 and 25.

The luminance Y output from the low-pass filter 20 and color difference signals $(R-Y)$ and $-(B-Y)$ output from the select switches 24 and 25 are supplied to an encoder 28. To the encoder 28 are supplied a composite sync signal SYNC, a blanking signal BLK, a burst flag signal BF and a color subcarrier signal SC from the sync signal generator 16.

In the encoder 28, the sync signal SYNC is added with respect to the luminance signal Y in the well-known manner. With respect to the color difference signals, orthogonal two-phase modulation is effected to form a carrier chrominance signal C, while color burst signal is added. The luminance and chrominance signals Y and C are combined to form an NTSC system color video signal SCV, which is provided at an output terminal 29.

The encoder 28 further outputs a monochromatic video signal SV (i.e., luminance signal Y with sync signal SYNC), which is supplied to an electronic view finder 30, and thus picked-up images are displayed on the small size CRT.

Further, detection signals $S_{IR}$ and $S_{AG}$ from the level detectors 17 and 19b are supplied to the controller 27. When an automatic shutter mode is set up with turning-on of an automatic shutter mode setting switch 31 (not shown in FIG. 1), the controller 27 generates a shutter pulse $P_{SH}$ according to the detection signals $S_{IR}$ and $S_{AG}$. A shutter in the photo-camera section is operated by this shutter pulse $P_{SH}$.

Figure 9:
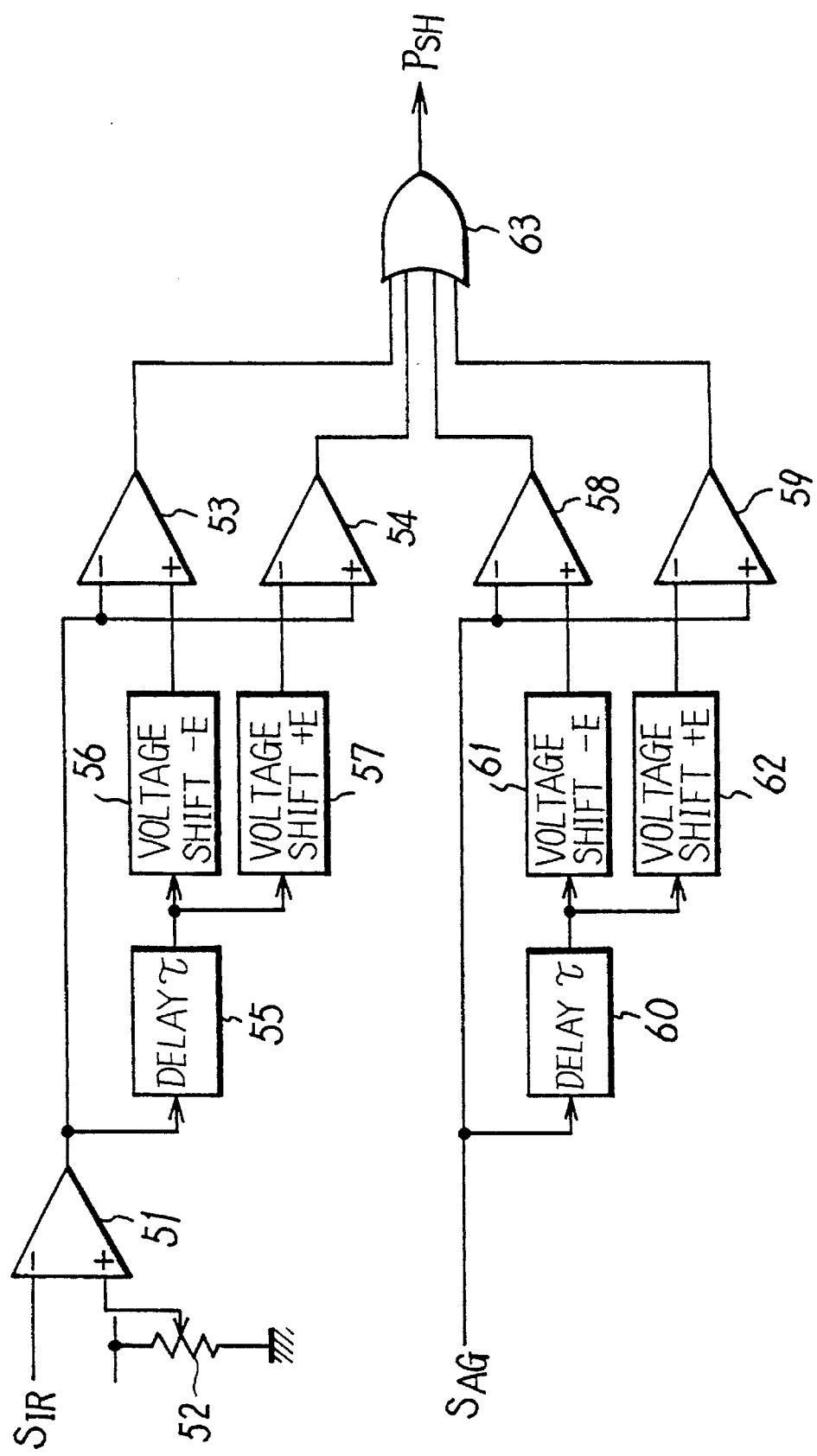
FIG. 9 is a schematic showing a shutter pulse generator.

FIG. 9 shows a shutter pulse generator provided in the controller 27. Referring to the Figure, the detection signal $S_{IR}$ from the level detector 17 is supplied to an inversion input terminal of a DC amplifier 51. A variable resistor 52 is provided for offset voltage control, and the voltage at the tap terminal of the variable resistor 52 is supplied to a non-inversion input terminal of the DC amplifier 51.

Figure 10:
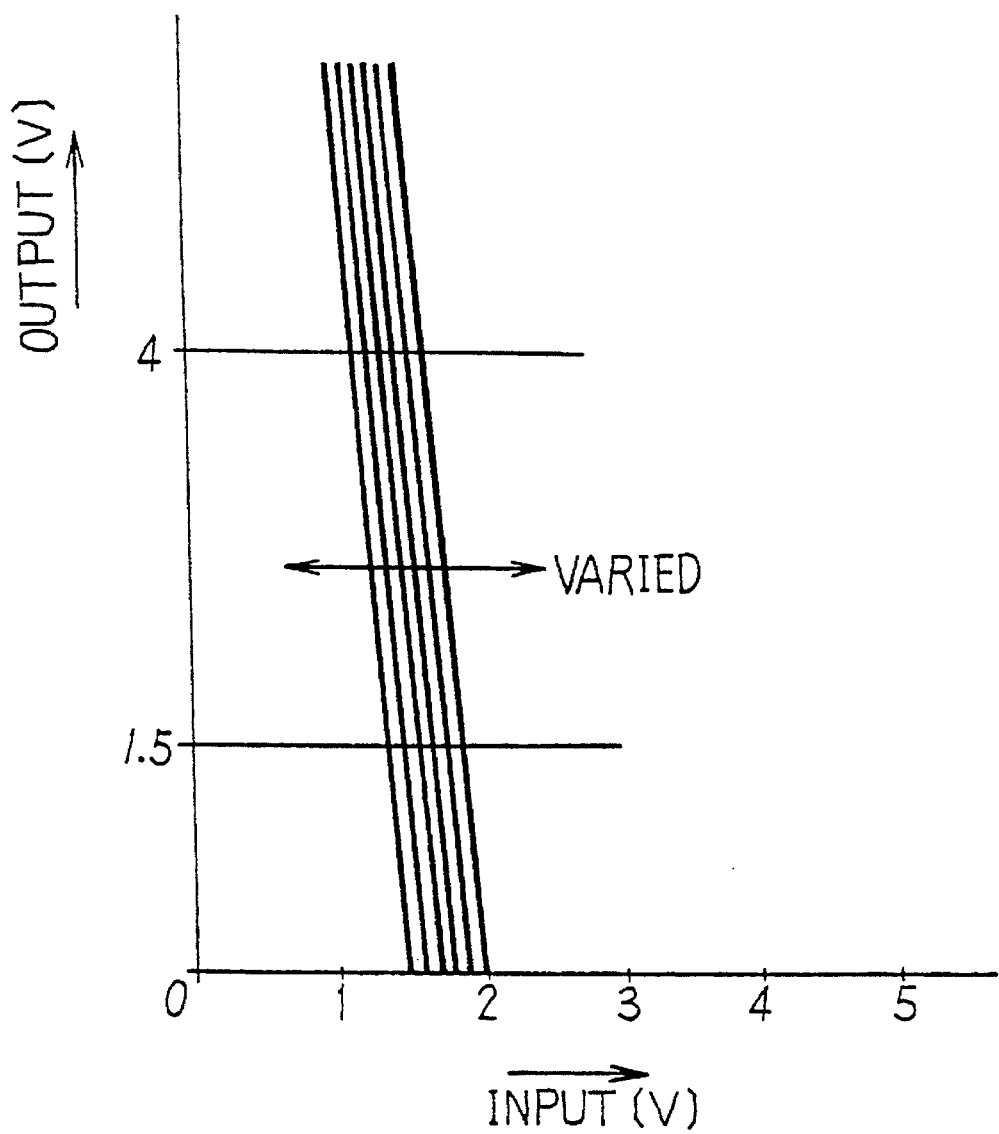
FIG. 10 is a graph showing an input-output characteristic of a DC amplifier.

The output signal of the DC amplifier 51 is variable in a range of, for instance, 1.5 to 4 V according to changes in the detection signal $S_{IR}$. By varying the tap terminal position of the variable resistor 52, the output characteristic of the DC amplifier 51 may be varied as shown in FIG. 10.

The output signal of the DC amplifier 51 is supplied to an inversion input terminal of a comparator 53 and also to a non-inversion terminal of a comparator 54. It is further applied to a delay circuit 55, which provides a delay time τ. The delay time τ is set to be shorter than the time constant of the level detector 17. In this embodiment, the time constant of the level detector 17 is set to one vertical scan period, for instance 1 msec.

The output signal of the delay circuit 55 is supplied through a $-E$ voltage shifter 56 to a non-inversion input terminal of the comparator 53, and it is also supplied through a $+E$ voltage shifter 57 to an inversion input terminal of the comparator 54. The output signals of the comparators 53 and 54 are supplied to an OR gate 63.

The voltage E corresponds to a level difference permitting stable comparison of signals in the comparators 53 and 54. In this embodiment, it is set to 0.1 V.

The detection signal $S_{AG}$ is supplied to an inversion input terminal of a comparator 58 and also to a non-inversion input terminal of a comparator 59. It is further supplied to a delay circuit 60, which provides a delay time τ. The delay time τ is set to be shorter than the time constant of the level detector 19b. In this embodiment, the time constant of the level detector 19b is set to one vertical scan period, for instance 1 msec.

The output signal of the delay circuit 60 is supplied through a −E voltage shifter 61 to a non-inversion input terminal of the comparator 58 and also supplied through a +E voltage shifter 62 to an inversion input terminal of the comparator 59. The output signals of the comparators 58 and 59 are supplied to the OR gate 63.

The voltage E corresponds to a level difference permitting stable comparison of signals in the comparators 58 and 59. In this embodiment, it is set to 0.1 V.

Figure 11:
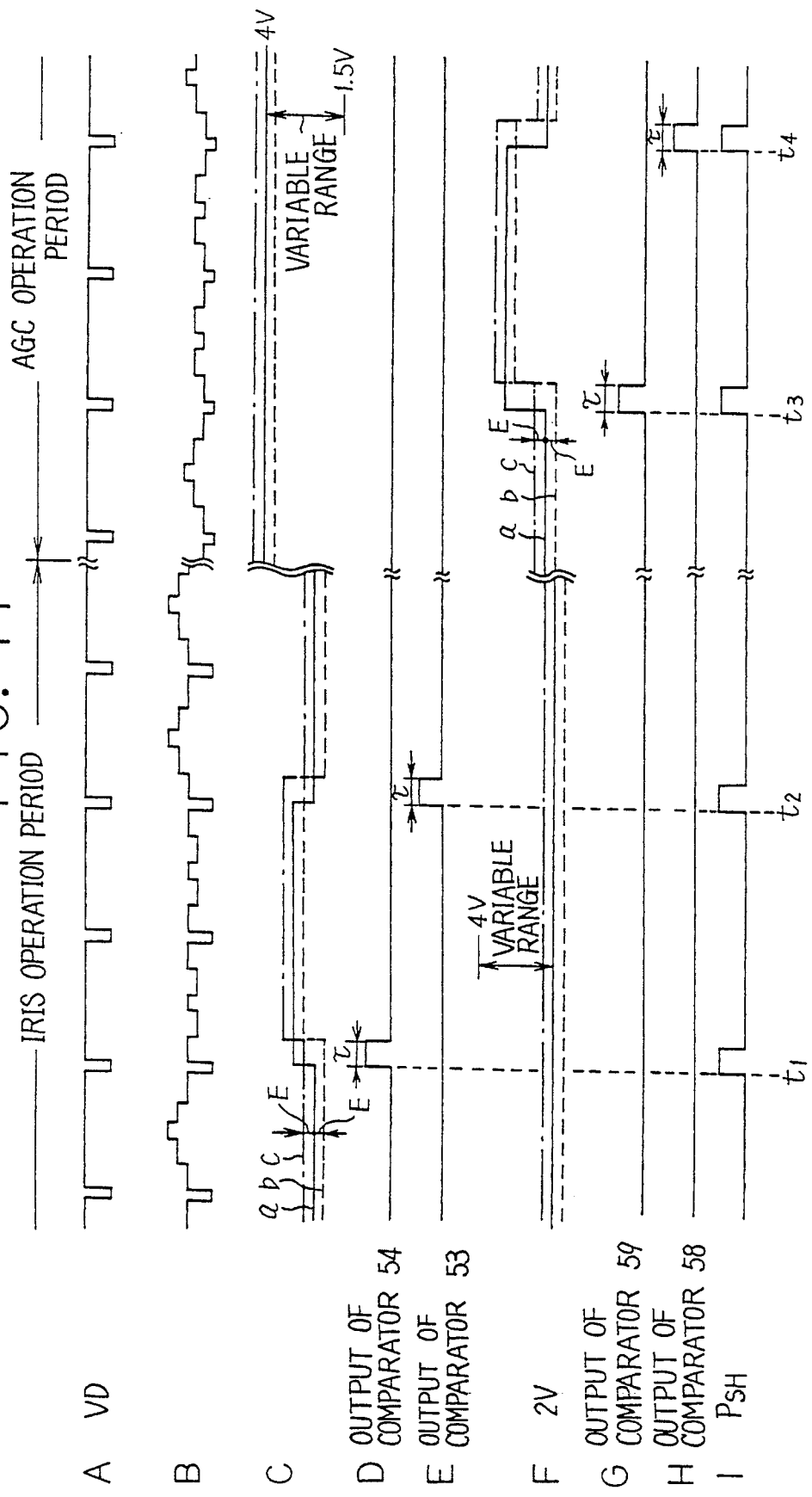
FIG. 11 is a waveform chart illustrating the operation of the shutter pulse generator.

With the above construction, a case will now be considered, in which the image pick-up signal output from the AGC circuit 19a is as shown at B in FIG. 11. Shown at A in FIG. 11 is the vertical sync signal VD.

In an iris operation period (during which the gain of the AGC circuit 19a is constant at 10 dB), the output signal of the DC amplifier 51 is as shown by solid line a at C in FIG. 11, the output signal of the voltage shifter 56 is as shown by dashed line b, and the output signal of the voltage shifter 57 is as shown by phantom line c.

Thus, for a period of τ from an instant t1, at which the level of the image pick-up signal is changed to a lower level, the signal supplied to the non-inversion input terminal of the comparator 54 is higher than the signal supplied to the inversion input terminal, and thus the comparator 54 outputs a high level signal, as shown at D in FIG. 11.

For a period of τ from an instant t2, at which the level of the image pick-up signal is changed to a higher level, the signal supplied to the non-inversion input terminal of the comparator 53 is higher than the signal supplied to the inversion input terminal, and thus the comparator 53 outputs a high level signal, as shown at E in FIG. 11.

The input-output characteristic of the DC amplifier 51 may be changed by changing the tap terminal position of the variable resistor 52 as noted above. Thus, it is possible to saturate the high or low level side of the detection signal $S_{IR}$, thus permitting the change in that portion of the image pick-up signal to be ignored. In this way, it is possible to suppress generation of shutter pulse $P_{SH}$.

In an AGC operation period (during which the iris 11 is open), the detection signal $S_{AG}$ is as shown by solid line a at F in FIG. 11, the output signal of the voltage shifter 61 is as shown by dashed line b, and the output signal of the voltage shifter 62 is as shown by phantom line c.

Thus, for a period of τ from an instant t3, at which the level of the image pick-up signal is changed to a lower level, the signal supplied to the non-inversion input terminal of the comparator 59 is higher than the signal supplied to the inversion input terminal, and thus the comparator 59 outputs a high level signal as shown at G in FIG. 11.

For a period of τ from an instant t4, at which the level of the image pick-up signal is changed to a lower level, the signal supplied to the non-inversion input terminal of the comparator 58 is higher than the signal supplied to the inversion input terminal, and thus the comparator 58 outputs a high level signal, as shown at H in FIG. 11.

In the above way, when the level of the image pick-up signal is changed in the iris and AGC operation periods, a high level signal is provided from the comparator 53, 54, 58 or 59, and this signal is output as the shutter pulse $P_{SH}$ from the OR gate 63, as shown at I in FIG. 11.

When the mode setting switch 33 is "off", a shutter pulse $P_{SH}$ can be generated from the controller 27 by depressing the shutter button 7.

Usually, when the status of the foreground object zone is changed with movement of a person or an object, the level of the image pick-up signal output from the image pick-up device 12 is changed. In this embodiment, in the automatic shutter mode, in which the mode setting switch 31 is "on", a shutter pulse $P_{SH}$ is generated in response to an image pick-up signal level change. In other words, when the status of the foreground object is changed, a shutter pulse $P_{SH}$ is generated to automatically operate the shutter of the photo-camera. Thus, this embodiment can be conveniently used for the monitoring purpose.

In this embodiment, the shutter of the photo-camera section is operated by a shutter pulse $P_{SH}$. However, where a still image recorder is connected, it is possible to latch one image frame of signal according to the shutter pulse $P_{SH}$.

Further, while in this embodiment the video camera and photo-camera are integral, the invention may also be applied to a video camera, which may be used by securing a separate photo-camera to it.

Figure 12:
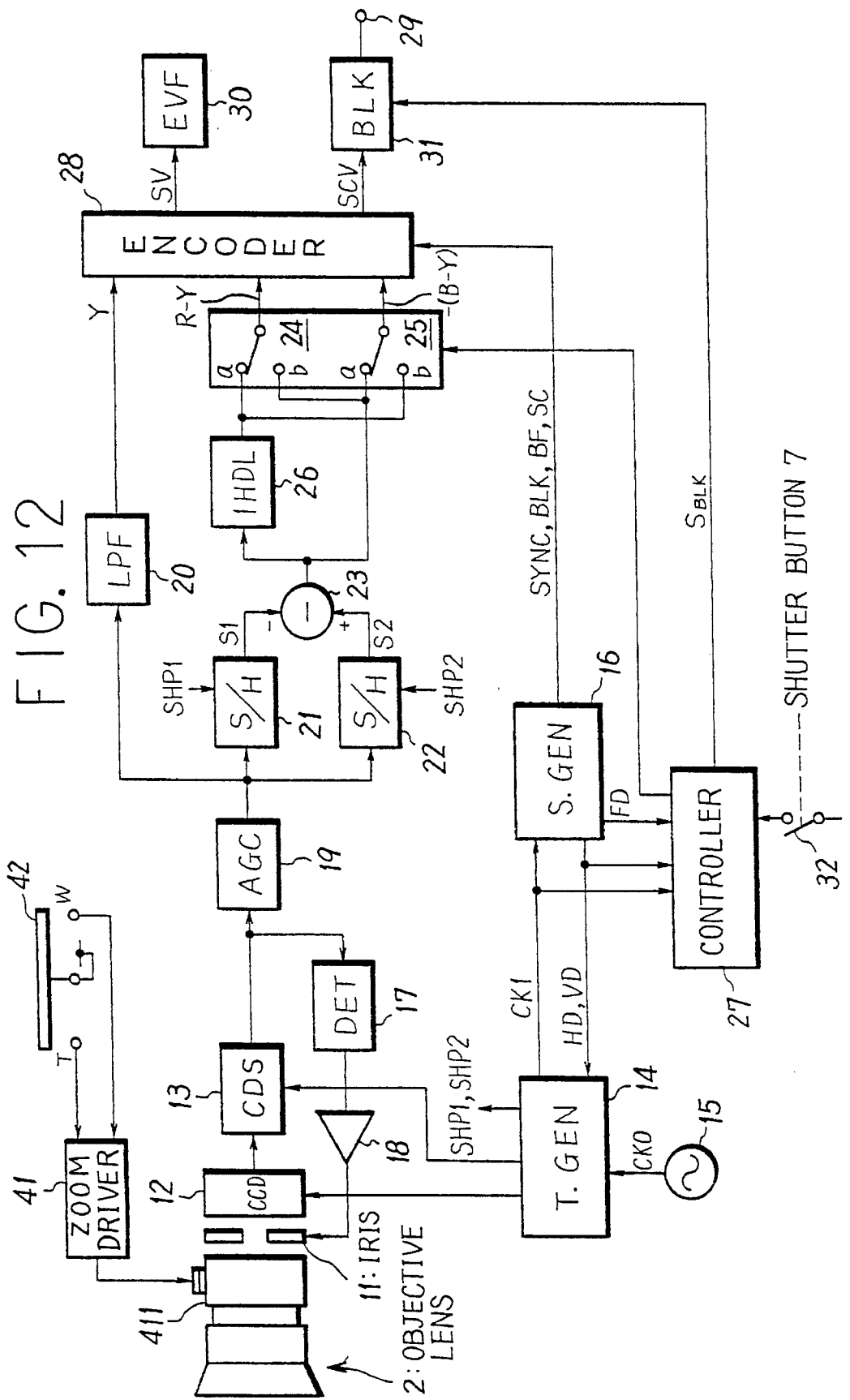
FIG. 12 is a schematic representation of a different video camera section.

Now, a different embodiment of the invention will be described. FIG. 12 is a schematic representation of the video camera section of this embodiment. In FIG. 12, parts like those in FIG. 2 are designated by like reference numerals, and they are not described any further.

In this embodiment, the output signal of the CDS circuit 13 is level controlled in an AGC circuit 19 before being supplied to low-pass filter 20 and sample/hold circuits 21 and 22.

The AGC circuit 19 corresponds to a circuit part constituted by the AGC circuit 19a, level detector 19b and buffer 19c in FIG. 2. The color video signal SCV output from encoder 28 is led through a blanking circuit 31 to output terminal 29.

The blanking operation of the blanking circuit 31 will now be described. This operation is controlled by controller 27.

To the controller 27 is connected a detection switch 32 which detects the depression of the shutter button 7 (see FIG. 1). When the detection switch 32 is turned on with the depression of the shutter button 7, a blanking signal $S_{BLK}$ is formed in the controller 27 and supplied to the blanking circuit 31 for a period of the succeeding 30 frames.

Figure 13:
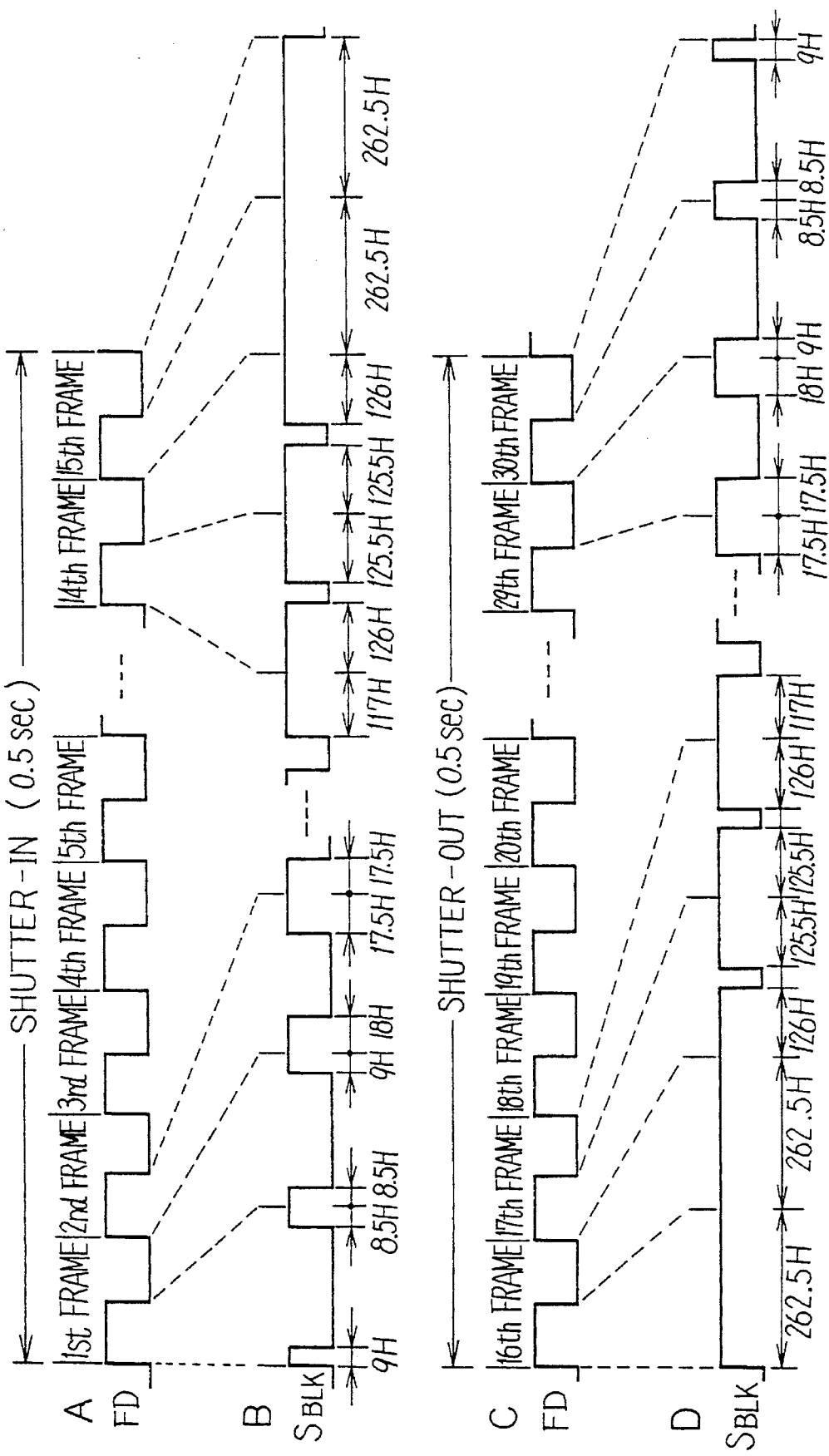
FIG. 13 is a view showing a blanking signal pattern.

FIG. 13 shows an example of the pattern of the blanking signal $S_{BLK}$. The blanking signal $S_{BLK}$ is formed in synchronism to the field pulse FD (shown at A and C in FIG. 13).

In the odd field of the 1-st frame, the blanking period is set to be 9 H (H being the horizontal scan period) from the first and 8.5 H from the last. In the subsequent even field, it is set to be 8.5 H from the first and 9 H from the last. In the subsequent 2-nd to 14-th frames, it is set by adding 9 H to each of its first and last portions in the preceding field. In the 15-th frame, it is set as the entire frame period (see the high level period at B in FIG. 13).

In the 16-th frame, the blanking period is set as the entire frame period. In the odd field of the 17-th frame, it is et to be 126 H from the first and 125.5 H from the last. In the subsequent even field, it is set to be 125.5 H from the first and 126 H from the last. In the subsequent 18-th to 30-th frames, it is set by subtracting 9 H from each of its first and last portions in the preceding field (see the high level period at D in FIG. 13).

Figure 14:
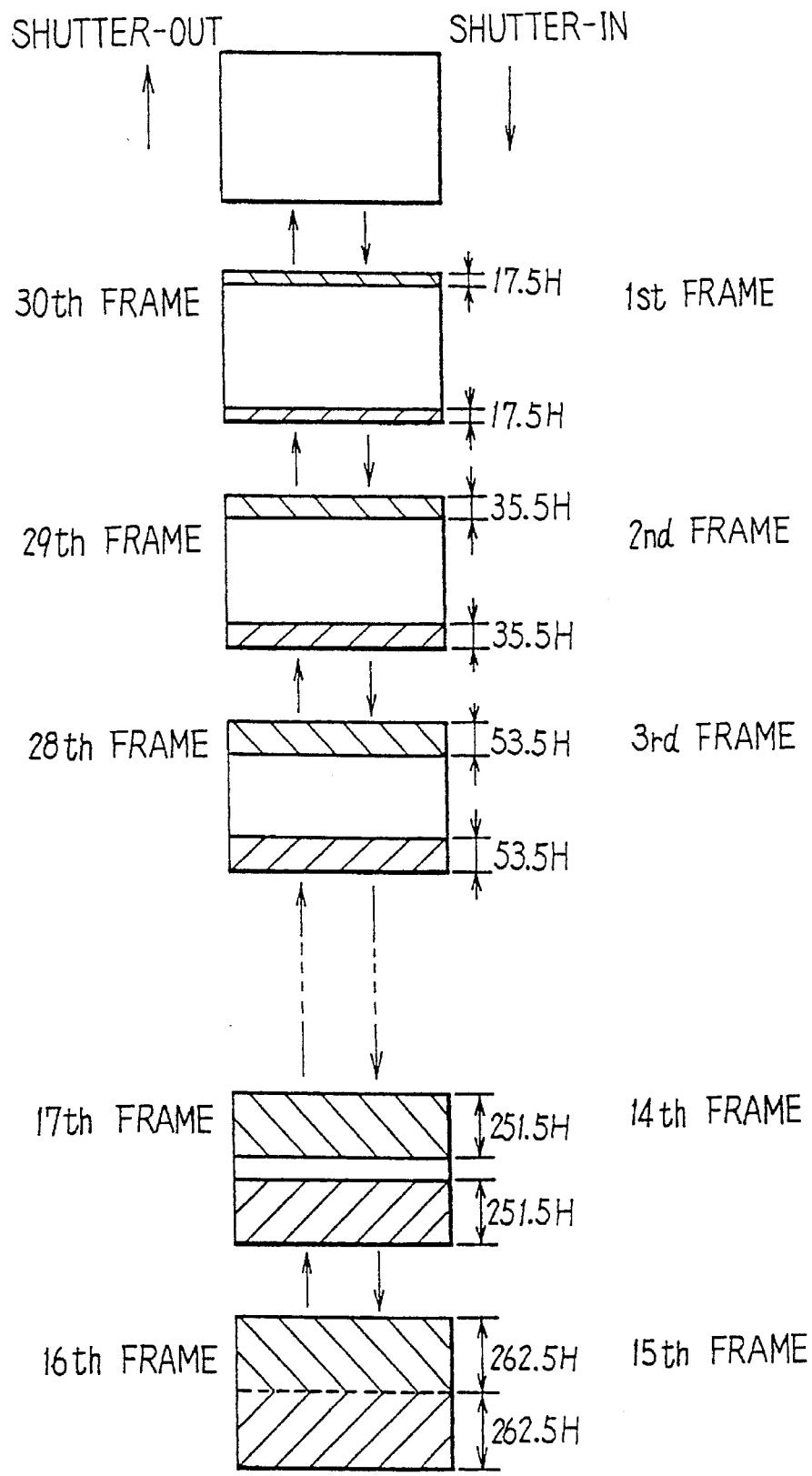
FIG. 14 is a view showing blanking area change.

The blanking circuit 31 is rendered operative during the blanking period represented by the blanking signal $S_{BLK}$. When the blanking period sets in, the color video signal SCV led to the output terminal 29 vanishes. Thus, the image produced by the color video signal obtained at the output terminal 29 has a varying blanking area as shown shaded in FIG. 14, that is, it is provided with a shutter effect.

More specifically, in the shutter-in period (0.5 sec.) of the 1-st to 15-th frames, the blanking area is gradually increased from the top and bottom of the image frame toward the center thereof, and eventually it covers the entire image frame. In this way, a shutter-in effect is provided. In the subsequent shutter-out period (0.5 sec.) of the 16-th to 30-th frames, the blanking area is gradually reduced from the center of the image frame toward the top and bottom thereof. In this way, a shutter-out effect is provided.

In this embodiment, when the photo-camera shutter is operated by depressing the shutter button 7, a shutter effect is provided to the color video signal obtained from the output terminal 29 by using a period (1 sec.) of subsequent 30 frames. Thus, at the time of the video signal reproduction on the VTR it is possible to readily know picture frames that were picked up by the photo-camera.

Further, in this embodiment the shutter effect is provided using 30 frames (1 sec.), but this number of frames is by no means limitative. In addition, while the blanking area is varied such that it increases gradually from the top and bottom of the image frame toward the center thereof and then decreases gradually from the center of the image frame toward the top and bottom thereof, it is possible to cause blanking area variation in other patterns. The number of frames used and the blanking area variation pattern may be readily changed by changing the pattern of the blanking signal $S_{BLK}$.

Further, in this embodiment a shutter effect is provided to the color video signal SCV whenever the shutter button 7 is depressed, but it is possible to provide choice means whether or not to provide a shutter effect.

Further, while in this embodiment the video camera and photo-camera are integral, the invention may also be applied to a video camera, which may be used by securing a separate photo-camera to it.

Further, while this embodiment is applied to a video camera for obtaining NTSC system color video signals, the invention may of course be applied to video cameras for obtaining other system video signals as well.

Figure 15:
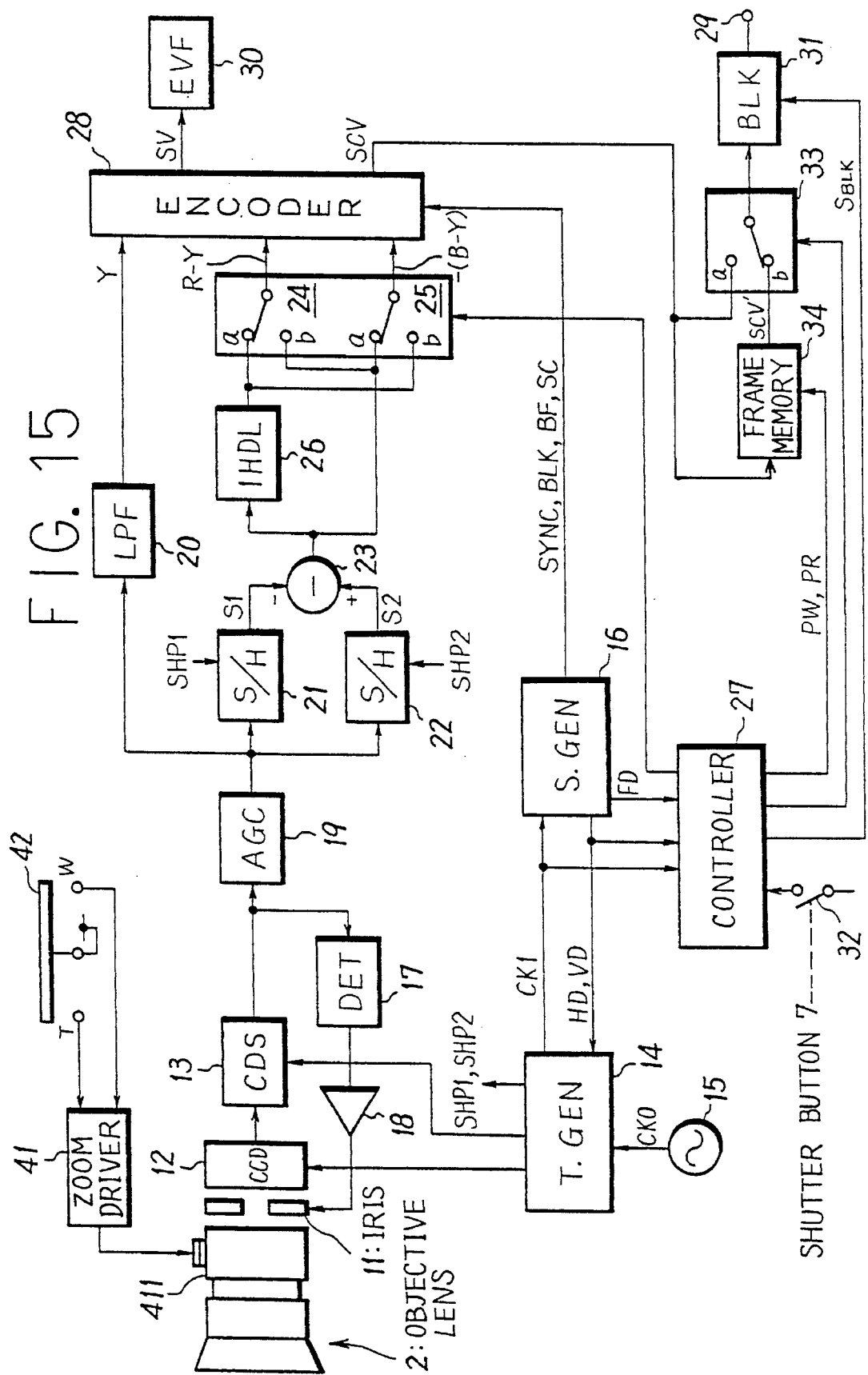
FIG. 15 is a schematic representation of a further video camera section.

Now, a further embodiment of the invention will be described. FIG. 15 is a schematic representation of the video camera section of this embodiment. In FIG. 15, parts like those in FIG. 2 are designated by like reference numerals, and they are not described any further.

In this embodiment, the output signal of CDS circuit 13 is level controlled in an AGC circuit 19 before being supplied to low-pass filter 20 and sample/hold circuits 21 and 22. The AGC circuit 19 corresponds to a circuit part constituted by the AGC circuit 19a, level detector 19b and buffer 19c in FIG. 2.

The color video signal SCV output from encoder 28 is supplied to an "a" side fixed terminal of a select switch 33 and also supplied as a write signal to a frame memory 34. Video signal SCV' read out from the frame memory 34 is supplied to a "b" side fixed terminal of the select switch 33. The video signal output from the select switch 33 is led through a blanking circuit 31 to output terminal 29.

Now, the operation of switching the select switch 33, write and read operations with respect to the frame memory 34 and blanking operation of the blanking circuit 31 will be described. These operations are controlled by controller 27.

To the controller 27 is connected a detection switch 32 which detects the depression of the shutter button (see FIG. 1). When the detection switch 32 is turned on with depression of the shutter button 7 (as shown at B in FIG. 16, shown at A in the same Figure being field pulse FD), in a subsequent one frame period, the frame memory 34 is held in a write state, and one frame of video signal SCV is written in it (write pulse PW being shown at C in FIG. 16).

Figure 16:
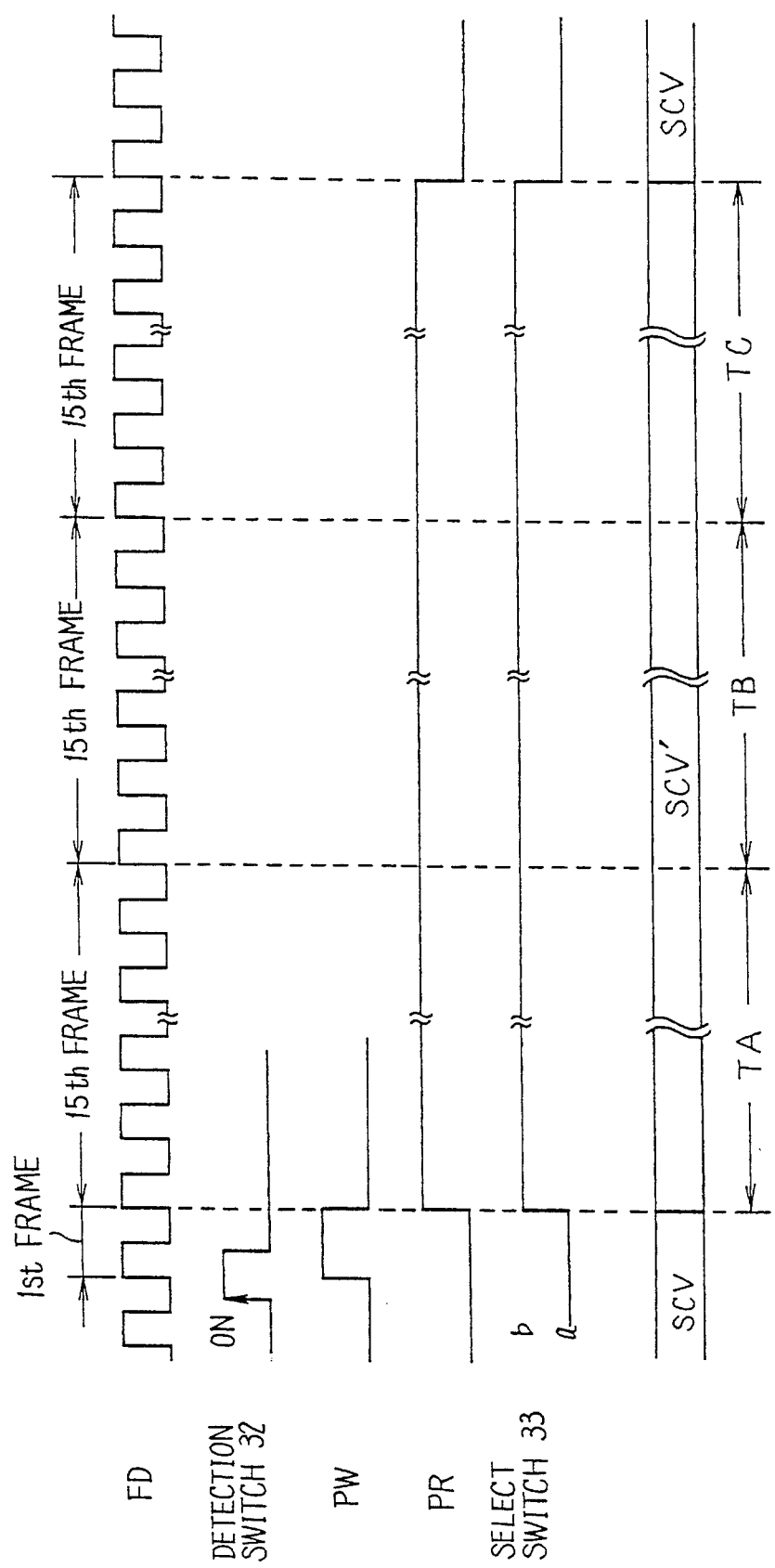
FIG. 16 is a waveform chart for explaining the operation of frame memory and select switch.

In subsequent 45 frame period, the frame memory 34 is held in a read state, and one frame of video signal is read out repeatedly (read pulse RP being shown at D in FIG. 16).

The select switch 33 is held connected to the "b" side for the 45 frame period, during which the frame memory 34 is held in the read state, while it is held connected to the "a" side for the other period (as shown at E in FIG. 16). Thus, for all but one of the next 45 frame periods after the depression of the shutter button 7, the select switch 33 outputs video signal SCV' read out from the frame memory 34, while for the other period it outputs the real time video signal SCV output from the encoder 28 (as shown at F in FIG. 16). The video signal SCV' is a repetition of the next one frame period video signal after depression of the shutter button 7.

The 45 frame period is divided into three division periods TA to TC each being a 15 frame period. The blanking circuit 31 is held operative for the first and last division periods TA and TC and inoperative for the intermediate division period TB.

Figure 17:
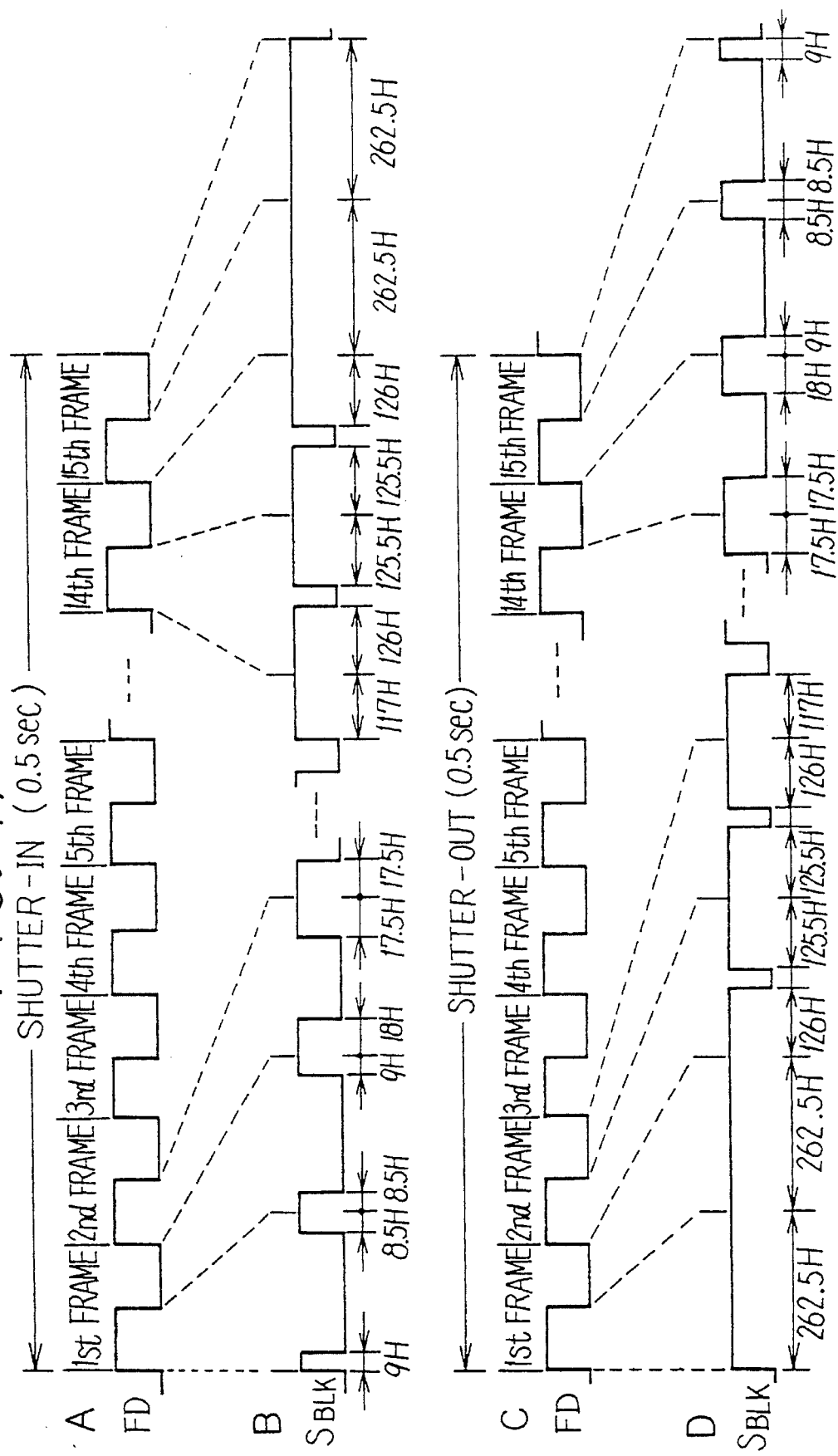
FIG. 17 is a view showing a blanking signal pattern.

Shown at B in FIG. 17 is an example of the pattern of the blanking signal $S_{BLK}$ in the division period TA. The blanking signal $B_{BLK}$ is formed in synchronism to field pulse FD (as shown at A in FIG. 17).

In the odd field of the 1-st frame, the blanking period is set to be 9 H (H being the horizontal scan period) from the first and 8.5 H from the last. In the subsequent even field, it is set to 8.5 H from the first and 9 H from the last. In the subsequent 2-nd to 14-th frames, it is set by adding 9 H to each of its first and last portions in the preceding period. In the 15-th frame, it is set as the entire frame period (see the high level period at B in FIG. 7).

Shown at D in FIG. 17 is an example of the pattern of the blanking signal $S_{BLK}$ in the division period TC. The blanking signal $S_{BLK}$ is formed in synchronism to field pulse FD (as shown at C in FIG. 17). In the 1-st frame, the blanking period is set as the entire frame period. In the odd field of the 2-nd frame, it is set to be 126 H from the first and 125.5 H from the last. In the subsequent even field, it is set to be 125.5 H from the first and 125.5 H from the last. In the subsequent 3-rd to 15-th frames, it is set by subtracting 9 H from each of its first and last portions in the preceding field (see the high level period at D in FIG. 17).

Figure 18:
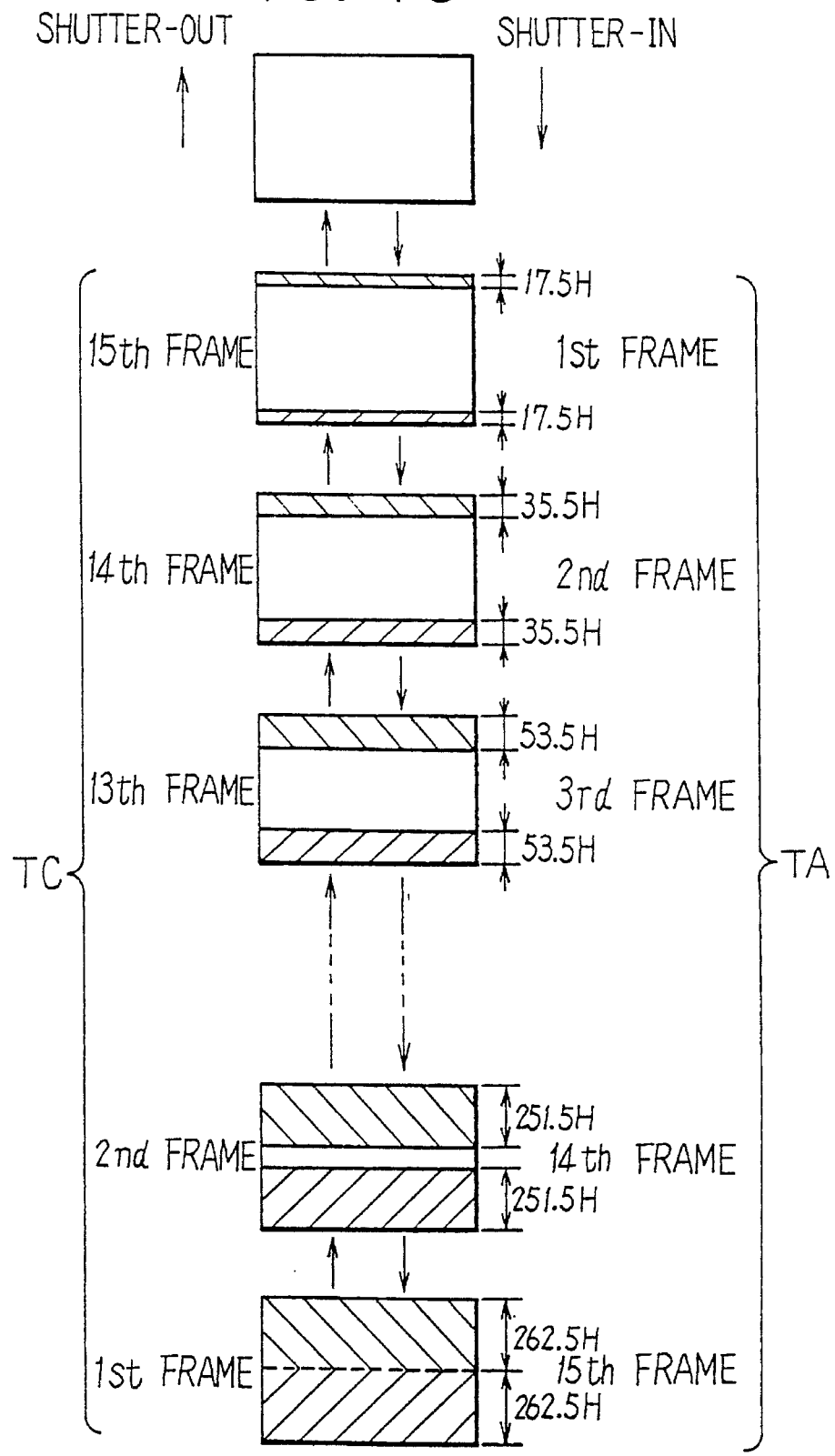
FIG. 18 is a view showing blanking area change.

The blanking circuit 31 is rendered operative during the blanking period represented by the blanking signal $S_{BLK}$. When the blanking period sets in, the color video signal SCV led to the output terminal 29 vanishes. Thus, the image produced by the color video signal obtained at the output terminal 29 has a varying blanking area as shown shaded in FIG. 18, that is, it is provided with a shutter effect.

More specifically, in the 1-st to 15-th frames (0.5 sec.) constituting the division period TA, the blanking area is gradually increased from the top and bottom of the image frame toward the center thereof, and eventually it covers the entire frame. In this way, a shutter-in effect is provided. In the 1-st and 15-th frames (0.5 sec.) constituting the division period TC, the blanking area is gradually reduced from the center of the image frame toward the top and bottom thereof. In this way, a shutter-out effect is provided.

In this embodiment, when the photo-camera shutter is operated by depressing the shutter button 7, a shutter effect is provided to the color video signal obtained from the output terminal 29 in the division periods TA and TC. Thus, at the time of the video signal reproduction on the VTR it is possible to readily know picture frames that were picked up by the photo-camera.

Further, in the intermediate division period TB between the division periods TA and TC, the video signal from the select switch 33 is directly led to the output terminal 29. The video signal from the select switch 33 in the division period TB, is the video signal SCV' read out from the frame memory 34, that is, a repetition of the next one frame period video signal SCV after the depression of the shutter button 7. Thus, at the time of the video signal reproduction on the VTR, images picked up by the photo-camera can be confirmed as still images.

Further, while in this embodiment the shutter effect is provided using 15 frames (i.e., 0.5 sec.), this number of frames is by no means limitative. In addition, while the blanking area is varied such that it increases gradually from the top and bottom of the image frame toward the center thereof and then decreases gradually from the center of the image frame toward the top and bottom thereof, it is possible to cause blanking area variation in other patterns. The number of frames used and the blanking area variation pattern may be readily changed by changing the pattern of the blanking signal $S_{BLK}$.

Further, while this embodiment used the frame memory 34 for writing the video signal SCV therein, it is possible to use a field memory for writing one field therein. Further, the memory 34 and select switch 33 may be disposed before the encoder 28. In this case, they have to be provided for each of the luminance signal Y and chrominance signals (R–Y) and –(B–Y).

Further, while in this embodiment the video signal SCV' read out from the frame memory 34 is used as the output video signal even in the division periods TA and TC as well, it is possible to let the read time video signal SCV from the encoder 28 be used for these periods.

Further, while in this embodiment a shutter effect is provided to the color video signal SCV whenever the shutter button 7 is depressed, it is possible to provide choice means as to whether or not to provide a shutter effect.

Further, while in this embodiment the video camera and photo-camera are integral, the invention may also be applied to a video camera, which may be used by securing a separator photo-camera to it.

Further, while this embodiment is applied to a video camera for obtaining NTSC system color video signals, the invention may of course be applied to video cameras for obtaining other system video signals as well.

Figure 19:
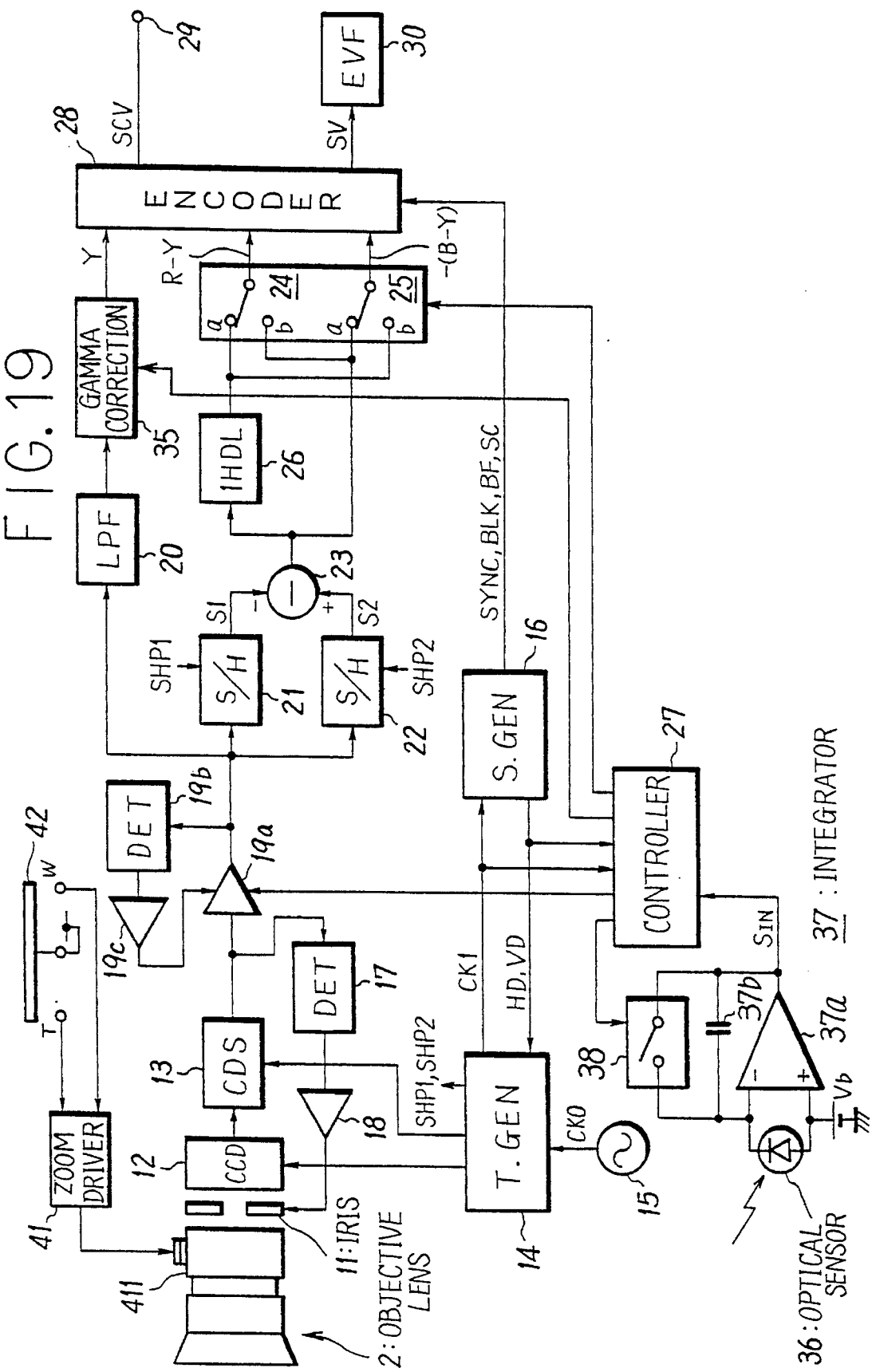
FIG. 19 is a schematic representation of a further video camera section.

Now, a further embodiment of the invention will be described. FIG. 19 is a schematic representation of the video camera section of this embodiment. In FIG. 19, parts like those in FIG. 2 are designated by like reference numerals, and they are not described any further.

In this embodiment, the luminance signal Y output from low-pass filter 20 is supplied through a gamma correction circuit 35 to encoder 28. A gamma correction circuit is intrinsically provided in the case of FIG. 2 as well, although it is not shown in FIG. 2.

Designated at 36 is an optical sensor which has substantially the same characteristic as that of each pixel optical sensor in image pick-up device 12. The output signal of the optical sensor 36 is supplied to an integrator 37 which includes an operational amplifier 37a and a capacitor 37b.

A switch 38 is connected in parallel with the capacitor 37b, and it is on-off controlled by controller 27. The switch 38 is turned on at an instant when a read pulse is supplied from timing pulse generator 14 to the image pick-up device 12. At this moment, the capacitor 37b is charged. As a result, the output signal $S_{IN}$ of the integrator 37 is reset to Vb.

Since the optical sensor 36 has substantially the same characteristic as that of each pixel optical sensor in the image pick-up device 12 and is in parallel with the capacitor 37 which is charged at the moment of the delivery of a read pulse to the image pick-up device 12, the output signal $S_{IN}$ of the integrator 37 right before the switch 38 is turned on, corresponds to charge accumulated in the image pick-up device 12, i.e., the level of the image pick-up signal output from the image pick-up device 12 in the succeeding field.

The output signal $S_{IN}$ is supplied to the controller 17. When the level of the output signal $S_{IN}$ exceeds a predetermined level $V_{TH}$, the controller 27 effects control such that the gain of AGC circuit 19a is reduced by more as the difference between the output signal $S_{IN}$ and predetermined level $V_{TH}$ becomes greater. The level $V_{TH}$ is set to be slightly lower than the level reached by the output signal $S_{IN}$ of the integrator 37, for instance at the time of strobic light emission.

Figure 20:
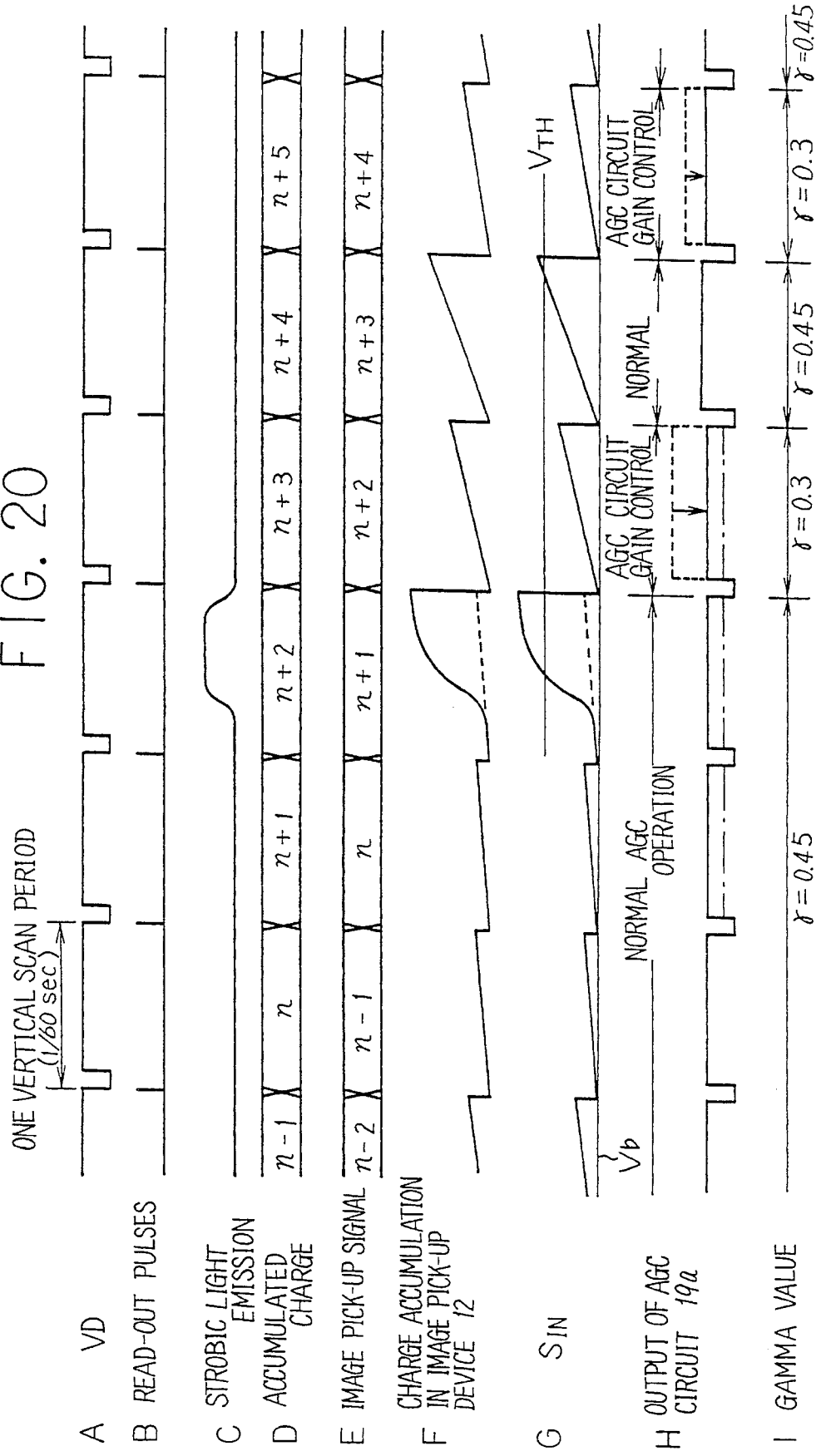
FIG. 20 is a waveform chart illustrating the operation of AGC circuit.

In FIG. 20, shown at A to E, respectively, are the vertical sync signal, read pulse of the image pick-up device 12, charge accumulated in the image pick-up device 12 in each field and image pick-up signal in each field in the above structure.

When strobic light emission is caused in correspondence to an (n+2)-th field as shown at C in FIG. 20, charge accumulated in each pixel of the image pick-up device 12 is greatly increased in the (n+2)-th field (as shown at F in FIG. 20), and also the output signal $S_{IN}$ of the integrator 37 is similarly changed (as shown at G in FIG. 20). Dashed lines shown at F and G occur in the absence of the strobic light emission.

In the (n+2)-th field, in which the strobic light emission is caused, the level of the output signal $S_{IN}$ of the integrator 37 exceeds the predetermined level $V_{TH}$. Therefore, in the next field, i.e., in the field, in which the image pick-up signal of the (n+2)-th field is output, the gain of the AGC circuit 19a is reduced to suppress the level of the image pick-up signal output from the AGC circuit 19a.

Shown at H in FIG. 20 is the image pick-up signal output from the AGC circuit 19a. The image pick-up signal of the (n+2)-th field has a level as shown by the solid line. In the case where normal AGC action is provided, the gain of the AGC circuit 19a is substantially equal to that of substantially the preceding field, and the image pick-up signal output from the AGC circuit 19a will have a level excessively increased to such an extent as to cause saturation (as shown by the phantom line). In this embodiment, however, the gain of the AGC circuit 19a is reduced as noted above. Thus, the image pick-up signal is not excessively increased (as shown by the solid line). The dashed line shows the level in the case of absence of strobic light emission and also absence of the AGC action. The phantom lines corresponding to the image pick-up signal in the n-th and (n+1)-th fields indicate the level in the absence of the AGC action.

In the example of FIG. 20, charge accumulated in each pixel of the image pick-up device 12 may occasionally be increased greatly even in the (n+4)-th field, causing the level of the output signal $S_{IN}$ of the integrator 52 to exceed the predetermined level $V_{TH}$. In such case, in the next field the gain of the AGC circuit 19a is reduced to suppress the level of the image pick-up signal output from the AGC circuit 19a, thus suppressing the saturation. The dashed line corresponding to the image pick-up signal in the (n+4)-th field shown at H in FIG. 20 indicates the level when normal AGC action is provided.

Where the gain of the AGC circuit 19a is controlled such as to be reduced to prevent the saturation, principally the level is reduced down to the black level range, free from the saturation. In this embodiment, the controller 27 controls the gamma value of the gamma correction circuit 31 to prevent image quality deterioration in the black level range.

Figure 21:
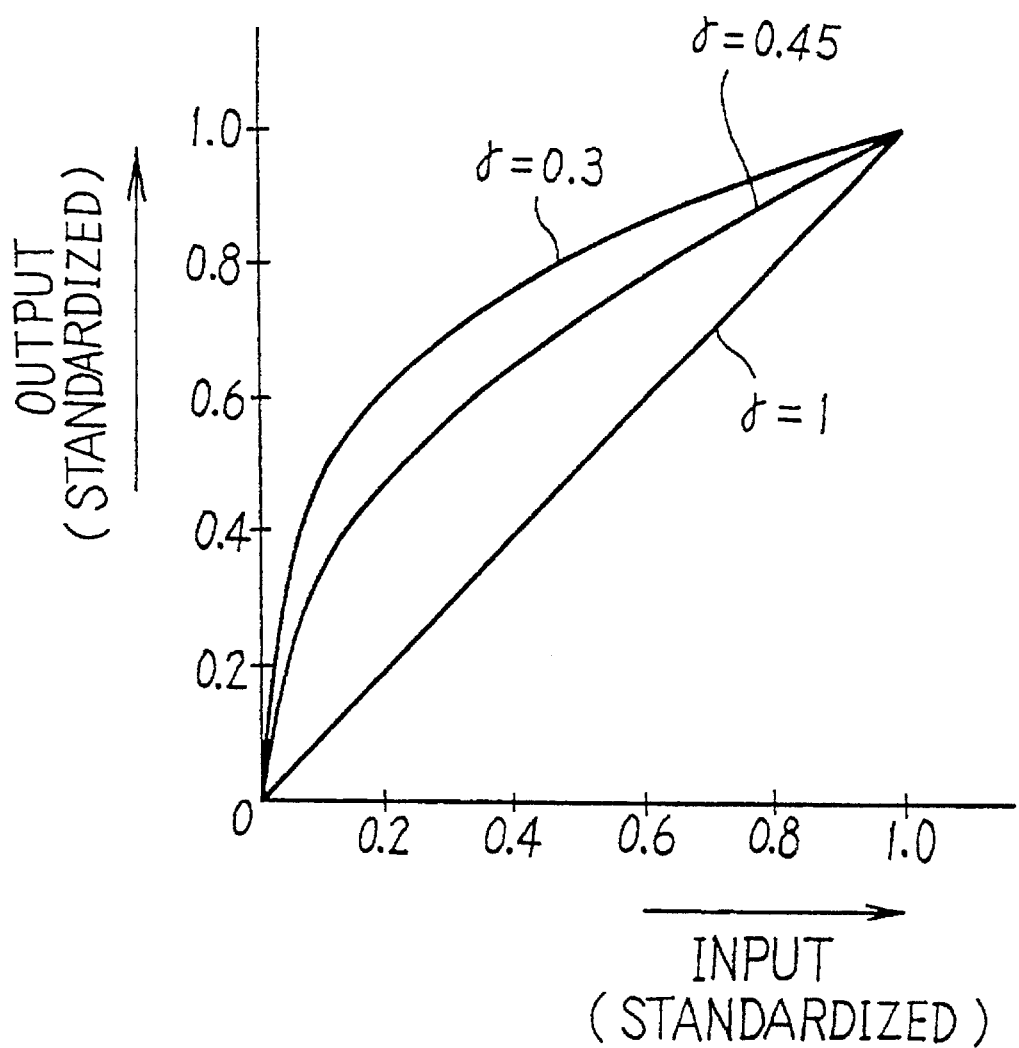
FIG. 21 is a graph showing the gamma characteristic of gamma correction circuit.

Since the gamma value of the image reception tube is usually 2.2, the gamma value of the gamma correction circuit 31 is usually 0.45. Where the gain of the AGC circuit 19a is controlled to be reduced, it is set to 0.3 (as shown at I in FIG. 20). FIG. 21 shows gamma characteristics in cases of γ=0.3, γ=0.45 and γ=1. Thus, the level reduction is suppressed for the black level range compared to the white level range. In this way, sufficient contrast can be provided for the black level range to prevent deterioration of the image quality.

As shown, in this embodiment when the output signal $S_{IN}$ of the integrator 37 (corresponding to the level of the image pick-up signal output from the image pick-up device 12 in the next field) exceeds a predetermined level, the gain of the AGC circuit 19a is forcibly reduced in the next field. In this way, excessive increase of the image pick-up signal in the AGC circuit 19a can be avoided to prevent saturation due to strobic light emission or the like.

Further, since the gamma value of the gamma correction circuit 31 is controlled to 0.3 when controlling the gain of the AGC circuit 19a to be reduced, the level reduction in the black level range can be suppressed compared to the white level range, thus permitting sufficient contrast to the black level range to prevent image quality deterioration.

While the image pick-up device 12 in this embodiment was of the field charge accumulation type, the invention is of course applicable to the frame charge accumulation type as well.

Further, while in this embodiment the video camera and photo-camera were integral, the invention may also be applied to a video camera, which may be used by securing a separate photo-camera to it.

Figure 22:
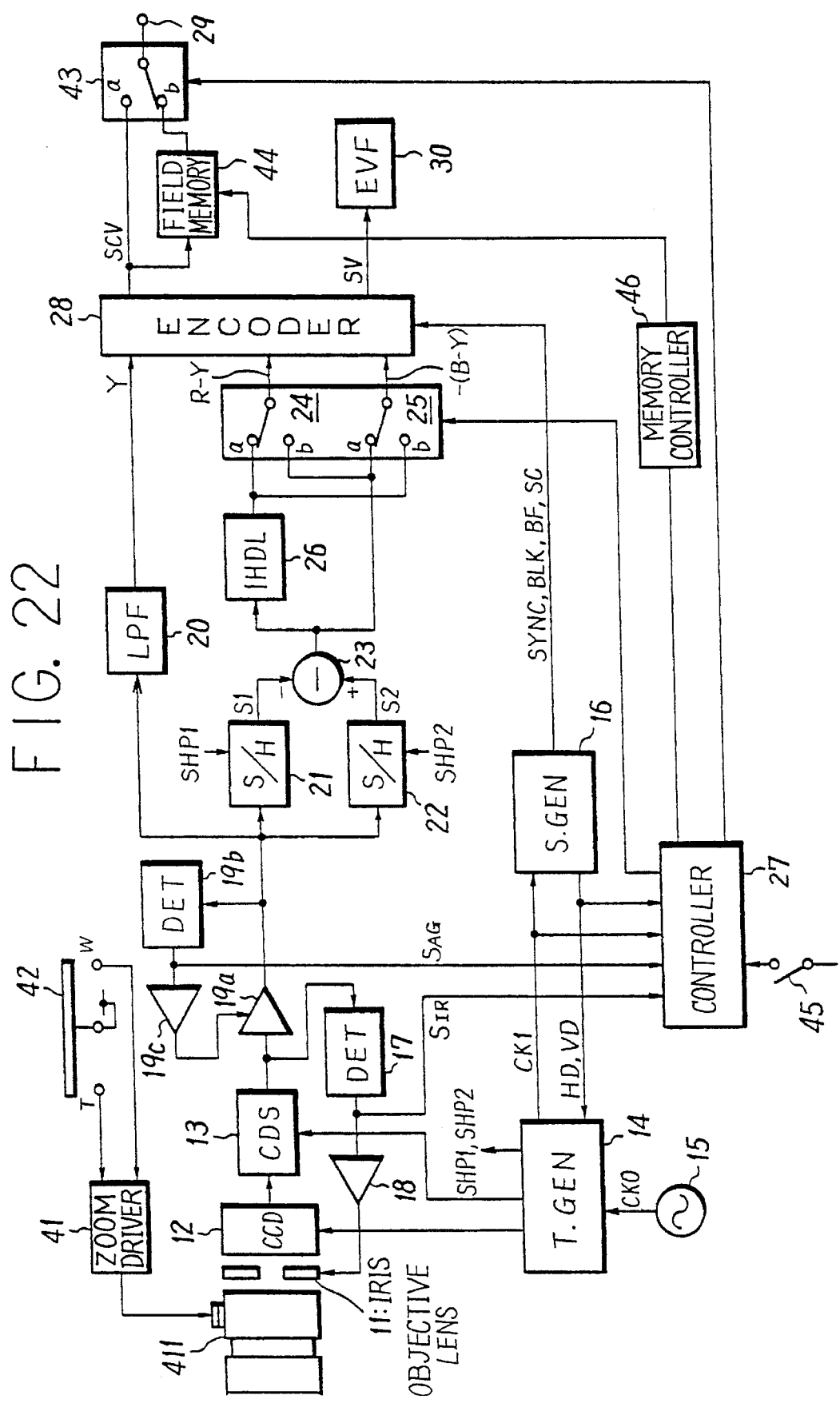
FIG. 22 is a schematic representation of a further video camera section.

Now, a further embodiment of the invention will be described. FIG. 22 is a schematic representation of the video camera section of this embodiment. In FIG. 22, parts like those in FIG. 2 are designated by like reference numerals, and they are not described any further.

In this embodiment, the color video signal SCV output from encoder 28 is supplied to an "a" side fixed terminal of a select switch 43. It is also supplied as a write signal to a field memory 44. The signal read out from the field memory 44 is supplied to a "b" side fixed terminal of the select switch 43. The output signal of the select switch 43 is fed to output terminal 29.

The detection signals $S_{IR}$ and $S_{AG}$ from the level detectors 17 and 19b are supplied to controller 27. When a strobic mode setting switch 45 (which is not shown in FIG. 1) is turned on to set a strobic mode, the controller 27 detects a level change in the image pick-up signal.

Figure 23:
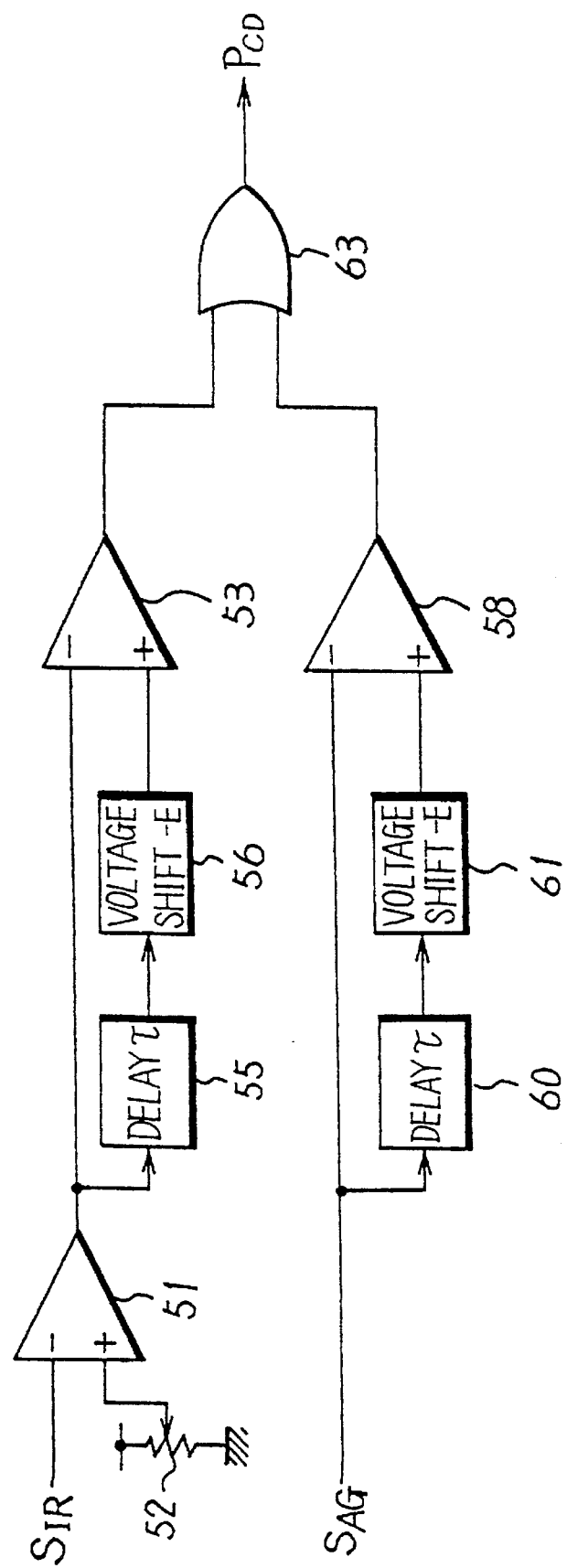
FIG. 23 is a schematic showing a level change detector.

The controller 27 includes a level change detector. FIG. 23 shows the level change detector 27. In FIG. 23, parts like those in FIG. 9 are designated by like reference numerals. Referring to the Figure, the detection signal $S_{IR}$ from the level detector 17 is supplied to an inversion input terminal of a DC amplifier 51. A variable resistor 52 is provided for off-set voltage control. The voltage obtained at the tap terminal of the variable resistor 52 is supplied to a non-inversion input terminal of the DC amplifier 51.

In this case, the output signal of the DC amplifier 51 is varied in a range of, for instance, 5 to 4 V according to the change in the detection signal $S_{IR}$. The input-output characteristics of the DC amplifier 51 may be varied as shown in FIG. 10 by controlling the tap terminal position of the DC amplifier 51.

The output signal of the DC amplifier 51 is supplied to an inversion input terminal of a comparator 53 and also to a delay circuit 55 providing a delay time τ. The delay time τ is set to be shorter than the time constant of the level detector 17. In this embodiment, the time constant of the level detector 17 is set to one vertical scan period, for instance 1 msec.

The output signal of the delay circuit 55 is supplied via a −E voltage shifter 56 to a non-inversion input terminal of the comparator 53. The output signal of the comparator 53 is supplied to an OR gate 63. The voltage E corresponds to a level difference permitting stable comparison of signals in the comparator 53. In this embodiment, it is set to 0.1 V.

The detection signal $S_{AG}$ from the level detector 19b is supplied to an inversion input terminal of a comparator 58 and also to a delay circuit 60 providing a delay time τ. The delay time τ is set to be shorter than the time constant of the level detector 19b. In this embodiment, the time constant of the level detector 19b is set to one vertical scan period, for instance 1 msec.

The output signal of the delay circuit 60 is supplied through a −E voltage shifter 61 to a non-inversion input terminal of the comparator 58. The output signal of the comparator 58 is supplied to the OR gate 63. The voltage E corresponds to a level difference permitting stable comparison of signals in the comparator 58. In this embodiment, it is set to 0.1 V.

Figure 24:
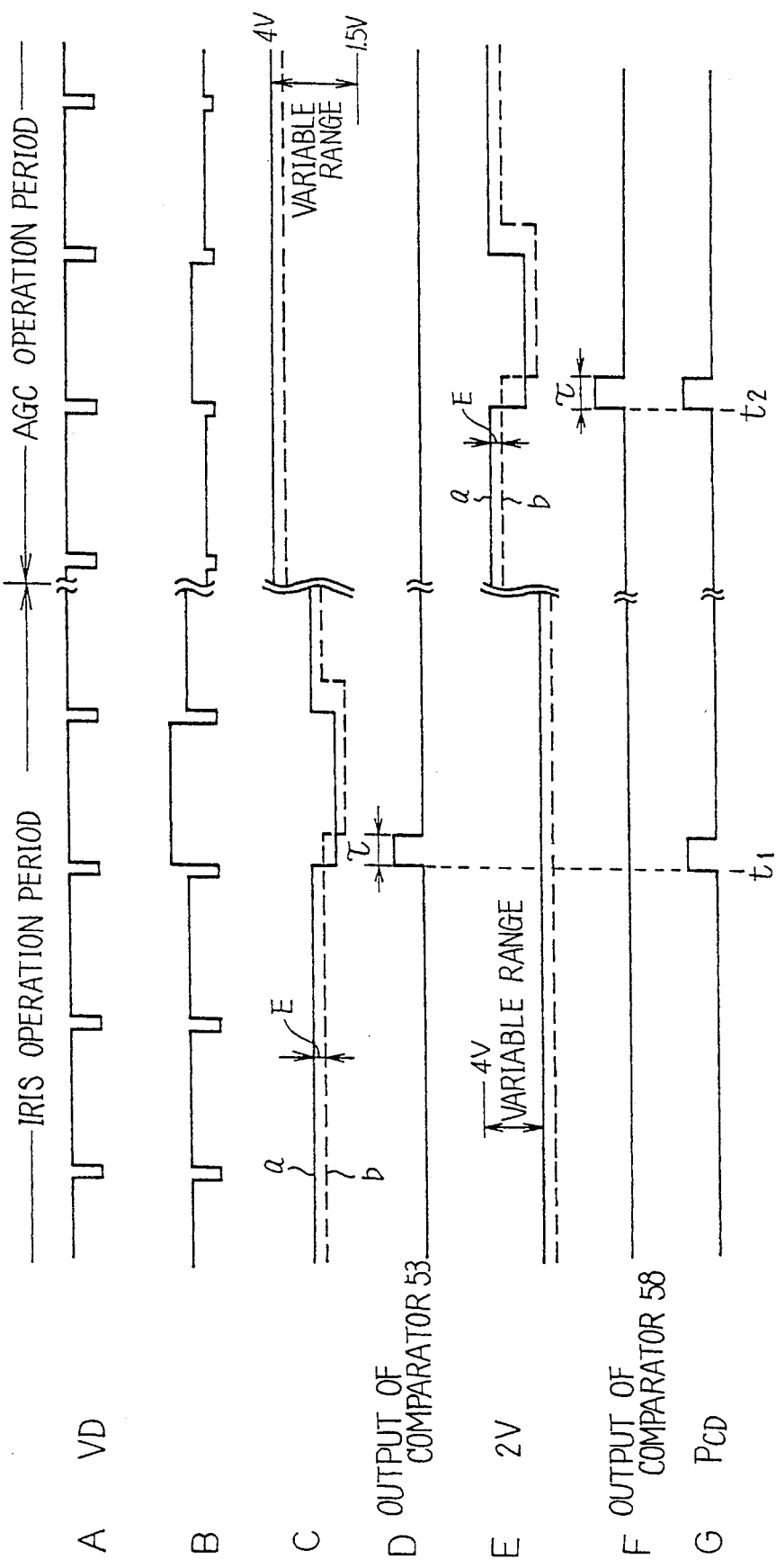
FIG. 24 is a waveform chart illustrating the operation of level change detection.

With the above construction, it will now be assumed that the image pick-up signal output from the AGC circuit 19a is varied as shown at B in FIG. 24. Shown at A in FIG. 24 is the vertical sync signal VD.

In an iris operation period (during which the gain of the AGC circuit 19a is held constant at 10 dB), the output signal of the DC amplifier 51 is as shown by solid line "a" at C in FIG. 24, and the output signal of the voltage shifter 56 is as shown by dashed line "b".

Thus, for the period of τ from an instant t1 of change in the image pick-up signal level in the increasing direction, the signal supplied to the non-inversion input terminal of the comparator 53 is higher than the signal supplied the inversion input terminal, and the comparator 53 thus outputs a high level signal (as shown at D in FIG. 24).

As noted above, the input-output characteristic of the DC amplifier 51 can be varied by controlling the tap terminal position of the variable resistor 52. It is thus possible to cause saturation of the high or low level side of the detection signal $S_{IR}$, ignore the image pick-up signal change in that part and suppress generation of level change detection pulse $P_{CD}$.

In an AGC operation period (during which the iris 11 is open), the detection signal $S_{AG}$ of the level detector 19b is varied as shown by solid line "a" at E in FIG. 24, and the output signal of the voltage shifter 61 is varied as shown by solid line "b".

Thus, for a period of τ from an instant t2 of the image pick-up signal level change in the increasing direction, the signal supplied to the non-inversion input terminal of the comparator 58 is higher than the signal supplied to the inversion input terminal, and thus the comparator 58 outputs a high level signal (as shown at F in FIG. 24).

In the above way, when the image pick-up signal level is changed in the increasing direction during the iris and AGC operation periods, the comparators 53 and 58 each provide a high level "H" signal, which is output by the OR gate 63 as the level change detection pulse $P_{CD}$ (as shown at G in FIG. 24).

Referring back to FIG. 22, the write and read operations with respect to the field memory 44 are controlled from the controller 27 via a memory controller 46, and the switching of the select switch 43 is controlled by the controller 27. For a duration up to a time corresponding to a field in which the high level "H" level change detection pulse $P_{CD}$ is detected, the field memory 44 is held in a write state, and the select switch 43 is held connected to the "a" side. For the subsequent 4 fields, the memory 44 is held in a read state, while the select switch 43 is held connected to the "b" side. Further, for the subsequent field and so on the memory 44 is held in the write state, while the select switch 43 is held connected to the "a" side.

Figure 25:
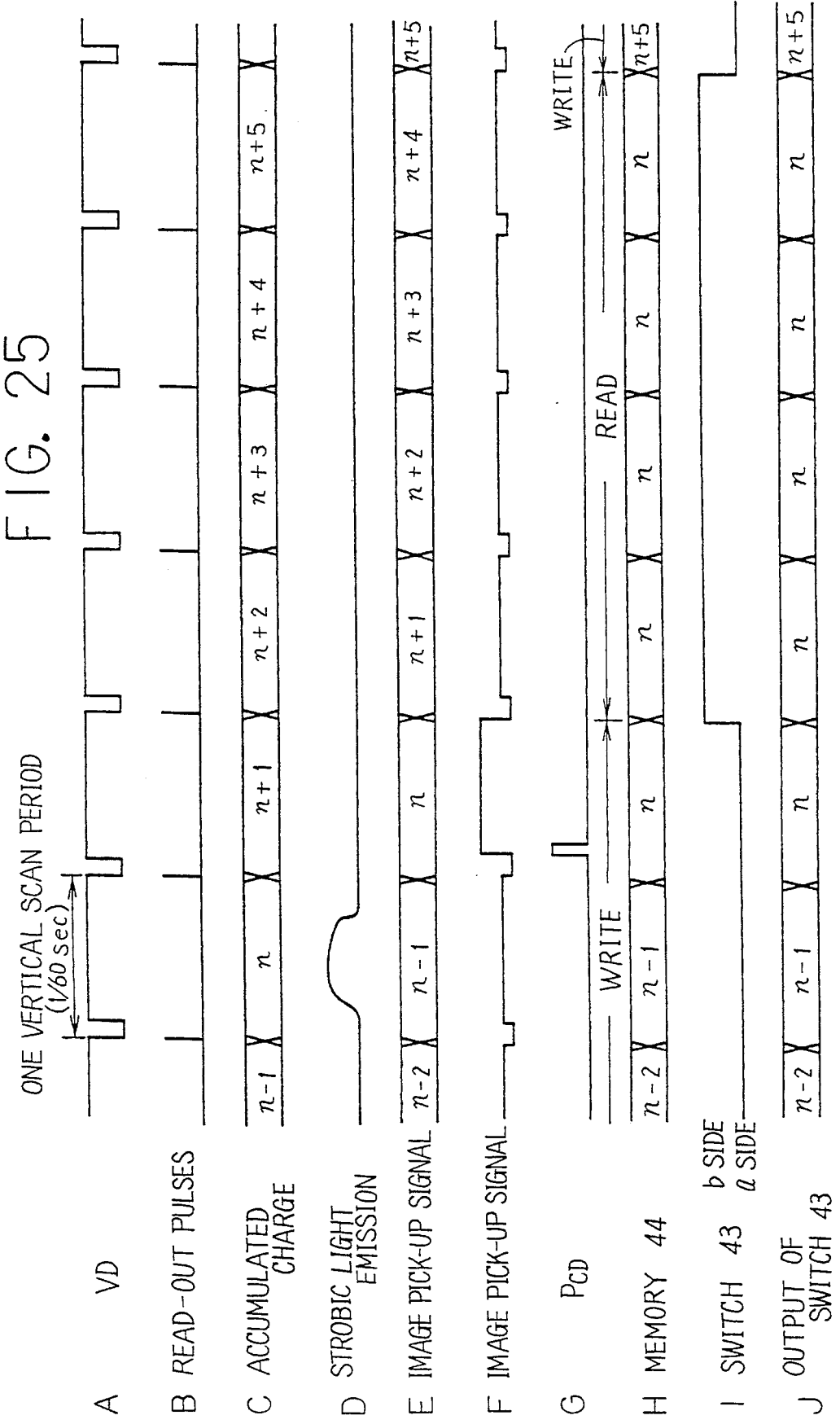
FIG. 25 is a waveform chart for explaining a video camera section output signal.

In FIG. 25, shown at A to C and E are respectively the vertical sync signal, read pulse for the image pick-up device 12, charge accumulated therein and image pick-up signal in each field. When strobic light emission is provided in correspondence to an n-th field as shown at D in FIG. 25, the level of the image pick-up signal corresponding to the n-th field is changed in the increasing direction (as shown at F in FIG. 25).

Thus, the level change detection section in the controller 27 outputs a level change detection pulse $P_{CD}$ in correspondence to the n-th field image pick-up signal (as shown at G in FIG. 25). Thus, the image pick-up signal corresponding to the fields up to and including the n-th field is progressively written as the updating signal in the memory 44. For the subsequent 4 fields, the n-th field signal is read out repeatedly. Then, the image pick-up signal of the (n+5) and following fields is progressively written as the updating signal in the memory 44 (as shown at H in FIG. 25).

The select switch 43 is held connected to the "b" side only for the 4 field period, during which the memory 44 is held in the read state, and for the other period it is held connected to the "a" side (as shown at I in FIG. 25). Thus, the select switch 43 outputs signal in a sequence as shown at J in FIG. 25. That is, the n-th field signal corresponding to the strobic light emission is output continuously for 4 fields.

Although not shown, a VTR or a still image recorder may be connected to the output terminal 29 for recording. When recording a signal thereof using a still image recorder, the image pick-up signal corresponding to the 4 fields as noted above is latched. By so doing, it is possible to obtain a recording of a high quality signal from a foreground object providing sufficient light.

As shown above, in this embodiment one field video signal SCV of the foreground object, which is made to provide sufficient light by strobic light emission, is output continuously for 4 fields from the memory 44 to be selectively supplied to the output terminal 29. Thus, it is possible to record only high quality video signal SCV from the foreground object providing sufficient light using, for instance, a still image recorder. As for the strobic light emission, it is possible to utilize strobe lights of various manufacturers.

In this embodiment, the period of continuation of the video signal SCV corresponding to the strobic light emission is set to 4 fields. However, this is by no means limitative; for instance, it may be set to a longer period.

Further, while in this embodiment an image pick-up signal level change in the increasing direction is detected to permit the corresponding video signal SVC to be output selectively, conversely similar operation may be caused in response to the detection of an image pick-up signal level in the reducing direction. Thus, when the image pick-up level is changed with a change in the status of the foreground object, the corresponding video signal SCV may be selectively output. Thus, the embodiment is suitable as a monitor video camera as well.

Figure 26:
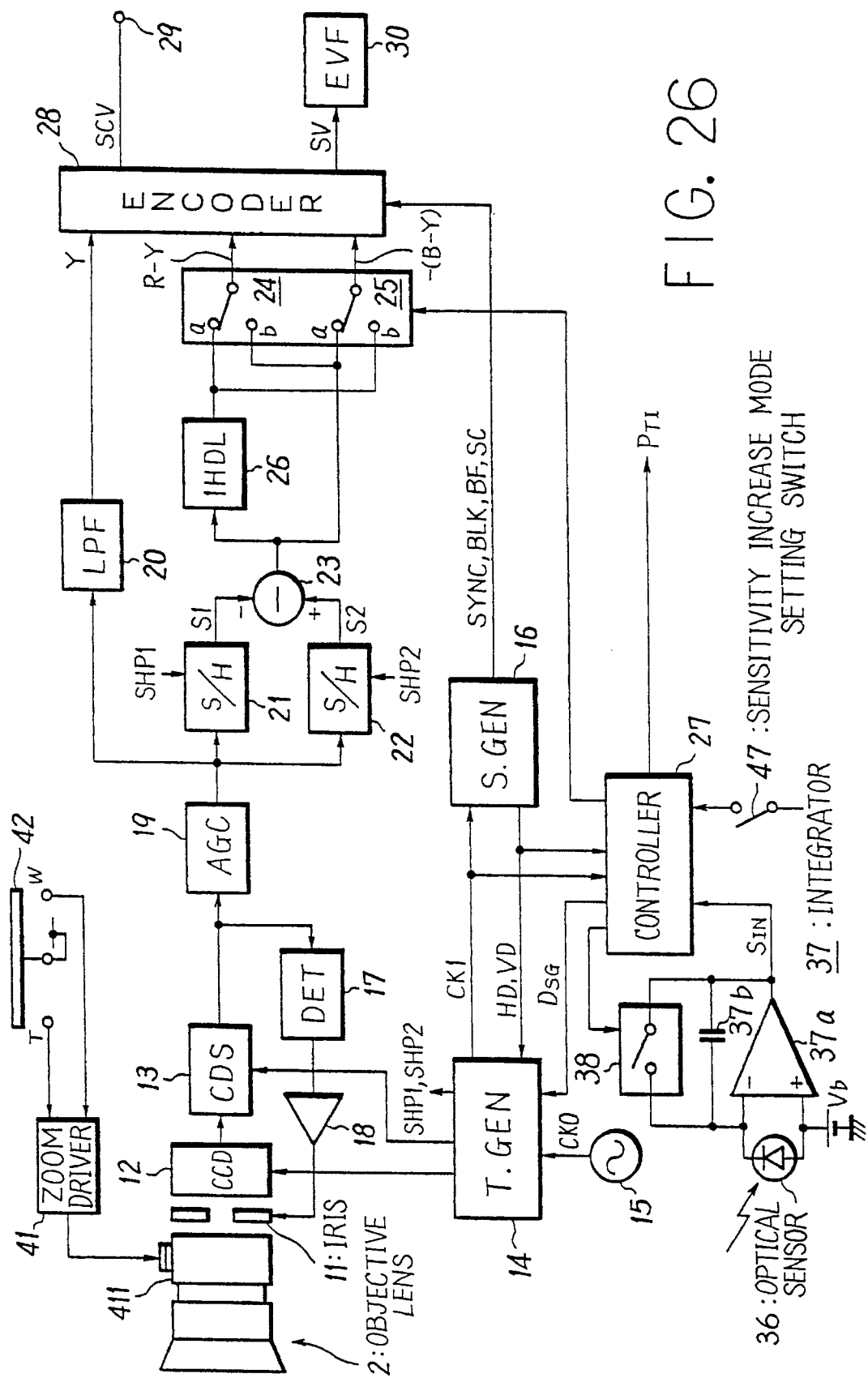
FIG. 26 is a schematic representation of a further video camera section.

Now, a further embodiment of the invention will be described. FIG. 26 is a schematic representation of the video camera section of this embodiment. In FIG. 26, parts like those in FIG. 2 are designated by like reference numerals, and they are not described any further.

In this embodiment, the output signal of CDS circuit 13 is level controlled in an AGC circuit 19 before being supplied to low-pass filter 20 and sample/hold circuits 21 and 22. The AGC circuit 19 corresponds to a circuit part constituted by the AGC circuit 19a, level detector 19b and buffer 19c in FIG. 2.

Designated at 36 is an optical sensor having substantially the same characteristic as that of each pixel optical sensor in image pick-up device 12. The output signal of the optical sensor 36 is supplied to an integrator 37 comprising an operational amplifier 37a and a capacitor 37b.

A switch 38 is connected in parallel with the capacitor 37b and is on-off controlled by controller 27. A sensitivity increase mode setting switch 47 is connected to the controller 27. A sensitivity increase mode is set up by turning on the switch 47. For a period up to an instant t1 of the end of a field, in which the switch 47 is turned on, and a period succeeding an instant t2 of the end of a field, in which the switch 47 is subsequently turned off, the switch 38 noted above is held "on" to hold the switch in a conductive state for discharging capacitor 37b. In the period between the instants t1 and t2, the switch 38 is turned on momentarily at a timing when a read pulse is supplied to the image pick-up device 12, and the capacitor 37b is thus discharged. With the discharging of the capacitor 37b, the output signal $S_{IN}$ of the integrator 37 is reset to Vb.

Since the optical sensor 36 has substantially the same characteristic as that of each pixel optical sensor in the image pick-up device 12 and is in series with the capacitor 37b which is discharged at the timing of the output of a read pulse supplied to the image pick-up device 12, in the period between the instants t1 and t2 the output signal $S_{IN}$ of the integrator corresponds to charge accumulated in the image pick-up device 37.

The output signal $S_{IN}$ of the integrator 37 is supplied to the controller 27. The controller checks whether the level of the output signal $S_{IN}$ exceeds a predetermined level $V_{TH}$ in the period between the instants t1 and t2. The predetermined level $V_{TH}$ is set to be equal to the level of the signal $S_{IN}$ when charge accumulated in the image pick-up device 12 becomes adequate.

When the level of the signal $S_{IN}$ exceeds the predetermined level $V_{TH}$, a read pulse generation data DSG is supplied from the controller 27 to timing pulse generator 14, and in synchronism to the next vertical scan signal VD a read pulse is supplied from the timing pulse generator 14 to the image pick-up device 12. For periods other than the period between the instants t1 and t2, a read pulse is supplied to the image pick-up device 12 from the timing pulse generator 14 in synchronism to each vertical scan signal VD.

Further, in the period between the instants t1 and t2, a take-in pulse $P_{TI}$ is output from the controller 27 in synchronism to the output of a read pulse supplied to the image pick-up device 12. The take-in pulse $P_{TN}$ is used to latch one frame of data in a still image recorder (not shown) connected to output terminal 29.

Figure 27:
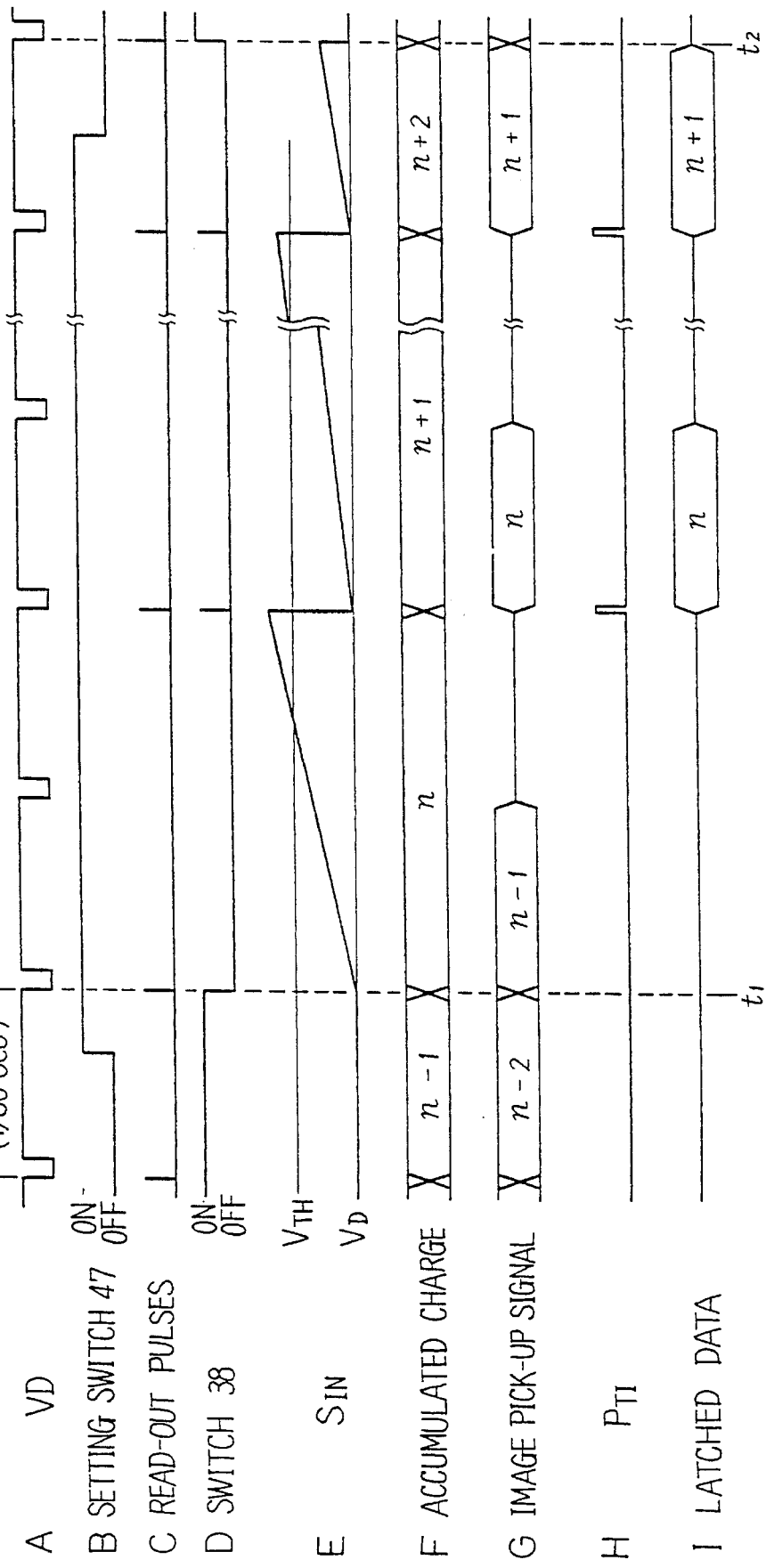
FIG. 27 is a waveform chart illustrating the operation in sensitivity increase mode.

A case will now be considered, in which the switch 47 is on-off operated as shown at B in FIG. 27. Shown at A in FIG. 27 is the vertical scan signal VD. In the period up to the instant t1 of the end of a field, in which the switch 47 is turned on, and the period after the instant t2 of the end of a field, in which the switch 47 is turned off, a read pulse is supplied from the timing pulse generator 14 to the image pick-up device in synchronism to each vertical scan signal VD (as shown at C in FIG. 27).

When the switch 38 is turned off, i.e., opened to a non-conducting state, at the instant t1 as shown at D in FIG. 27, the output signal $S_{IN}$ of the integrator 37 tends to increase gradually as shown at B in FIG. 27. When charge accumulated in the image pick-up device 12 becomes adequate to cause the level of the signal $S_{IN}$ to exceed the predetermined level $V_{TH}$, a read pulse is supplied from the timing pulse generator 14 to the image pick-up device 12 in synchronism to the next vertical sync signal VD (as shown at C in FIG. 27). At the timing of the output of this read pulse, the switch 38 is turned on momentarily to reset the output signal $S_{IN}$ of the integrator 37, and subsequently the signal $S_{IN}$ tends to increase gradually again. The above sequence of operations is repeated for a period up to the instant t2, and a read pulse is supplied from the timing pulse generator 14 to the image pick-up device 12 every time charge accumulated in the image pick-up device 12 becomes adequate.

Thus, charge accumulated in the image pick-up device 12 is as shown at F in FIG. 27, and the image pick-up signal output from the image pick-up device 12 is as shown at G in FIG. 27. That is, every time charge accumulated in the image pick-up device 12 becomes adequate in the period between the instants t1 and t2, the image pick-up device 12 outputs one frame image pick-up signal in the next field, thus forming video signal SVC supplied to the output terminal 29.

When a read pulse is supplied to the image pick-up device 12 in period other than the period between the instants t1 and t2, the image pick-up device 12 outputs one frame image pick-up signal irrespective of the charge accumulated in the image pick-up device 12.

Further, in the period between the instants t1 and t2, the controller 27 outputs a take-in pulse $P_{TI}$ at the timing of the output of a read pulse supplied to the image pick-up device 12 (as shown at H in FIG. 27). Thus, using this take-in pulse $P_{TI}$ one frame image pick-up signal which is output when charge accumulated in the image pick-up device 12 becomes adequate, may be latched in, for instance, a still image recorder connected to the output terminal 29 (as shown at I in FIG. 27).

As shown above, in this embodiment in the sensitivity increase mode set up by turning on the sensitivity increase mode setting switch 47, every time charge accumulated in the image pick-up device 12 becomes adequate, the image pick-up device 12 outputs one frame pick-up signal in the next field. Thus, when light from the foreground object is insufficient, the charge accumulation time can be extended to increase the sensitivity without possibility of the saturation of charge accumulation, thus permitting satisfactory still image photography.

While the image pick-up device 12 in this embodiment was of the field charge accumulation type, it is of course possible to use an image pick-up device of frame charge accumulation type as well.

Further, while in this embodiment the video camera and photo-camera were integral, the invention may also be applied to a video camera, which may be used by securing a separate photo-camera to it.

Figure 28:
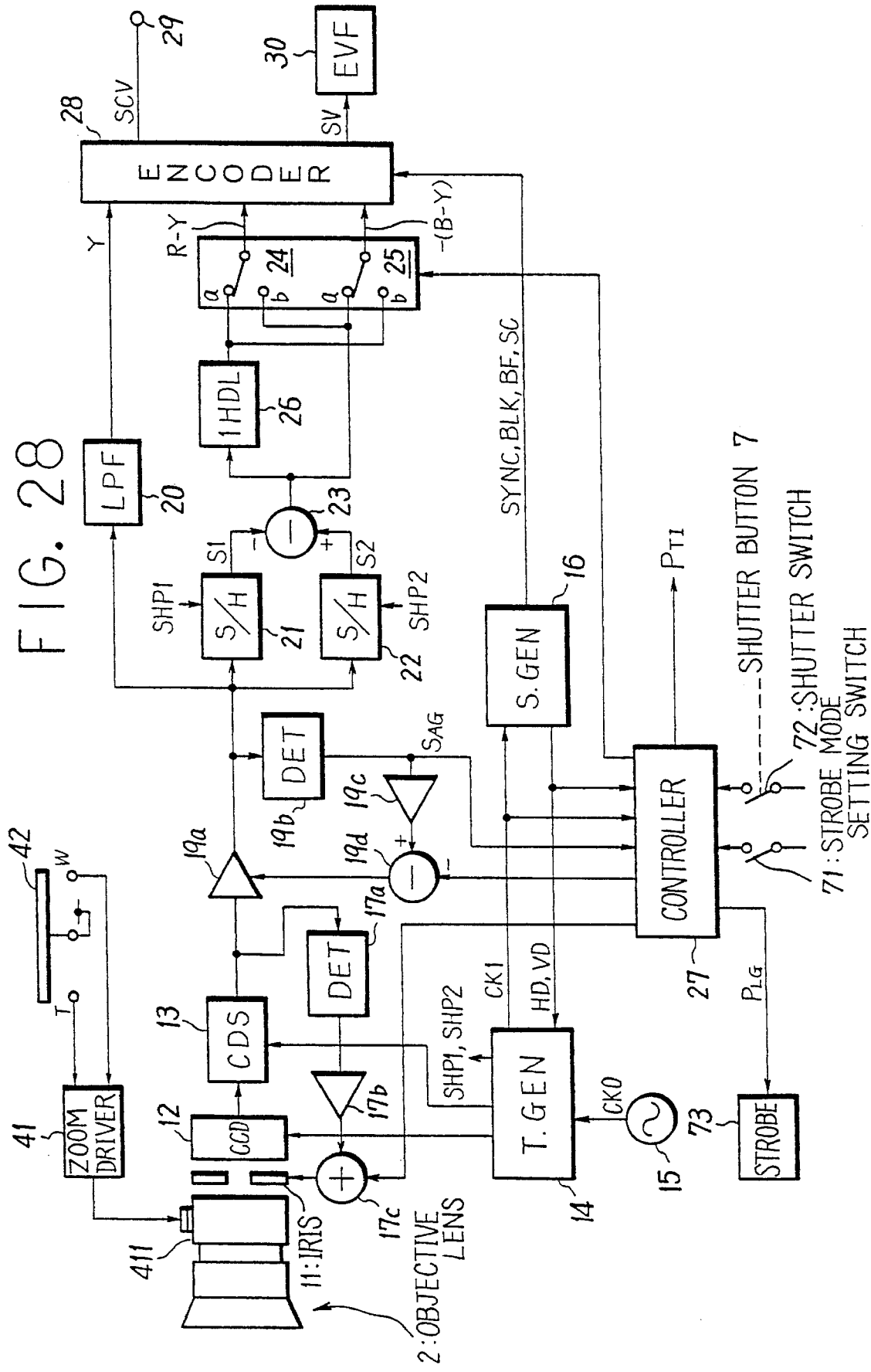
FIG. 28 is a schematic representation of a further video camera section.

Now, a further embodiment of the invention will be described. FIG. 28 is a schematic representation of the video camera section of this embodiment. In FIG. 28, parts like those in FIG. 2 are designated by like reference numerals, and they are not described any further.

In this embodiment, the image pick-up signal output from CDS circuit 13 is applied to a level detector 17a. The output signal of the level detector 17a is supplied as a control signal through an iris driver 17b and an adder 17c to iris 11 for automatic control of the stop of the iris 11.

The output signal of AGC circuit 19a is supplied to level detector 19b, the output signal of which is in turn supplied as control voltage through a buffer 19c and a subtractor 19d to the AGC circuit 19a and also supplied to controller 27.

A strobic mode setting switch 71 is connected to the controller 27. By turning on the switch 31, modes are changed from normal mode over to strobic mode. In the strobic mode, when a shutter switch 72 connected to the controller 27 is turned on in response to the depression of the shutter button 7 (shown in FIG. 1), the controller 27 supplies a strobic light emission timing pulse $P_{LG}$ to a strobe 73 to cause strobic light emission in the next field.

When the strobic mode is set, a control signal is supplied from the controller 27 to the adder 17c to reduce the aperture of the iris 11 to, for instance, about one-third. When the aperture of the iris 11 is reduced, light incident on the image pick-up device 12 is reduced to reduce the level of the image pick-up signal output from the image pick-up device 12. As a result, the gain of the AGC circuit 19a is automatically increased through AGC control loop to make up for the image pick-up signal level reduction.

However, when strobic light emission from the strobe 73 is caused even with a small aperture of the iris 11, light incident on the image pick-up device 12 becomes sufficient. If the gain of the AGC circuit 19a remains increased in this case, the image pick-up signal level is excessively increased to result in probable saturation. In this embodiment, accordingly, in the next field after the strobic light emission from the strobe 73, that is, in the field, in which the image pick-up signal obtained with pick-up of image in the presence of the strobic light emission from the strobe 73, the controller 27 supplies a control signal to the subtractor 19d to forcibly reduce the gain of the AGC circuit 19a.

The level of the control signal is set to be equal to the level change in the detection signal $S_{AG}$ of the level detector 19b when the aperture of the iris 11 is reduced, for instance. Thus, a level change is detected when the aperture of the iris 11 is reduced with the detection signal $S_{AG}$ supplied to the controller 27.

In addition, in synchronism to the instant of the end of the field, in which strobic light is emitted from the strobe 73 in the strobic mode, the controller 27 outputs a take-in pulse $P_{TI}$. The take-in pulse $P_{TI}$ is used to let one frame of data be latched in a still image recorder (not shown) connected to output terminal 29.

In the above construction, when the switch 71 is turned on (as shown at B in FIG. 29), the normal mode is switched over to the strobic mode in synchronism to the next vertical sync signal VD (as shown at C in FIG. 26). Shown at A in FIG. 29 is the vertical sync signal VD.

Figure 29:
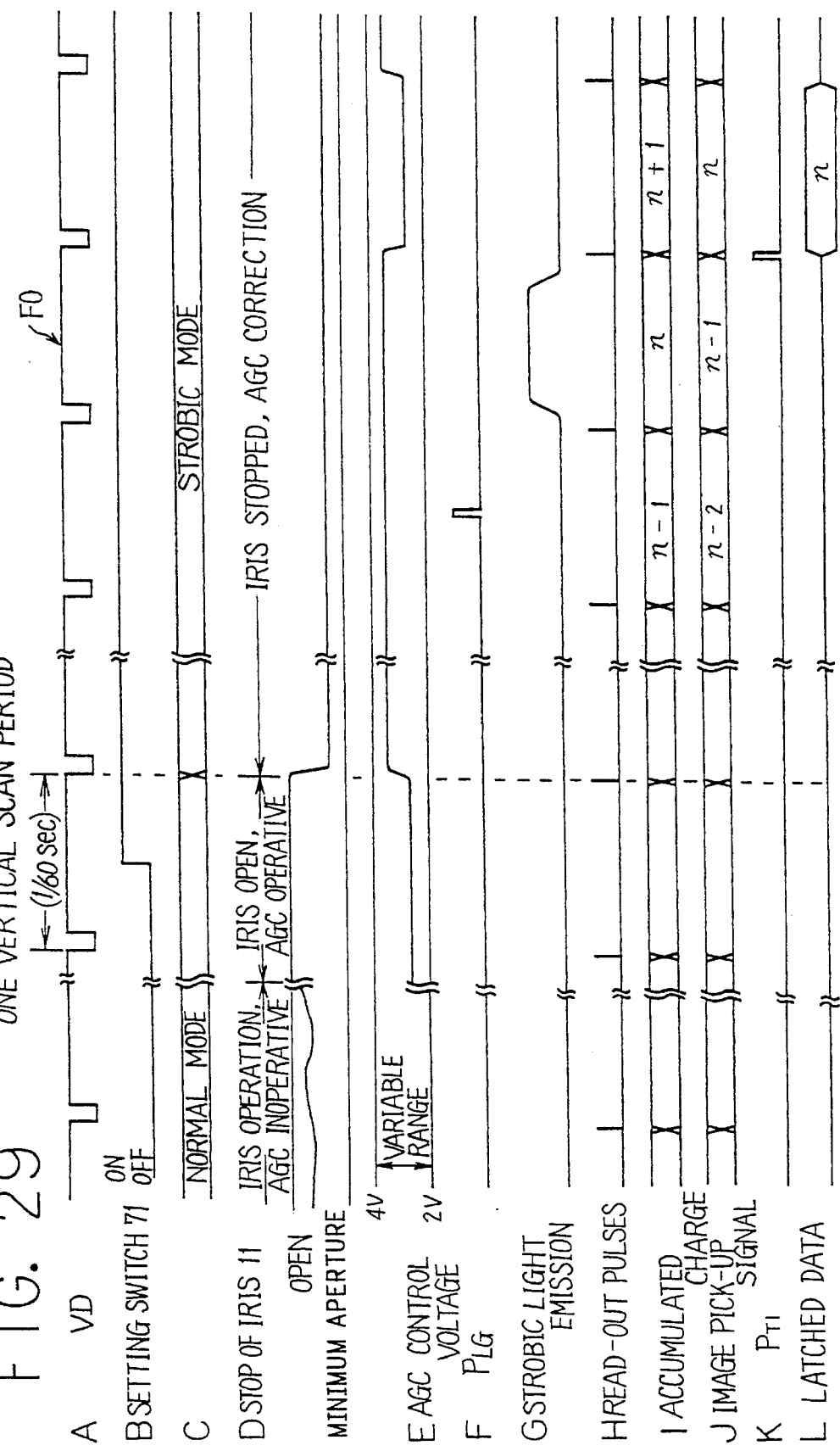
FIG. 29 is a waveform chart illustrating the operation in strobic mode.
Figure 30:
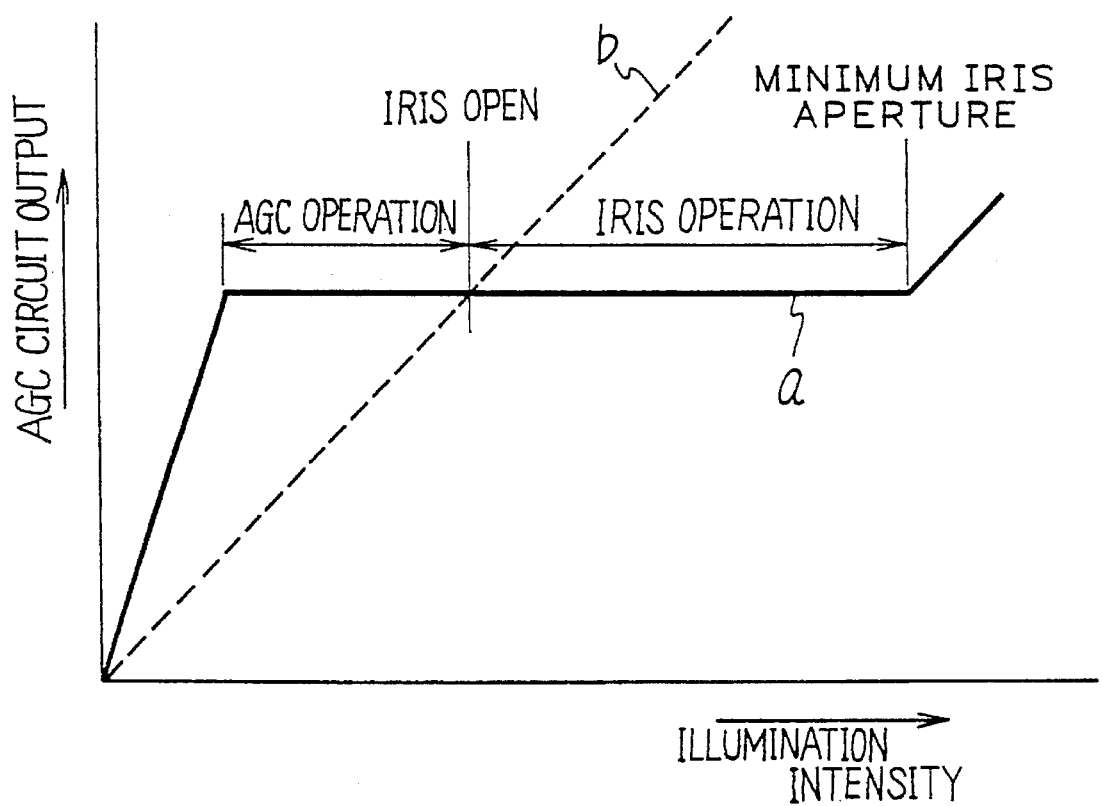
FIG. 30 is a graph showing the relation between illumination intensity and AGC circuit output.

When the strobic mode is set, the controller 27 supplies a control signal to the adder 17c to reduce the aperture of the iris 11 to about one-third of the open state (as shown at D in FIG. 29). In the example of FIG. 29, the strobic mode is set up in a low illumination intensity state with the iris 11 open (i.e., with the AGC action provided). In FIG. 30, the solid plot "a" represents the relation between the output signal of the AGC circuit 19a and illumination intensity in the normal mode. The dashed plot "b" represents the relation when the iris 11 is open and the gain of the AGC circuit 19a is fixed at 10 dB.

When the aperture of the iris 11 is reduced, light incident on the image pick-up device 12 is reduced to reduce the level of the image pick-up signal output from the image pick-up device 12. As a result, the control voltage to the AGC circuit 19a is increased, thus causing automatic increase of the gain of the AGC circuit 19a (as shown at E in FIG. 29). In this way, the image pick-up signal level reduction is accommodated.

In the strobic mode, when a strobic light emission timing pulse $P_{LG}$ is supplied from the controller 27 to the strobe 73 with the shutter switch 72 turned on in response to the depression of the shutter button 7 (as shown at F in FIG. 29), strobic light emission from the strobe 73 is provided in the next field F0 (as shown at G in FIG. 29).

The timing pulse generator 14 supplies a read pulse to the image pick-up device 12 at the instant of end of each field (as shown at H in FIG. 29). Thus, charge accumulated in the image pick-up device 12 is as shown at I in FIG. 29. On the other hand, the image pick-up signal is output with a delay of one field from the image pick-up device 12, as shown at J in FIG. 29.

In the field, in which one frame image pick-up signal n produced in the field F0 in the presence of strobic light emitted from the strobe 73 is output from the image pick-up device 12, the controller 27 supplies a control signal to the subtractor 19 to reduce the control voltage supplied to the AGC circuit 19a (as shown at E in FIG. 29). Thus, the gain of the AGC circuit 19a is forcibly reduced. The level of the image pick-up signal n produced with the strobic light emission from the strobe 73 is sufficiently high, and by forcibly reducing the gain of the AGC circuit 19a as above, excessive increase of the level of the image pick-up level n can be avoided.

Further, a take-in pulse $P_{TI}$ is output from the controller 27 in synchronism to the instant of end of the field F0 (as shown at K in FIG. 29). By using this take-in pulse $P_{TI}$, one frame image pick-up signal n produced with the strobic light emission from the strobe 73 may be latched in, for instance, a still image recorder connected to the output terminal (as shown at L in FIG. 29). The image pick-up signal n is obtained in the presence of sufficient light, and thus it is superior in the signal-to-noise ratio and quality to image pick-up signals in other fields with level compensation in the AGC circuit 19a.

As shown above, in this embodiment photography in the presence of strobic light emission from the strobe 73 can be obtained in the strobic mode set up by turning on the switch 71. In this case, in the strobic mode the aperture of the iris 11 is reduced, and thus there is no possibility of saturation of charge accumulated in the image pick-up device 12 due to the strobic light emission from the strobe 73. Further, since the gain of the AGC circuit 19a is forcibly reduced in the field, in which the image pick-up signal n obtained in photography with strobic light emission from the strobe 73, there is no possibility of excessive increase of the level of the image pick-up signal n to such an extent as to result in saturation.

Figure 31:
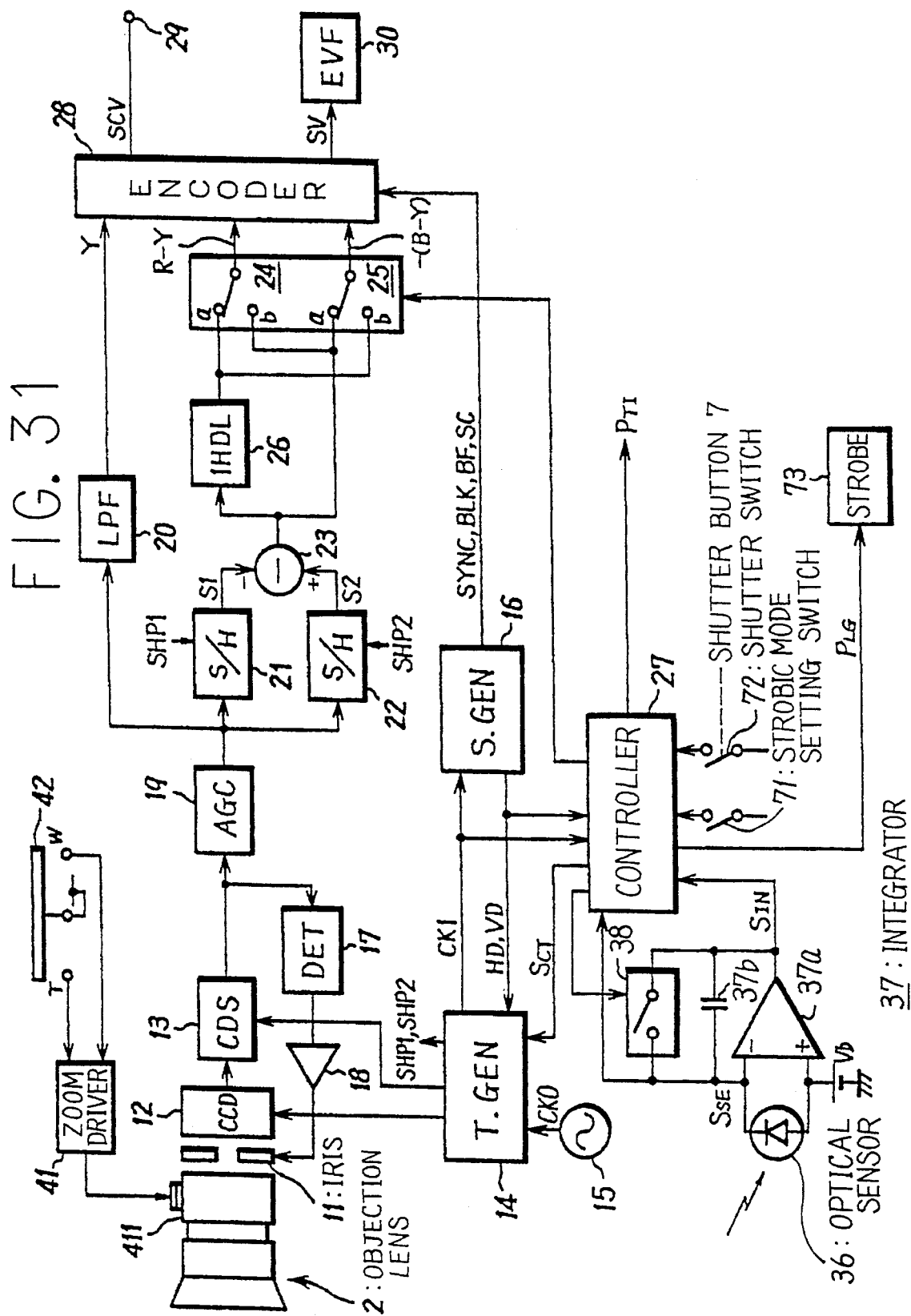
FIG. 31 is a schematic representation of a further video camera section.

Now, a further embodiment of the invention will be described. FIG. 31 is a schematic representation of the video camera section of this embodiment. In FIG. 31, parts like those in FIG. 2 are designated by like reference numerals, and they are not described any further.

In this embodiment, the output signal of the CDS circuit 13 is level controlled in an AGC circuit 19 before being supplied to low-pass filter 20 and sample/hold circuits 21 and 22. The AGC circuit 19 corresponds to a circuit part constituted by the AGC circuit 19a, level detector 19b and buffer 19c.

Designated at 36 is an optical sensor having the same characteristic as that of each pixel optical sensor in image pick-up device 12. The output signal $S_{SE}$ of the optical sensor 36 is supplied to controller 27.

A strobic mode setting switch 71 is connected to controller 27. A strobic mode is set by turning on the switch 71. In the strobic mode, when a shutter switch 72 connected to the controller 27 is turned on in response to the depression of the shutter button 7 (shown in FIG. 1), the controller 27 supplies a strobic light emission timing pulse $P_{LG}$ to the strobe 73 to cause strobic light emission in the next field.

The controller 27 compares the level of the output signal $S_{SE}$ of the optical sensor 36 with a predetermined level $V_{TH}$ to detect strobic light emission from the strobe 73. In this case, the controller 27 supplies a control signal $S_{CT}$ to the timing pulse generator 14, and in the field, in which strobic light is emitted from the strobe 73 in the strobic mode, successive charge sweep-out pulses are supplied to the image pick-up device 12 up to an instant t1 when the output signal $S_{SE}$ exceeds a predetermined level $V_{TH0}$. That is, in the field, in which strobic light is emitted from the strobe 73 in the strobic mode, charge accumulation in the image pick-up device 12 is started from the instant t0.

The output signal $S_{SE}$ of the optical sensor 36 is supplied to an integrator 37 comprising an operational amplifier 37a and a capacitor 37b. The output signal $S_{IN}$ is supplied to the controller 27. A switch 38 is connected in parallel with the capacitor 37b and is on-off controlled by the controller 27.

The switch 38 is turned on at the instant of the end of each field, and also in the field, in which strobic light is emitted from the strobe 73 in the strobic mode, it is turned on at the instant t1 and also at the instant t1 when the output signal $S_{IN}$ of the integrator 37 exceeds the predetermined level $V_{TH1}$. When the switch 38 is turned on, the capacitor 37b is discharged, and the output signal $S_{IN}$ of the integrator 37 is reset to Vb.

Since the optical sensor 36 has substantially the same characteristic as that of each pixel optical sensor in the image pick-up device 12 and in series with the capacitor 37b which is discharged at the instant t0 of the start of the charge accumulation in the image pick-up device 12, the output signal $S_{IN}$ of the integrator 37 in the period between the instants t0 and t1 corresponds to charge accumulated in the image pick-up device 12. The predetermined level $V_{TH1}$ is set to be substantially equal to the level of the output signal $S_{IN}$ when charge accumulated in the image pick-up device 12 is adequate.

Usually, at the instant of the end of each field the timing pulse generator 14 supplies a read pulse to the image pick-up device 12. In the field, in which strobic light emission is provided from the strobe 73 in the strobic mode, the controller 27 supplies a control signal $S_{CT}$ to the image pick-up device 12, and a read pulse is supplied at instant t1. In either case, the image pick-up device 12 outputs image pick-up signal in the next field.

Further, in synchronism to the instant of the end of the field, in which strobic light emission from the strobe 73 is provided in the strobic mode, the controller 27 outputs a take-in pulse $P_{TI}$. The take in pulse $P_{TI}$ is used for latching one frame data in a still image recorder (not shown) connected to the output terminal 29.

Figure 32:
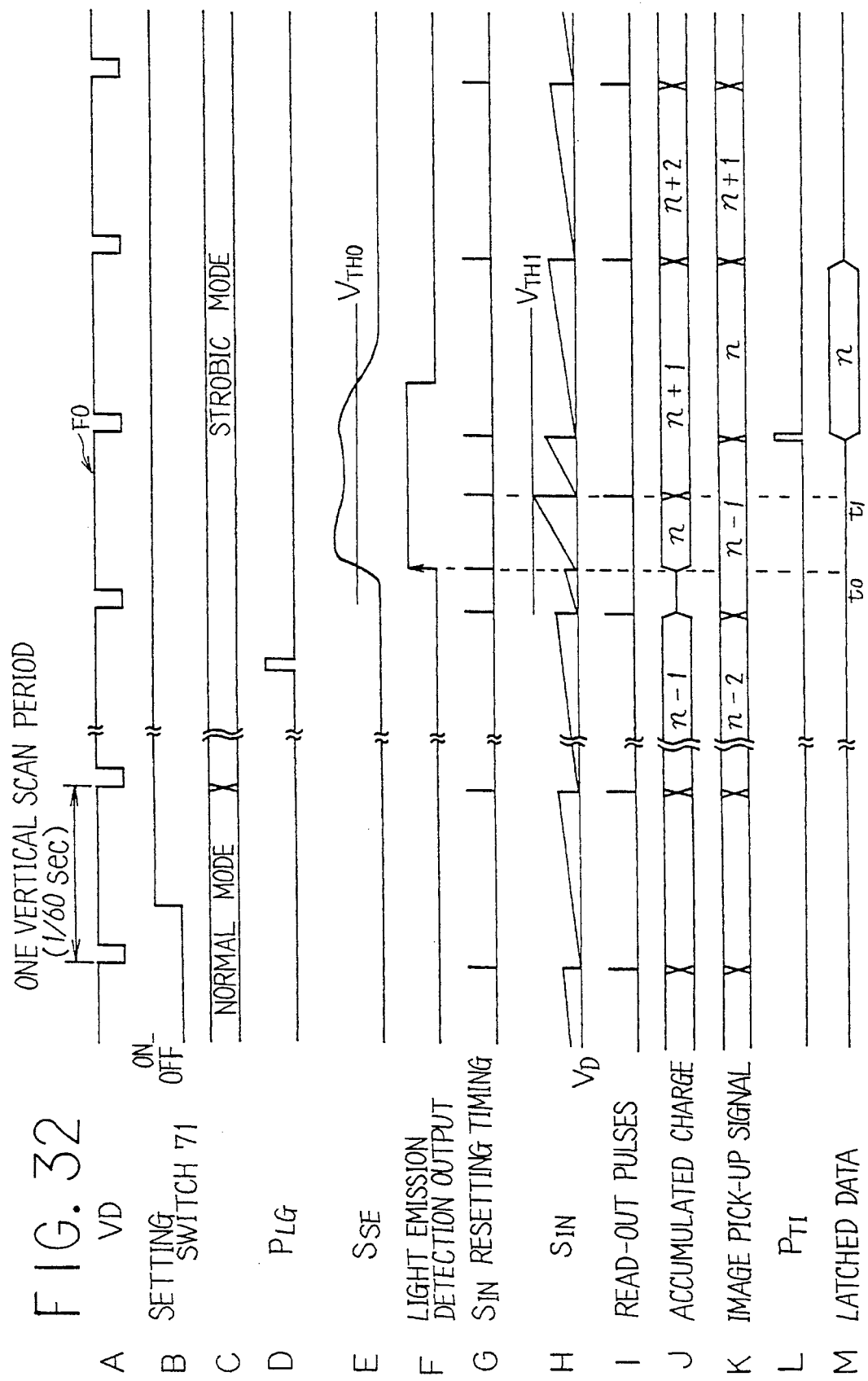
FIG. 32 is a waveform chart illustrating the operation in strobic mode.

In the above construction, when the switch 71 is turned (as shown at B in FIG. 32), the mode is switched from the normal mode over to the strobic mode in synchronism to the next vertical sync signal VD (as shown at C in FIG. 32). Shown at AS is the vertical sync signal VD.

In the strobic mode, when a light emission timing pulse $P_{LG}$ is supplied from the controller 27 to the strobe 73 with the shutter switch 72 turned on in response to the depression of the shutter button 7 (as shown at D in FIG. 32), strobic light emission from the strobe 73 is provided in the next field F0.

Thus, the output signal $S_{SE}$ of the sensor 36 is changed as shown at E in FIG. 32, and the controller 27 compares this signal with the predetermined level $V_{TH0}$ to obtain a light emission detection output (as shown at F in FIG. 32). In the field F0, charge accumulation is started from the instant t0 of rising of the light emission detection output, and from this instant t0 the output signal $S_{IN}$ of the integrator 37 is gradually increased (as shown at H in FIG. 32). At an instant t1 when the level of the output signal $S_{IN}$ exceeds the predetermined level $V_{TH1}$ with the reaching of adequate charge accumulation in the image pick-up device 12, a read pulse is supplied from the timing pulse generator 14 to the image pick-up device 12 (as shown at I in FIG. 32).

In the other fields, the timing pulse generator 14 supplies a read pulse to the image pick-up device 12 at the instant of the end of each field (as shown at I in FIG. 32). Shown at G in FIG. 32 is a reset timing of the output signal $S_{IN}$ of the integrator 37.

Thus, charge accumulated in the image pick-up device 12 is as shown at J in FIG. 32, and the image pick-up signal output from the image pick-up device 12 is as shown at K in FIG. 32. One frame image pick-up signal n obtained in photography in the field F0 by causing strobic light emission from the strobe 73 is output in the next field.

Further, in synchronism to the instant of the end of the field F0, the controller 27 outputs a take-in pulse $P_{TI}$ (as shown at L in FIG. 32). Thus, by using this take-in pulse $P_{TI}$ one frame image pick-up signal n may be latched in, for instance, a still image recorder connected to the output terminal 29 (as shown at M in FIG. 32).

As shown above, since in this embodiment the strobic mode is set up by turning on the switch 71, photography with strobic light emission from the strobe 73 can be obtained. In this case, a read pulse is supplied at the instant t1 when the charge accumulation in the image pick-up device 12 becomes adequate, and thus there is no possibility of the saturation of charge accumulation.

While the image pick-up device 12 in this embodiment has been of the field charge accumulation type, the invention can of course be similarly applied to the frame charge accumulation type.

Now, a further embodiment of the invention will be described. When the shutter button 7 is turned on by an on-off setting switch (not shown in FIG. 1) of the photo-camera, it serves for the photo-camera. When it is turned off, on the other hand, it serves for the video camera (for still image recording).

Figure 33:
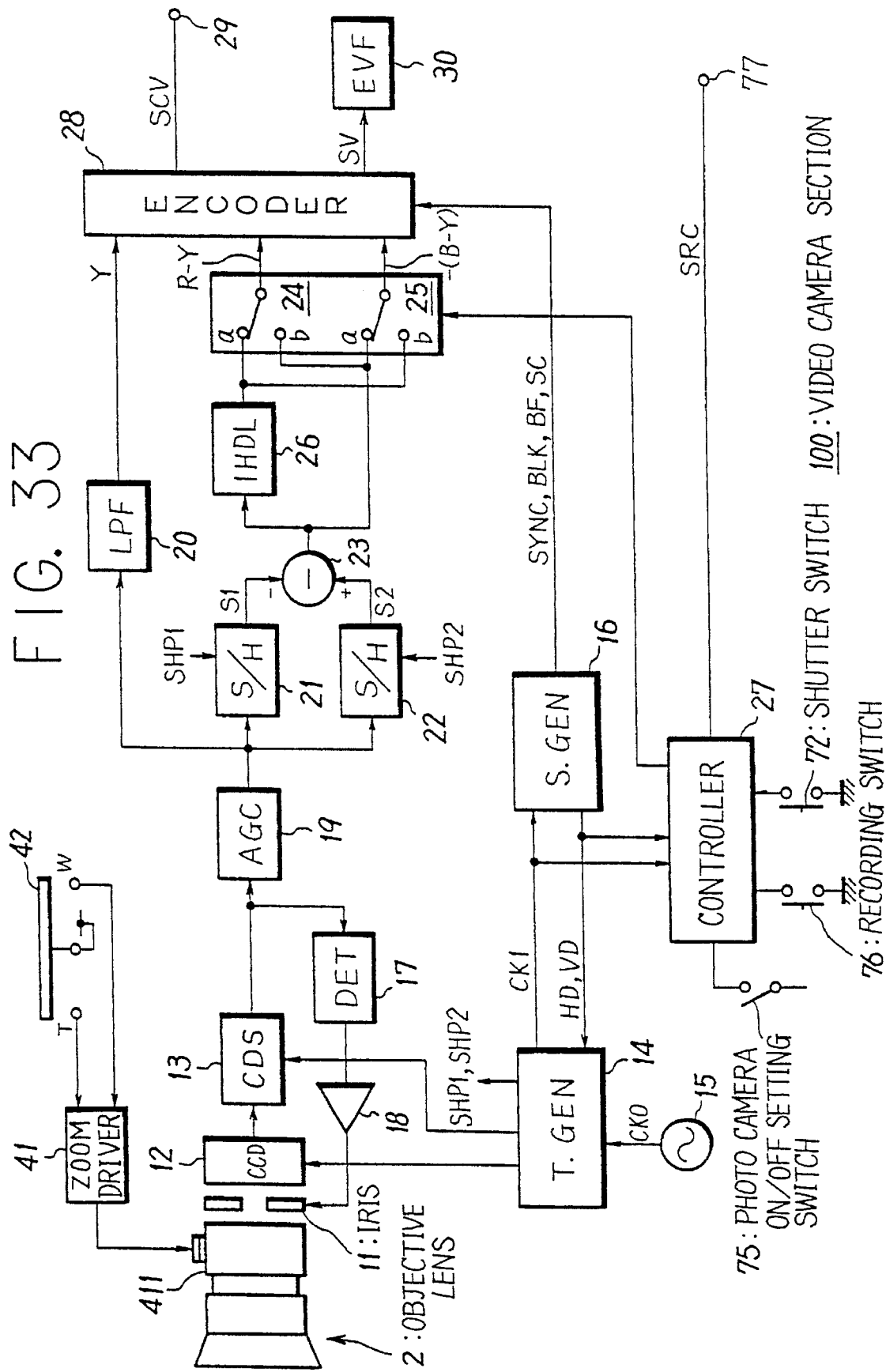
FIG. 33 is a schematic representation of a further video camera section.

FIG. 33 is a schematic representation of video camera section 100 of this embodiment. NTSC system color video signal can be obtained from the video camera section. In FIG. 31, parts like those in FIG. 2 are designated by like reference numerals, and they are not described any further.

In this embodiment, the output signal from CDS circuit 13 is level controlled by an AGC circuit 19 before being supplied to low-pass filter 20 and sample/hold circuits 21 and 22. The AGC circuit 19 corresponds to a circuit part constituted by AGC circuit 19a, level detector 19b and buffer 19c.

To the controller 27 is also connected a recording switch 76, which is turned on in response to the depression of the recording button 6. Further, to the controller 27 is connected a shutter switch 72, which is turned on when the shutter button 7 is depressed with the switch 76 held off by an on-off setting switch 75 of the photo-camera.

When the recording and shutter switches 76 and 72 are depressed, the controller 127 outputs a recording control signal SRC which is led to output terminal 77.

Figure 34:
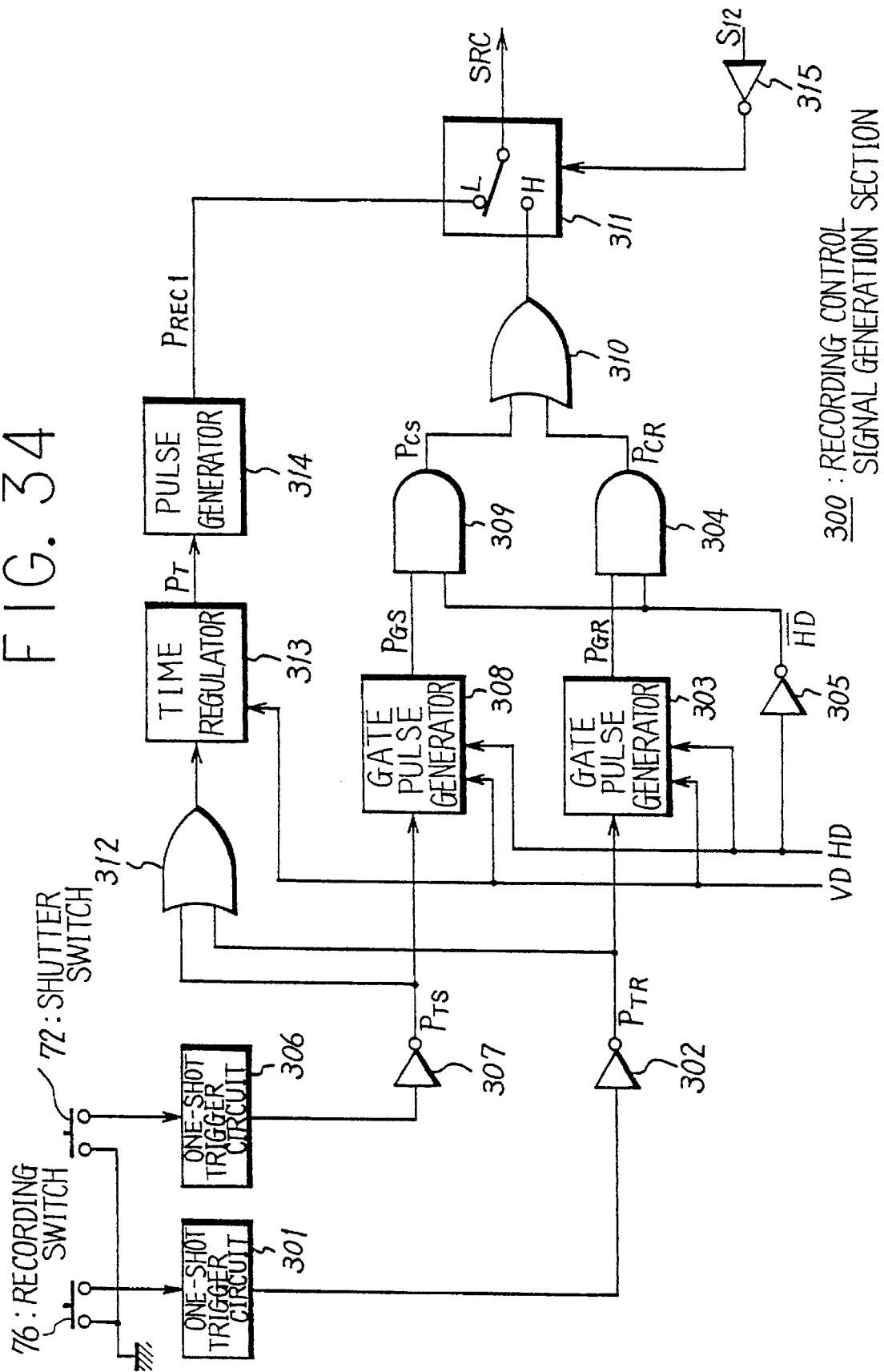
FIG. 34 is a schematic showing a recording control signal generator.

FIG. 34 shows a recording control signal generator 300 in the controller 27.

Referring to the Figure, the recording switch 76 is connected to a one-shot trigger circuit 301. The output signal of the trigger circuit 301 is supplied to a gate pulse generator 303 via an inverter 302. To the gate pulse generator 303 are supplied the vertical sync signal VD (as shown at A in FIG. 35) and horizontal sync signal (as shown at 8 in FIG. 35).

The gate pulse generator 303 outputs a gate pulse $P_{GR}$, which rises with the start of the next vertical blanking signal $T_{VBLK}$ after the output of the pulse $P_{TR}$ and has a pulse duration of 3 H (H being the horizontal scan period).

Figure 35:
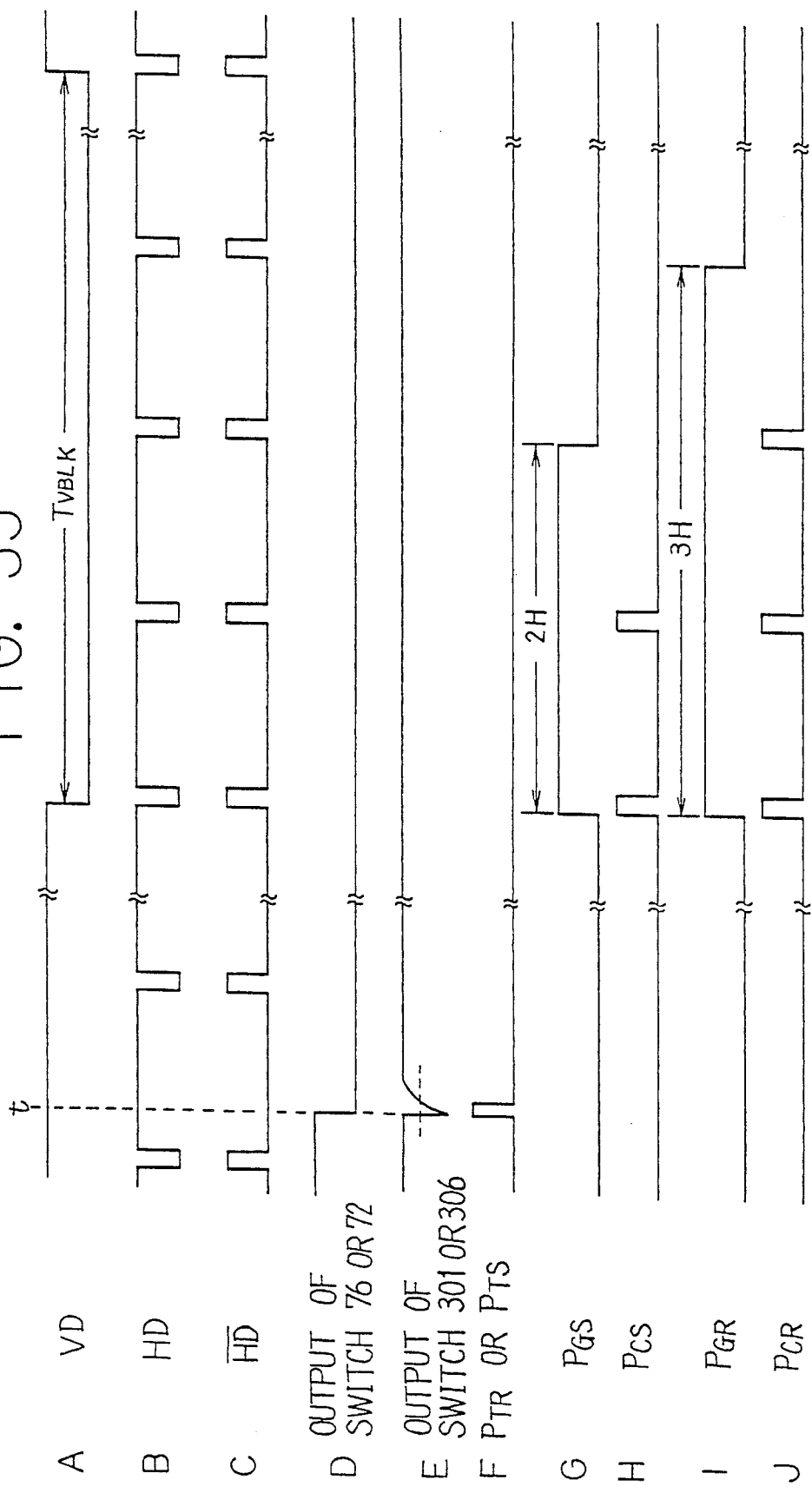
FIG. 35 is a waveform chart illustrating the operation of the recording control signal generator.

The gate pulse $P_{GR}$ is supplied to an AND gate 304, to which is also supplied an inversion of the horizontal sync signal HV from an inverter 305 (as shown at C in FIG. 35). Thus, the AND gate 304 outputs a pulse train $P_{CR}$ consisting of three successive pulses in one horizontal scan period during the period of the gate pulse $P_{GR}$.

In the above structure, when the recording switch 6 is turned on at an instant t1, the output signal of the recording switch 76 is inverted from a high level to a low level (as shown at D in FIG. 35). As a result, the trigger circuit 301 outputs a trigger signal (as shown at E in FIG. 35), and the inverter 302 outputs a shaped pulse $P_{TR}$ (as shown at F in FIG. 35). The gate pulse generator 303 outputs a gate pulse $P_{GR}$, which raises from the start of the next vertical blanking period $T_{VBLK}$ and has a pulse duration of 3 H (as shown at I in FIG. 35), and the AND gate 304 outputs a pulse train $P_{CR}$ (as shown at J in FIG. 35).

The shutter switch 72 is connected to one-shot trigger circuit 306, the output signal of which is supplied to a gate pulse generator 308 through an inverter 307. To the gate pulse generator 308 are supplied the sync signals VD and HD.

The gate pulse generator 308 outputs a gate pulse $P_{GS}$, which rises at the start of the next vertical blanking signal $T_{VBLK}$ after the output of the pulse $P_{TS}$ and has a pulse duration of 2 H.

The gate pulse $P_{GS}$ is supplied to an AND gate 309, to which is also supplied an inversion of the horizontal scan signal HD from the inverter 305. Thus, the AND gate 309 outputs a pulse train $P_{CS}$ constituted by 2 successive pulses in one horizontal scan period during the period of the gate pulse $P_{GS}$.

In the above construction, when the shutter switch 72 is turned on at instant t1, the output signal of the shutter switch 72 is inverted from high level to low level (as shown at D in FIG. 35). Thus the trigger circuit 306 outputs a trigger signal (as shown at E in FIG. 35). The inverter 307 outputs a shaped pulse $P_{TS}$ (as shown at F in FIG. 35). The gate pulse generator 308 outputs a gate pulse $P_{GS}$, which rises at the start of the next vertical blanking period $T_{VBLK}$ and has a pulse duration of 2 H, and the AND gate 309 outputs a pulse train $P_{CS}$ (as shown at H in FIG. 35).

The pulse trains $P_{CR}$ and $P_{CS}$ output from the AND gates 304 and 309 are supplied via an OR gate 310 to an H side fixed terminal of a select switch 311.

Also, the pulses $P_{TR}$ and $P_{TS}$ output from the inverters 302 and 307 are supplied to an OR gate 312. The output of the OR gate 312 is supplied to a time regulator 313, to which the vertical sync signal VD (as shown at A in FIG. 36) is also supplied.

The time regulator 313 outputs a pulse $P_T$ substantially at a central position of the next vertical scan period after the output of the pulse $P_{TR}$ or $P_{TS}$ from the inverter 302 or 307. The pulse $P_T$ is supplied to a pulse generator 314. The pulse generator 314 outputs a pulse $P_{REC1}$, which falls in synchronism to the pulse $P_T$ and has a pulse duration in a range of 0.1 to 1.0 sec., in this embodiment 0.5 sec. The pulse $P_{REC1}$ is supplied to an L side fixed terminal of the select switch 311.

Figure 36:
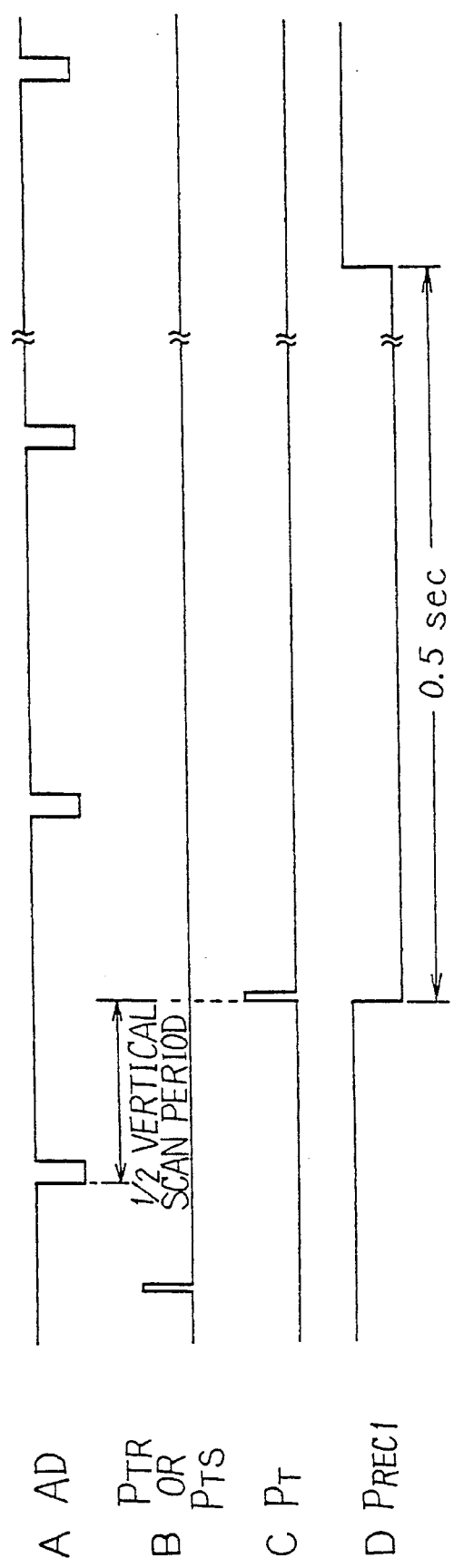
FIG. 36 is a waveform chart illustrating further operation of the recording control signal generator.

In the above construction, when a pulse $P_{TR}$ or $P_{TS}$ is output from the inverter 302 or 307, the regulator 313 outputs a pulse $P_T$ substantially at the center of the next vertical scan period (as shown at C in FIG. 36), and the pulse generator 314 outputs a pulse $P_{REC1}$ (as shown at D in FIG. 36).

Where a VTR 82 or a still image recorder 83 is connected via an adapter 81 as shown in FIG. 37, color video signal SCV and recording control signal SRC output from the video camera section 100 (shown in FIG. 33) are supplied to the adapter 81. The video camera section 100 and adapter 81 are connected to each other using an EIAI standard 12-pin 8-mm video connector (not shown), and a voltage of 6 V is supplied from the adapter 81 to the video camera section 100 via pin No. 12.

Color video signal SCV and recording control signal SRCm are supplied from the adapter 81 to the VTR 82, and color video signal SCV and recording control signal SRCs are supplied from the adapter 81 to the still image recorder 83.

The adapter 81 is connected to the VRT 82 and still image recorder 83 via the EIAI standard 12-pin 8-mm video connector (not shown), and a voltage of 6 V is supplied from the VTR 82 and still image recorder 83 to the adapter 81 via pin No. 12.

Figure 38:
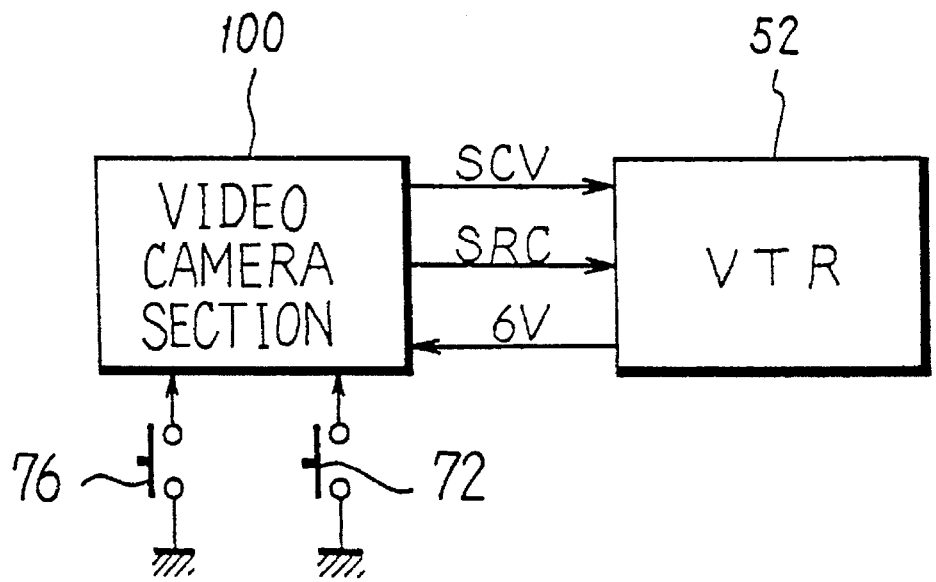
FIG. 38 is a schematic showing a direct connection example.
Figure 39:
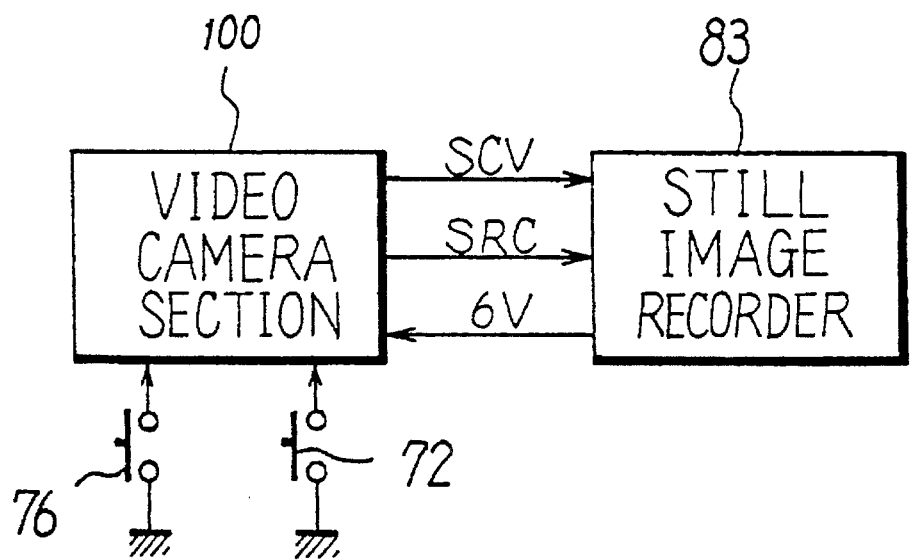
FIG. 39 is a schematic showing another direct connection example.

Meanwhile, where the VTR or still image recorder 83 is connected directly, as shown in FIGS. 38 and 39, color video signal SCV and recording control signal SRC are supplied to the VTR 82 or still image recorder 83. The video camera section 100 is connected to the VTR 82 or still image recorder 83 using the EIAI standard 12-pin 8-mm video connector (not shown), and a voltage of 6 V is supplied from the VRT 82 or still image recorder 83 via pin No. 12.

Referring back to FIG. 34, signal S12 obtained at pin No. 12 of the connector noted above, is supplied as a select signal through inverter 315 to the select switch 311, The select switch 311 is connected to the H side when the select signal is at a high level (6 V), while it is connected to the L side when it is connected to a low level (0 V).

Thus, when the adapter 81 is connected as shown in FIG. 37, at which time the select signal is at the high level, the select switch 311 is connected to the H side. In this case, when the recording switch 76 and shutter switch 72 are turned on with the depression of the recording and shutter buttons 6 and 7, the select switch 311 outputs the pulse trains $P_{CR}$ and $P_{CS}$ as recording control signal SRC.

When the VTR 82 or still image recorder 83 is connected as shown in FIGS. 38 and 39, on the other hand, the select signal is at the low level and the select switch 311 is thus connected to the L side. In this case, when the recording and shutter switches 76 and 72 are turned on with the depression of the recording and shutter buttons 6 and 7, the select switch 311 outputs the pulse $P_{REC1}$ as the recording control signal SRC.

Figure 40:
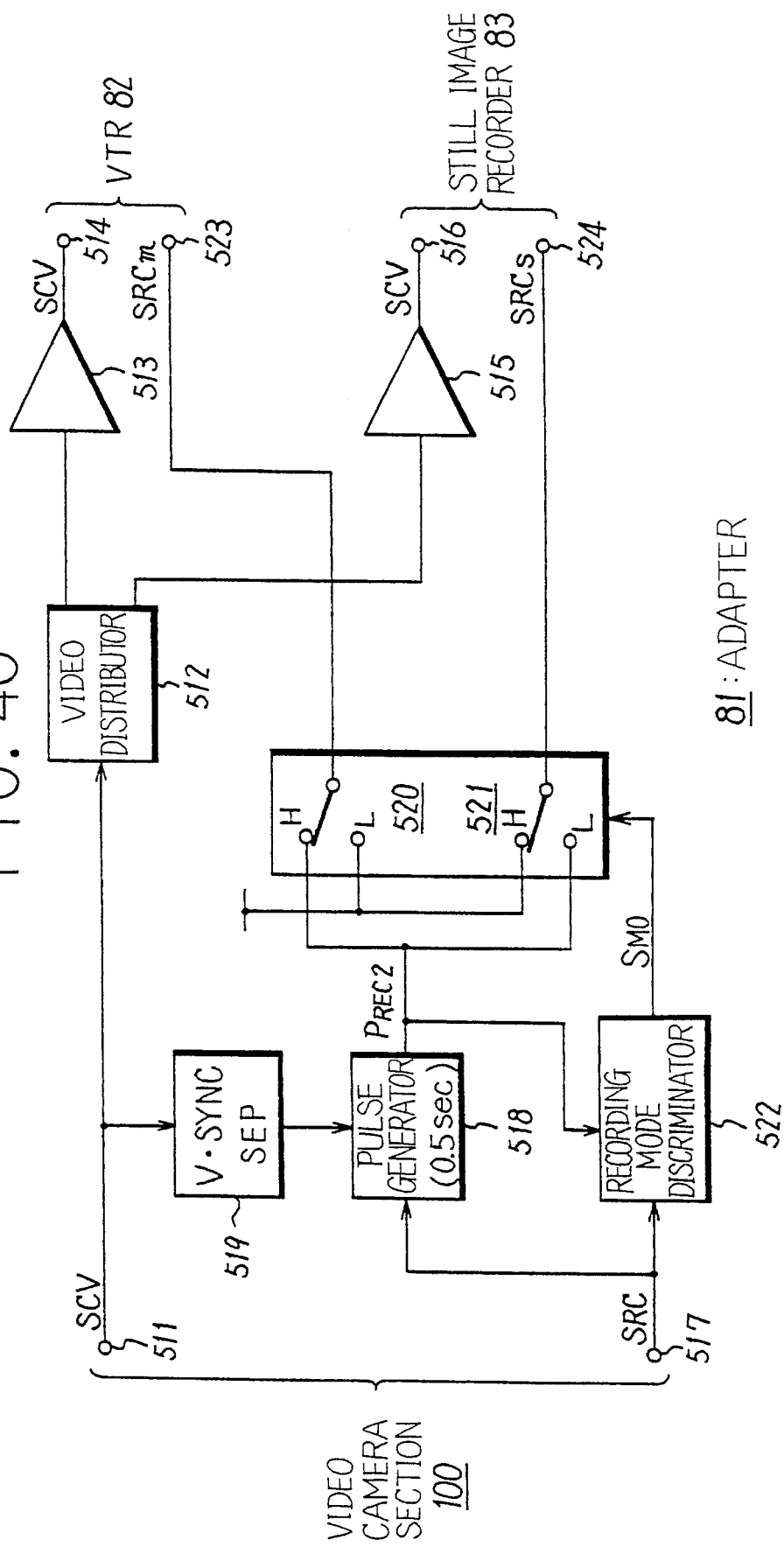
FIG. 40 is a schematic showing an adapter.

The construction of the adapter will now be described with reference to FIG. 40.

Referring to the Figure, the color video signal SCV is supplied to an input terminal 511 and thence to a video signal distributor 512. The color video signal SCV distributed from the video signal distributor 512 is amplified by the amplifier 513 to be supplied to an output terminal 514. Also, it is amplified by an amplifier 515 to be supplied to an output terminal 516.

To an input terminal 517 is supplied recording control signal SRC (i.e., $P_{CR}$ or $P_{CS}$). The recording control signal 519 is supplied to a pulse generator 518, to which vertical sync signal VD separated by a vertical sync signal separator 519 is also supplied (as shown at E in FIG. 41).

When a recording control signal SRC is supplied in a vertical blanking period $T_{VBLK}$, a pulse $P_{REC2}$ is supplied, which rises substantially at a central point in the vertical blanking period $T_{VBLK}$ and has a pulse duration in a range of 0.1 to 1.0 sec., i.e., 1.5 sec. in this embodiment (as shown at F in FIG. 41). The pulse $P_{REC2}$ is supplied an H side fixed terminal of a select switch 520 and also to a L side fixed terminal of a select switch 521. An L side fixed terminal of the select switch 520 and an H side fixed terminal of the selectswitch 521 are connected to a power supply terminal.

The recording control signal SRC supplied to the input terminal 517 is supplied to a recording mode discriminator 522. The recording mode discriminator 522 comprises a T flip-flop, for instance, and its output $S_{MO}$ is changed every time a pulse is input.

When the pulse train $P_{CR}$ (shown at A in FIG. 41) is supplied as the recording control signal SRC, the mode output $S_{MO}$ is changed to low level, then high level, then low level, and then high level before settling (as shown at C and G in FIG. 41).Meanwhile, when the pulse train $P_{CS}$ (shown at B in FIG. 41) is supplied as recording control signal SRC, the mode output $S_{MO}$ is changed to low level, then high level, and then low level before settling (as shown at D and H at FIG. 41).

The recording mode discriminator 522 is supplied with a pulse $P_{REC2}$ as reset signal from the pulse generator 518 and reset with the rising of the pulse $P_{REC2}$.

The mode output $S_{MO}$ from the recording mode discriminator 522 is supplied as select signal to the select switches 520 and 521. The select switches 520 and 521 are connected to the H side fixed terminal when the mode output $S_{MO}$ is at the high level and connected to the L side fixed terminal when the mode output is at the low level.

Therefore, when the recording control signal SRC is the pulse train $P_{CR}$, the mode output $P_{REC2}$ is at the high level during the period of the pulse $P_{REC2}$, and the select switch 520 thus outputs the pulse $P_{REC2}$, which is led as the recording control signal SRCm to the output terminal 523. When the recording control signal SRC is the pulse train $P_{CS}$, the mode output $S_{MO}$ is at the low level during the period of the pulse $P_{REC2}$, and the select switch 521 thus outputs the pulse $P_{REC2}$, which is supplied as the recording control signal SRCs to the output terminal.

The color video signal supplied to the output terminal 514 and the recording control signal SRCm supplied to the output terminal 523 are supplied to the VRT 82, while the color video signal SCV supplied to the output terminal 516 and the recording control signal SRCs supplied to the output terminal 524 are supplied to the still image recorder 83 (as shown in FIG. 37).

In the above construction, when the VTR 82 is directly connected to the video camera section 100 (see FIG. 38), with the recording switch 76 turned on in response to the depression of the recording button 6 (see FIG. 1), the select switch 311 in the recording control signal generator 300 (see FIG. 34) outputs the pulse $P_{REC1}$ falling at the instant corresponding to the center of the next vertical sync signal. This signal is supplied as the recording control signal SRC to the VTR 82. Although not mentioned above, the pulse duration of the pulse $P_{REC1}$ is 0.5 sec. and satisfies the 8-mm video standard (0.1 to 1.0 sec.). Thus, recording in the color video recorder is started according to the pulse $P_{REC1}$. When the recording button 6 is depressed again with the VTR 82 in the recording state, a pulse $P_{REC1}$ is supplied likewise from the video camera section 100 to the VTR 82 to stop the recording therein.

When the still image recorder 83 is connected to the video camera section 100 (see FIG. 39), with the shutter switch 72 turned on in response to the depression of the shutter button 7 (see FIG. 1), the select switch 311 in the recording control signal generator 300 outputs a pulse $P_{REC1}$ falling at the instant corresponding to the center of the next vertical sync signal. This signal is supplied as the recording control signal SRC to the still image recorder 83. According to this pulse $P_{REC1}$, one frame, for instance, of color video signal SCV is recorded in the still image recorder 83.

Operation when the VTR 82 and still image recorder 83 are connected via the adapter 81 to the video camera section 100 (see FIG. 37) is as follows.

When the recording switch 76 is turned on in response to the depression of the recording button 6, in the next vertical blanking period $T_{VBLK}$ the select switch 311 in the recording control signal generator 300 outputs a pulse $P_{CR}$ to be supplied as the recording control signal SRC to the adapter 81. From the output terminal 523 of the adapter 81, a pulse $P_{REC2}$ falling at the instant corresponding to the center of the succeeding vertical scan period is output to be supplied as the recording control signal SCRm to the VTR 82. Although not mentioned, the pulse duration of the pulse $P_{REC2}$ is 0.5 sec., satisfying the 8-mm video standard (0.1 to 1.0 sec.). Thus, according to the pulse $P_{REC2}$ recording in the color video signal SCV in the VTR 82 is started according to the pulse $P_{REC2}$. When the recording button 6 is depressed again in the recording state of the VTR 82, a pulse $P_{REC2}$ is supplied from the adapter 81 and VTR 82 to stop the recording in the VTR 82.

When the shutter switch 72 is turned on in response to the depression of the shutter button 7, in the next vertical blanking period $T_{VBLK}$ a pulse train $P_{CS}$ is output from the select switch 311 of the recording control section 300 to be supplied as the recording control signal SRC to the adapter 81. From the output terminal 524 of the adapter 81 a pulse $P_{REC2}$ falling at the instant corresponding to the center of the succeeding vertical sync period is output and supplied as the recording control signal SRCs to the still image recorder 83. According to this pulse $P_{REC2}$ one frame, for instance, of color video signal SCV is supplied to the still image recorder 83.

As shown, in this embodiment automatic discrimination as to whether the VTR 82 or the still image recorder 83 or the adapter 81 is connected to the video camera section 100 is effected by the recording control signal generator 300. When the VTR 82 or still image recorder 83 is connected, the pulse $P_{REC1}$ is supplied as the recording control signal SRC to the VTR 82 or still image recorder 83. When the adapter 81 is connected, on the other hand, the pulse train $P_{CR}$ or $P_{CS}$ is supplied as the recording control signal SCR to the adapter 81. Thus, in either case it is possible to obtain satisfactory recording control on the VTR 82 or still image recorder 83.

In the adapter 81, the pulse train $P_{CE}$ and $P_{CS}$ generated in accordance with the user's operation are discriminated, and when they are supplied, the recording control signals SRCm and SRCs are supplied to the VTR 82 and still image recorder 83. Thus, the use of the adapter 81 when making recording of motion or still images, precludes the necessity of replacing any recorder connected to the video camera section 100, thus improving the user's convenience of use.

While an example has been shown, in which the VTR 82 and still image recorder 83 are connected to the adapter 81, it is also possible to permit a greater number of recorders.

Further, while the above embodiments are concerned with video camera devices dealing with NTSC system color video signals, the invention may of course be applied as well to video camera devices dealing with other video signals.

It will be obvious to those having ordinary skill in the art that changes may be made in the above described details of the preferred embodiments of the present invention without departing from the spirit and scope of the present invention.

We claim:

1. A video camera apparatus for generating a shutter pulse capable of operating a still image recording means such as a photo-camera, said apparatus comprising:

image pick-up means for providing an image pick-up signal in accordance with a received image;

level detection means for detecting a level over time representative of an average level of the image pick-up signal and providing a level output signal in accordance with the said level detected, said level detected being representative of an average luminance across a field area of the received image;

level change detection means for detecting magnitude changes in said level output signal; and shutter pulse generation means for generating said shutter pulse when said level change detection means detects more than a predetermined change in value of said level output signal over a predetermined period of time.

2. An apparatus according to claim 1 wherein said level change detection means includes:

a first signal path for providing a first signal representative of said level output signal; and a delay signal path for providing a second signal representative of said level output signal delayed by said predetermined period of time, said shutter pulse generation means being operative for comparing said first and second signals and providing as said shutter pulse a signal of a first state when the levels of said first and second signals differ from one another and of a second state when the levels are substantially the same.

3. A video camera apparatus for generating a shutter pulse capable of operating a still image recording means such as a photo-camera, said apparatus comprising:

iris means having an adjustable aperture for passing an amount of light of an image, the amount of light passed through the adjustable aperture being controlled by an aperture control signal;

image pick-up means for picking up the image as passed through the adjustable aperture and providing an image pick-up signal representative thereof;

level detection means for detecting a level of the image pick-up signal and providing said aperture control signal in accordance with the level detected, the level detected being representative of an average luminance across an area of the image as picked up by said image pick-up device;

level change detection means for detecting magnitude changes in said aperture control signal; and shutter pulse generation means for generating said shutter pulse when said level change detection means detects a magnitude change in said aperture control signal exceeding a predetermined amount.

4. A video camera apparatus for generating a shutter pulse capable of operating a still image recording means such as a photo-camera, said apparatus comprising:

image pick-up means for receiving an optical image and providing an image pick-up signal representative thereof;

AGC means for amplifying the image pick-up signal in accordance with a gain control signal;

level detection means for detecting a level of the amplified image pick-up signal and providing said gain control signal in accordance with said level, the level detected corresponding to an average luminance across an area of the received optical image;

level change detection means for detecting magnitude changes in said gain control signal; and shutter pulse generation means for generating said shutter pulse when said level change detection means detects a magnitude change in said gain control signal exceeding a predetermined amount.

5. A video camera apparatus for generating a shutter pulse capable of operating a still image recording means such as a photo-camera, said apparatus comprising:

image pick-up means for providing an image pick-up signal in accordance with a received image;

level detection means for detecting a level over time representative of an average level of the image pick-up signal and providing a level output signal in accordance with the said level detected, said level detected being representative of an average luminance across a field area of the received image;

level change detection means for detecting changes in said level output signal; and shutter pulse generation means for generating said shutter pulse when said level change detection means detects a change exceeding a predetermined amount;

wherein said level change detection means includes a first signal path for providing a first signal representative of said level output signal, and a delay signal path for providing a second signal representative of said level output signal delayed by a predetermined period of time, said shutter pulse generation means being operative for comparing said first and second signals and providing as said shutter pulse a signal of a first state when the levels of said first and second signals differ from one another and of a second state when the levels are substantially the same; and wherein said shutter pulse generation means includes negative level shifting means and positive level shifting means, each level shifting means receiving one of said first and second signals and providing respective negative and positive level shifted versions thereof, first comparator means receiving the other signal of said first and second signals at an inverting input thereof while receiving the negative level shifted signal version at a non-inverting input thereof for providing an output signal of one of two states in accordance with the signal differential between its inverting and non-inverting inputs, second comparator means receiving said other signal of said first and second signals at a non-inverting input thereof while receiving the positive level shifted signal version at an inverting input thereof for providing an output signal of one of two states in accordance with the signal differential between its inverting and non-inverting inputs, and means for combining the output signals of said first and second comparator means for providing said shutter pulse from both of said first and second comparator means.

6. A video camera apparatus for generating a shutter pulse capable of operating a still image recording means such as a photocamera, said apparatus comprising:

image pick-up means for providing an image pick-up signal in accordance with a received image;

level detection means for detecting a level over time representative of an average level of the image pick-up signal and providing a level output signal in accordance with the said level detected, said level detected being representative of an average luminance across a field area of the received image;

level change detection means for detecting changes in said level output signal; and shutter pulse generation means for generating said shutter pulse when said level change detection means detects a change exceeding a predetermined amount;

wherein said level change detection means includes a first signal path for providing a first signal representative of said level output signal, and a delay signal path for providing a second signal representative of said level output signal delayed by a predetermined period of time, said shutter pulse generation means being operative for comparing said first and second signals and providing as said shutter pulse a signal of a first state when the levels of said first and second signals differ from one another and of a second state when the levels are substantially the same; and wherein said predetermined period of time is less than a time constant of said level detection means as associated with determining the average luminance across said area of the received image as detected from the amplified image pick-up signal.

7. An apparatus according to claim 6 wherein said time constant is proportional to one vertical scan period of the image pick-up signal.

8. An apparatus according to claim 7 wherein said predetermined period of time is approximately one ms.

* * * * *